US012237126B2

(12) United States Patent
Morton et al.

(10) Patent No.: US 12,237,126 B2
(45) Date of Patent: Feb. 25, 2025

(54) VARIABLE FIELD MAGNETIC COUPLERS AND METHODS FOR ENGAGING A FERROMAGNETIC WORKPIECE

(71) Applicant: Magswitch Technology, Inc., Superior, CO (US)

(72) Inventors: David H. Morton, Boulder, CO (US); Cengiz Kizilkan, Ingolstadt (DE); Paul J. Karp, Thornton, CO (US)

(73) Assignee: Magswitch Automation Company, Superior, CO (US)

( * ) Notice: Subject to any disclaimer, the term of this patent is extended or adjusted under 35 U.S.C. 154(b) by 0 days.

(21) Appl. No.: 18/435,705

(22) Filed: Feb. 7, 2024

(65) Prior Publication Data

US 2024/0395485 A1 Nov. 28, 2024

Related U.S. Application Data

(63) Continuation of application No. 17/130,868, filed on Dec. 22, 2020, now Pat. No. 11,901,141, which is a continuation of application No. 15/965,582, filed on Apr. 27, 2018, now Pat. No. 10,903,030.

(60) Provisional application No. 62/634,783, filed on Feb. 23, 2018, provisional application No. 62/490,705, filed on Apr. 27, 2017.

(51) Int. Cl.

| | |
|---|---|
| ***H01H 36/00*** | (2006.01) |
| ***B65H 3/16*** | (2006.01) |
| ***B66C 1/04*** | (2006.01) |
| ***H01F 7/02*** | (2006.01) |
| ***H01F 7/04*** | (2006.01) |

(52) U.S. Cl.
CPC ............. *H01H 36/002* (2013.01); *B65H 3/16* (2013.01); *B66C 1/04* (2013.01); *H01F 7/021* (2013.01); *H01F 7/0226* (2013.01); *H01F 7/0242* (2013.01); *H01F 7/0257* (2013.01); *H01F 7/04* (2013.01)

(58) Field of Classification Search
None
See application file for complete search history.

(56) References Cited

U.S. PATENT DOCUMENTS 2,863,550 A 12/1958 Hommel
2,947,429 A 8/1960 Buccicone
3,089,064 A 5/1963 Cotton
(Continued)

FOREIGN PATENT DOCUMENTS

CN 2179359 Y 10/1994
CN 1104989 A 7/1995
(Continued)

OTHER PUBLICATIONS

Ixtur Automatic On/Off Lifting Magnets; Industrial Magnetics, Inc., magnetics.com, Nov. 1, 2015, https://web.archive.org/web/20151101101715/https://www.magnetics.com product.asp?ProductID=169, two pages.
"MagnaGrip SS Sensing System" https://www.maglogix.com/maglogix-switchable-permanent-magnets-magnagrip, copyright 2014-2017, printed Jul. 20, 2019, (5 pages).
(Continued)

*Primary Examiner* — Bernard Rojas
(74) *Attorney, Agent, or Firm* — Faegre Drinker Biddle & Reath LLP

(57) ABSTRACT

Magnetic coupling devices are disclosed which may be configured in at least three states. The various states may be provided through one or more of altering a position of a permanent magnet relative to another permanent magnet and altering a current level in a coil surrounding a permanent magnet.

16 Claims, 32 Drawing Sheets

(56) References Cited

U.S. PATENT DOCUMENTS

| | | | |
|---|---|---|---|
| 3,316,514 | A | 4/1967 | Radus et al. |
| 3,355,209 | A | 11/1967 | Richards et al. |
| 3,452,310 | A | 6/1969 | Israelson |
| 3,646,669 | A | 3/1972 | Erickson |
| 3,895,270 | A | 7/1975 | Maddox |
| 4,314,219 | A | 2/1982 | Haraguchi |
| 4,384,313 | A | 5/1983 | Steingroever et al. |
| 4,465,993 | A | 8/1984 | Braillon |
| 4,594,568 | A | 6/1986 | Hubner et al. |
| 4,610,580 | A | 9/1986 | Palm |
| 4,639,170 | A | 1/1987 | Palm |
| 4,921,292 | A | 5/1990 | Harwell et al. |
| 4,956,625 | A | 9/1990 | Cardone et al. |
| 5,444,902 | A | 8/1995 | Casturo et al. |
| 5,525,950 | A | 6/1996 | Wang |
| 5,794,497 | A | 8/1998 | Anderson |
| 6,076,873 | A | 6/2000 | Jung |
| 6,104,270 | A | 8/2000 | Elias |
| 6,160,697 | A | 12/2000 | Edel |
| 6,229,422 | B1 | 5/2001 | Pignataro |
| 6,331,810 | B1 | 12/2001 | Jung |
| 6,489,871 | B1 | 12/2002 | Barton |
| 6,573,817 | B2 | 6/2003 | Gottschalk |
| 6,636,153 | B1 | 10/2003 | Barton et al. |
| 6,663,154 | B2 | 12/2003 | Pancheri |
| 6,707,360 | B2 | 3/2004 | Underwood et al. |
| 7,012,495 | B2 | 3/2006 | Underwood et al. |
| 7,049,919 | B2 | 5/2006 | Yamaki |
| 7,148,777 | B2 | 12/2006 | Chell et al. |
| 7,161,451 | B2 | 1/2007 | Shen |
| 7,396,057 | B2 | 7/2008 | Ye et al. |
| 8,031,038 | B2 | 10/2011 | Kimura |
| 8,157,155 | B2 | 4/2012 | Diez et al. |
| 8,183,965 | B2 | 5/2012 | Michael |
| 8,256,098 | B2 | 9/2012 | Michael |
| 8,350,663 | B1 | 1/2013 | Michael |
| 8,604,900 | B2 | 12/2013 | Kocijan |
| 8,803,358 | B2 | 8/2014 | Hfner et al. |
| 8,878,639 | B2 | 11/2014 | Kocijan |
| 8,892,258 | B2 | 11/2014 | Jacobsen et al. |
| 8,907,754 | B2 | 12/2014 | Barton et al. |
| 8,934,210 | B1 | 1/2015 | Denis et al. |
| 9,164,154 | B2 | 10/2015 | Filosa et al. |
| 9,202,616 | B2 | 12/2015 | Fullerton et al. |
| 9,232,976 | B2 | 1/2016 | Fortier et al. |
| 9,242,367 | B2 | 9/2016 | Timmons et al. |
| 9,453,769 | B2 | 9/2016 | Michael |
| 9,484,137 | B2 | 11/2016 | Kocijan |
| 9,589,715 | B2 | 3/2017 | Choi |
| 9,818,522 | B2 | 11/2017 | Kocijan |
| 10,903,030 | B2 | 1/2021 | Morton et al. |
| 11,031,166 | B2 | 6/2021 | Morton et al. |
| 11,097,401 | B2 | 8/2021 | Morton et al. |
| 11,511,396 | B2 | 11/2022 | Morton et al. |
| 11,651,883 | B2 | 5/2023 | Morton et al. |
| 11,839,954 | B2 | 12/2023 | Morton et al. |
| 12,023,770 | B2 | 7/2024 | Morton et al. |
| 2001/0045785 | A1 | 11/2001 | Chen et al. |
| 2002/0105400 | A1 | 8/2002 | Underwood et al. |
| 2003/0030342 | A1 | 2/2003 | Chen et al. |
| 2004/0239460 | A1 | 12/2004 | Kocijan |
| 2005/0012579 | A1 | 1/2005 | Underwood et al. |
| 2009/0027149 | A1 | 1/2009 | Kocijan |
| 2010/0201468 | A1 | 8/2010 | Pohl et al. |
| 2010/0301839 | A1 | 12/2010 | Cardone et al. |
| 2011/0248806 | A1 | 10/2011 | Michael |
| 2013/0026774 | A1 | 1/2013 | Ding |
| 2013/0135067 | A1 | 5/2013 | Choi |
| 2013/0234817 | A1 | 9/2013 | Kocijan |
| 2013/0285399 | A1 | 10/2013 | Sarh et al. |
| 2013/0320686 | A1 | 12/2013 | Morton |
| 2014/0055069 | A1 | 2/2014 | Dai et al. |
| 2014/0132254 | A1 | 5/2014 | Thomas et al. |
| 2014/0314507 | A1 | 10/2014 | Timmons et al. |
| 2015/0035632 | A1 | 2/2015 | Sarh et al. |
| 2015/0367484 | A1 | 12/2015 | Choi |
| 2016/0187208 | A1 | 6/2016 | Michael |
| 2016/0289046 | A1 | 10/2016 | Norton et al. |
| 2017/0011831 | A1 | 1/2017 | Reijo |
| 2017/0232605 | A1 | 8/2017 | Morton |
| 2018/0111237 | A1 | 4/2018 | Michael |
| 2018/0193899 | A1 | 7/2018 | Kizilkan |
| 2018/0240627 | A1 | 8/2018 | Matsuo et al. |
| 2018/0311795 | A1 | 11/2018 | Morton et al. |
| 2018/0315563 | A1 | 11/2018 | Morton et al. |
| 2019/0334340 | A1 | 10/2019 | Niehoff |
| 2020/0185137 | A1 | 6/2020 | Morton et al. |
| 2021/0031317 | A1 | 2/2021 | Morton et al. |
| 2021/0031335 | A1 | 2/2021 | Morton et al. |
| 2021/0122011 | A1 | 4/2021 | Kitaura et al. |
| 2021/0210296 | A1 | 7/2021 | Morton et al. |
| 2021/0268615 | A1 | 9/2021 | Morton et al. |
| 2021/0296039 | A1 | 9/2021 | Morton et al. |
| 2023/0090943 | A1 | 3/2023 | Morton et al. |
| 2023/0170122 | A1 | 6/2023 | Morton et al. |
| 2023/0343530 | A1 | 10/2023 | Morton et al. |
| 2023/0364747 | A1 | 11/2023 | Morton et al. |
| 2024/0269803 | A1 | 8/2024 | Morton et al. |

FOREIGN PATENT DOCUMENTS

| | | | |
|---|---|---|---|
| CN | 1402876 | A | 3/2003 |
| CN | 1245725 | C | 3/2006 |
| CN | 101274727 | A | 10/2008 |
| CN | 101356597 | A | 1/2009 |
| CN | 101711194 | A | 5/2010 |
| CN | 201689754 | U | 12/2010 |
| CN | 102574668 | A | 7/2012 |
| CN | 202704790 | U | 1/2013 |
| CN | 103332585 | A | 10/2013 |
| CN | 103377793 | A | 10/2013 |
| CN | 103563019 | A | 2/2014 |
| CN | 104276506 | A | 1/2015 |
| CN | 105684102 | A | 6/2016 |
| CN | 105940468 | A | 9/2016 |
| CN | 106102993 | A | 11/2016 |
| CN | 206617466 | U | 11/2017 |
| DE | 202007009403 | U1 | 9/2007 |
| DE | 202016006696 | U1 | 12/2016 |
| EP | 1425763 | A1 | 6/2004 |
| EP | 1419034 | B1 | 7/2006 |
| EP | 2218557 | A2 | 8/2010 |
| EP | 2611569 | A1 | 7/2013 |
| EP | 2535307 | B1 | 4/2015 |
| EP | 3100289 | A1 | 12/2016 |
| EP | 3100288 | B1 | 3/2018 |
| EP | 3460411 | A1 | 3/2019 |
| GB | 0695130 | A | 8/1953 |
| GB | 1471025 | A | 4/1977 |
| JP | 51-093568 | U | 7/1976 |
| JP | S58186911 | A | 11/1983 |
| JP | 59-030072 | U | 2/1984 |
| JP | S61168079 | U | 10/1986 |
| JP | 63-015404 | A | 1/1988 |
| JP | 04-207002 | A | 7/1992 |
| JP | 2608002 | B2 | 5/1997 |
| JP | 10-012432 | A | 1/1998 |
| JP | H10149919 | A | 6/1998 |
| JP | H11512032 | A | 10/1999 |
| JP | 2002-144271 | A | 5/2002 |
| JP | 2003-516627 | A | 5/2003 |
| JP | 2007-208024 | A | 8/2007 |
| JP | 2008-253127 | A | 10/2008 |
| JP | 2009-509886 | A | 3/2009 |
| JP | 2011148011 | A | 8/2011 |
| JP | 2013-219364 | A | 10/2013 |
| JP | 2013537712 | A | 10/2013 |
| JP | 2014-081002 | A | 5/2014 |
| JP | 5798208 | B2 | 10/2015 |
| JP | 2017-506818 | A | 3/2017 |
| JP | 2017537465 | A | 12/2017 |
| KR | 10-2003-0007387 | A | 1/2003 |

(56) References Cited

FOREIGN PATENT DOCUMENTS

| | | | |
|---|---|---|---|
| KR | 10-2009-0035432 | A | 4/2009 |
| KR | 10-2012-0130040 | A | 11/2012 |
| KR | 10-2013-0063129 | A | 6/2013 |
| KR | 10-1643538 | B1 | 7/2016 |
| WO | 96/07610 | A1 | 3/1996 |
| WO | 99/08293 | A1 | 2/1999 |
| WO | 01/43147 | A1 | 6/2001 |
| WO | 03/09972 | A2 | 2/2003 |
| WO | 03/19583 | A1 | 3/2003 |
| WO | 2008/142716 | A2 | 11/2008 |
| WO | 2009/000008 | A1 | 12/2008 |
| WO | 2010/020006 | A1 | 2/2010 |
| WO | 2010/135788 | A1 | 12/2010 |
| WO | 2012/029073 | A1 | 3/2012 |
| WO | 2012/160262 | A1 | 11/2012 |
| WO | 2014/033757 | A1 | 3/2014 |
| WO | 2015/033851 | A1 | 3/2015 |
| WO | 2015/114214 | A1 | 8/2015 |
| WO | 2015/114220 | A1 | 8/2015 |
| WO | 2016/162419 | A1 | 10/2016 |
| WO | 2018/200948 | A1 | 11/2018 |
| WO | 2018/227140 | A1 | 12/2018 |

OTHER PUBLICATIONS

"MaxX the hand controlled magnetic lifter", Tecnomagnete, 10/08, (16 pages).

"Pick & Place for End-of-Arm Tooling", DocMagnet, undated, (5 pages).

"Pick 'n Place D Series", DocMagnet, retrieved from https://web.archive.org/web/20150512113557/http://www.docmagnet.com:80/products/magnetic-material-handling/automation/pick-n-place-d-series/, May 12, 2015, (4 pages).

"RPL 11 ERIEZ Lifting Magnet 1, 100 lb Hoist or Crane," eBay, ebay.com, seller: industrial_supplies_warehouse, ebay Item No. 263279261219, accessed: Oct. 2017. https://www.ebay.com/itm/RPL-11-ERIEZ-Lifting-Magnet-1-100-lb-Hoist--or-Crane-/263279261219.

Ara Nerses Knaian: "Electropermanent Magnetic Connectors and Actuators: Devices and Their Application in Programmable Matter", PhD Thesis., Massachusetts Institute of Technology, 2010, pp. 1-206.

Knaian, "Electropermanent Magnetic Connectors and Actuators: Devices and Their Application in Programmable Matter", PhD Thesis, Massachusetts Institute of Technology, 2010 (206 pages).

Material Handling Catalogue, DocMagnet, undated, (8 pages).

The Wayback Machine—https://web.archive.org/web/20170405061444/https7/en.wikipedia.org/wiki/Electropermanent_magnet, (dated Apr. 5, 2017; retrieved Oct. 11, 2021), (9 pages).

U.S. Appl. No. 62/248,804, filed Oct. 30, 2015, (64 pages).

VARIABLE FIELD MAGNETIC COUPLERS AND METHODS FOR ENGAGING A FERROMAGNETIC WORKPIECE

RELATED APPLICATIONS

This application is a continuation of U.S. patent application Ser. No. 17/130,868, filed Dec. 22, 2020, titled VARIABLE FIELD MAGNETIC COUPLERS AND METHODS FOR ENGAGING A FERROMAGNETIC WORKPIECE, which is a continuation of U.S. patent application Ser. No. 15/965,582 (now U.S. Pat. No. 10,903,030), filed Apr. 27, 2018, titled VARIABLE FIELD MAGNETIC COUPLERS AND METHODS FOR ENGAGING A FERROMAGNETIC WORKPIECE, which claims the benefit of U.S. Provisional Patent Application No. 62/634,783, filed Feb. 23, 2018, titled VARIABLE FIELD MAGNETIC COUPLERS AND METHODS FOR ENGAGING A FERROMAGNETIC WORKPIECE, and to U.S. Provisional Patent Application No. 62/490,705, filed Apr. 27, 2017, titled MAGNETIC COUPLING TOOL WITH SENSOR ARRANGEMENT, the entire disclosures of which are expressly incorporated by reference herein.

U.S. patent application Ser. No. 15/964,884, filed Apr. 27, 2018, titled MAGNETIC COUPLING DEVICE WITH AT LEAST ONE OF A SENSOR ARRANGEMENT AND A DEGAUSS CAPABILITY, is expressly incorporated by reference herein.

TECHNICAL FIELD

The present disclosure relates to magnetic couplers. More specifically, the present disclosure relates to variable field magnetic couplers including switchable magnetic couplers.

BACKGROUND

Magnetic couplers are known which are used to couple a ferromagnetic workpiece to transport the ferromagnetic workpiece from a first location to a second location, hold the ferromagnetic workpiece, and/or lift the ferromagnetic workpiece. An exemplary magnetic coupler is a switchable magnetic coupler which may include one or more permanent magnet(s) that is (are) rotatable relative to one or more stationary permanent magnet(s), in order to generate and shunt a magnetic field. The switchable magnet coupler may be attached in a removable manner, via switching the magnetic coupler between an “on” state and an “off” state, to a ferromagnetic workpiece, such as for object lifting operations, material handling, material holding, magnetically latching or coupling objects to one another, among other applications.

SUMMARY

Embodiments of the present disclosure relate to magnetic couplers for holding, lifting, and/or transporting a ferromagnetic workpiece.

In an exemplary embodiment of the present disclosure, a magnetic coupling device for magnetically coupling to a ferromagnetic workpiece positioned on a support is provided. The magnetic coupling device comprising: a housing; a plurality of workpiece contact interfaces supported by the housing and adapted to contact the ferromagnetic workpiece; a first permanent magnet supported by the housing and having an active N-S pole pair; a second permanent magnet supported by the housing and having an active N-S pole pair, the second permanent magnet being moveable relative to the first permanent magnet; an actuator operatively coupled to the second permanent magnet to move the second permanent magnet relative to the first permanent magnet; and an electronic controller operatively coupled to the actuator. The electronic controller including logic which actuates the actuator to position the second permanent magnet relative to the first permanent magnet in at least each of: (a) a first state wherein the second permanent magnet has a first position relative to the first permanent magnet to provide a first level of magnetic flux available to the ferromagnetic workpiece at the workpiece contact interfaces, the first level of magnetic flux available to the ferromagnetic workpiece at the workpiece contact interfaces being insufficient to lift the ferromagnetic workpiece relative to the support; (b) a second state wherein the second permanent magnet has a second position relative to the first permanent magnet to provide a second level of magnetic flux available to the ferromagnetic workpiece at the workpiece contact interfaces, the second level of magnetic flux available to the ferromagnetic workpiece at the workpiece contact interfaces being sufficient to lift the ferromagnetic workpiece relative to the support, the second level of magnetic flux being greater than the first level of magnetic flux; and (c) a third state wherein the second permanent magnet has a third position relative to the first permanent magnet to provide a third level of magnetic flux available to the ferromagnetic workpiece at the workpiece contact interfaces, the third level of magnetic flux being greater than each of the first level of magnetic flux and the second level of magnetic flux.

In an example thereof, the magnetic coupling device further comprises a sensing system supported by the housing. The sensing system including at least one sensor which monitors a level of magnetic flux available to the ferromagnetic workpiece at the workpiece contact interfaces.

In a variation of the example thereof, thereof, the actuator is a stepper motor and the at least one sensor monitors the level of magnetic flux available to the ferromagnetic workpiece at the workpiece contact interfaces by monitoring a position of an output of the stepper motor which controls a position of the second permanent magnet relative to the first permanent magnet.

In another variation of the example thereof, the magnetic coupling device further comprises a memory accessible by the electronic controller, wherein the actuator is a motor and the at least one sensor monitors a current draw of the motor, the electronic controller determines the level of magnetic flux available to the ferromagnetic workpiece at the workpiece contact interfaces by monitoring the current draw of the motor and comparing the current draw to at least one stored reference value on the memory.

In another variation of the example thereof, the magnetic coupling device further comprises a memory accessible by the electronic controller, wherein a first sensor value of the at least one sensor is stored on the memory for at least one of the first state, the second state, and the third state. In a variation thereof, the first sensor value corresponds to the second state. In another variation thereof, the first sensor value corresponds to the first state, a second sensor value is stored on the memory which corresponds to the second state, and a third sensor value is stored on the memory which corresponds to the third state. In a further variation thereof, the electronic controller includes logic which actuates the actuator to position the second permanent magnet relative to the first permanent magnet in a fourth state wherein the second permanent magnet has a fourth position relative to the first permanent magnet to provide a fourth level of magnetic flux available to the ferromagnetic workpiece at the workpiece contact interfaces, the fourth level of magnetic flux available to the ferromagnetic workpiece at the workpiece contact interfaces being sufficient to lift the ferromagnetic workpiece relative to the support, the fourth level of magnetic flux being greater than the first level of magnetic flux, less than the third level of magnetic flux, and one of greater than and less than the second level of magnetic flux.

In still another variation of the example thereof, the at least one sensor monitors the level of magnetic flux available to the ferromagnetic workpiece at the workpiece contact interfaces by monitoring a rotational position of the second permanent magnet.

In yet a further variation of the example thereof, the at least one sensor monitors the level of magnetic flux available to the ferromagnetic workpiece at the workpiece contact interfaces by monitoring a first leakage magnetic flux associated with a first workpiece contact interface of the plurality of workpiece contact interfaces with a first magnetic flux sensor. In a variation thereof, the at least one sensor monitors the level of magnetic flux available to the ferromagnetic workpiece at the workpiece contact interfaces by further monitoring a second leakage magnetic flux associated with a second workpiece contact interface of the plurality of workpiece contact interfaces with a second magnetic flux sensor. In a further variation thereof, the magnetic coupling device further comprises a memory accessible by the electronic controller, wherein a first sensor value of the first sensor is stored on the memory for at least one of the first state, the second state, and the third state. In still a further variation thereof, the first sensor value corresponds to the second state. In yet another variation thereof, the first sensor value corresponds to the first state, a second sensor value is stored on the memory which corresponds to the second state, and a third sensor value is stored on the memory which corresponds to the third state. In still another variation thereof, the electronic controller includes logic which actuates the actuator to position the second permanent magnet relative to the first permanent magnet in a fourth state wherein the second permanent magnet has a fourth position relative to the first permanent magnet to provide a fourth level of magnetic flux available to the ferromagnetic workpiece at the workpiece contact interfaces, the fourth level of magnetic flux available to the ferromagnetic workpiece at the workpiece contact interfaces being sufficient to lift the ferromagnetic workpiece relative to the support, the fourth level of magnetic flux being greater than the first level of magnetic flux, less than the third level of magnetic flux, and one of greater than and less than the second level of magnetic flux.

In still another variation of the example thereof, the actuator is a fluid actuator and the at least one sensor monitors the level of magnetic flux available to the ferromagnetic workpiece at the workpiece contact interfaces by monitoring a fluid characteristic of a working fluid of the fluid actuator, the working fluid controls a position of the second permanent magnet relative to the first permanent magnet.

In still another variation of the example thereof, the actuator is a fluid actuator and the at least one sensor monitors a position of an output of the fluid actuator.

In another example thereof, the second permanent magnet is rotatable relative to the first permanent magnet about an axis intersecting with the second permanent magnet to alter a position of the second permanent magnet relative to the first permanent magnet.

In a further example thereof, the second permanent magnet is rotatable relative to the first permanent magnet about an axis in a non-intersecting relationship with the second permanent magnet to alter a position of the second permanent magnet relative to the first permanent magnet. In a variation thereof, the magnetic coupling device further comprises a first platter supported by the housing and a second platter supported by housing. The second platter being moveable relative to the first platter to alter a position of the second permanent magnet relative to the first permanent magnet. The first platter comprising a first plurality of spaced apart permanent magnets including the first permanent magnet, each of the first plurality of spaced apart permanent magnets has a north pole side and a south pole side, and a first plurality of pole portions interposed between adjacent permanent magnets of the first plurality of permanent magnets, wherein the first plurality of permanent magnets are arranged so that each pole portion of the first plurality of pole portions is one of a north pole portion which is adjacent the north pole side of two permanent magnets of the first plurality of permanent magnets and a south pole portion which is adjacent the south pole side of two permanent magnets of the first plurality of permanent magnets. The second platter comprising a second plurality of spaced apart permanent magnets including the second permanent magnet, each of the second plurality of spaced apart permanent magnets has a north pole side and a south pole side, and a second plurality of pole portions interposed between adjacent permanent magnets of the second plurality of permanent magnets, wherein the second plurality of permanent magnets are arranged so that each pole portion of the first plurality of pole portions is one of a north pole portion which is adjacent the north pole side of two permanent magnets of the second plurality of permanent magnets and a south pole portion which is adjacent the south pole side of two permanent magnets of the second plurality of permanent magnets.

In still another example thereof, the second permanent magnet is translatable relative to the first permanent magnet to alter a position of the second permanent magnet relative to the first permanent magnet.

In yet still another example thereof, at least one of the first state, the second state, and the third state is a partial on state of the magnetic coupling device.

In yet a further example thereof, at least two of the first state, the second state, and the third state are each a corresponding partial on state of the magnetic coupling device.

In still yet a further example thereof, each of the first state, the second state, and the third state are each a corresponding partial on state of the magnetic coupling device.

In a further still example thereof, the magnetic coupling device further comprises a plurality of removable pole shoes, each pole shoe supporting a respective one of the plurality of workpiece contact interfaces.

In another exemplary embodiment of the present disclosure, a magnetic coupling device for magnetically coupling to a ferromagnetic workpiece positioned on a support is provided. The magnetic coupling device comprising: a housing having a lower side; a plurality of workpiece contact interfaces supported by the housing and adapted to contact the ferromagnetic workpiece; a first permanent magnet supported by the housing and having an active N-S pole pair providing a generally constant level of magnetic flux; a coil positioned about the first permanent magnet; and an electronic controller including logic which controls a level of the current to be supplied to the coil to provide in at least each of: (a) a first state wherein a first level of current is provided to the coil, the coil and the first permanent magnet providing a first level of magnetic flux available to the ferromagnetic workpiece at the workpiece contact interfaces based on the first level of current and the first permanent magnet, the first level of magnetic flux available to the ferromagnetic workpiece at the workpiece contact interfaces being insufficient to lift the ferromagnetic workpiece relative to the support; (b) a second state wherein a second level of current is provided to the coil, the coil and the first permanent magnet providing a second level of magnetic flux available to the ferromagnetic workpiece at the workpiece contact interfaces based on the second level of current and the first permanent magnet, the second level of magnetic flux available to the ferromagnetic workpiece at the workpiece contact interfaces being sufficient to lift the ferromagnetic workpiece relative to the support, the second level of magnetic flux being greater than the first level of magnetic flux; and (c) a third state wherein a third level of current is provided to the coil, the coil and the first permanent magnet providing a third level of magnetic flux available to the ferromagnetic workpiece at the workpiece contact interfaces based on the third level of current and the first permanent magnet, the third level of magnetic flux being greater than each of the first level of magnetic flux and the second level of magnetic flux.

In an example thereof, the magnetic coupling device further comprises a sensing system supported by the housing. The sensing system including at least one sensor which monitors a level of magnetic flux available to the ferromagnetic workpiece at the workpiece contact interfaces. In a variation thereof, the at least one sensor is an electrical current sensor which monitors a level of current provided to the coil. In another variation thereof, the current passes through the coil in a first direction in the first state and in a second direction in the third state. In still another variation thereof, the third level of current is less than the second level of current.

In still another exemplary embodiment of the present disclosure, a magnetic coupling device for magnetically coupling to a ferromagnetic workpiece positioned on a support is provided. The magnetic coupling device comprising: a housing; a plurality of workpiece contact interfaces supported by the housing and adapted to contact the ferromagnetic workpiece; a first permanent magnet supported by the housing and having an active N-S pole pair; a second permanent magnet supported by the housing and having an active N-S pole pair, the second permanent magnet being moveable relative to the first permanent magnet; an actuator operatively coupled to the second permanent magnet to move the second permanent magnet relative to the first permanent magnet; an electronic controller operatively coupled to the actuator, the electronic controller including logic which actuates the actuator to position the second permanent magnet in a plurality of distinct orientations relative to the first permanent magnet; and a brake supported by the housing, the brake having an engaged state wherein the brake holds the second permanent magnet relative to the first permanent magnet and a disengaged state wherein the brake permits rotation of the second permanent magnet relative to the first permanent magnet.

In an example thereof, the electronic controller is operatively coupled to the brake, the logic of the electronic controller engaging the brake when the second permanent magnet is in one of the plurality of distinct orientations relative to the first permanent magnet. In a variation thereof, a first orientation of the second permanent magnet relative to the first permanent magnet corresponds to a first state of the magnetic coupling device to provide a first level of magnetic flux available to the ferromagnetic workpiece at the workpiece contact interfaces, the first level of magnetic flux available to the ferromagnetic workpiece at the workpiece contact interfaces being insufficient to lift the ferromagnetic workpiece relative to the support; a second orientation of the second permanent magnet relative to the first permanent magnet corresponds to a second state of the magnetic coupling device to provide a second level of magnetic flux available to the ferromagnetic workpiece at the workpiece contact interfaces, the second level of magnetic flux available to the ferromagnetic workpiece at the workpiece contact interfaces being sufficient to lift the ferromagnetic workpiece relative to the support, the second level of magnetic flux being greater than the first level of magnetic flux; and a third orientation of the second permanent magnet relative to the first permanent magnet corresponds to a third state of the magnetic coupling device to provide a third level of magnetic flux available to the ferromagnetic workpiece at the workpiece contact interfaces, the third level of magnetic flux being greater than each of the first level of magnetic flux and the second level of magnetic flux.

In another still exemplary embodiment of the present disclosure, a lifting apparatus for lifting a ferromagnetic workpiece is provided. The lifting apparatus comprising a support structure; and a magnetic coupling device according any one of the embodiments, examples, variations, and refinements mentioned herein operatively coupled to the support structure.

In an example thereof, the support structure includes a robotic arm having a plurality of moveable arm segments and the magnetic coupling device is coupled to an end of the robotic arm.

In another example thereof, the support structure includes a mechanical gantry, the magnetic coupling device being suspended from the mechanical gantry.

In still another example thereof, the support structure includes a crane hoist, the magnetic coupling device being suspended from the crane hoist.

In a further exemplary embodiment of the present disclosure, a fixture for holding a ferromagnetic workpiece is provided. The fixture comprising a frame and at least one magnetic coupling device positioned to support a lower side of the ferromagnetic workpiece. Each magnetic coupling device comprising a housing having a first side; a plurality of workpiece contact interfaces supported by the housing and adapted to contact the ferromagnetic workpiece; a first permanent magnet supported by the housing and having an active N-S pole pair; a second permanent magnet supported by the housing and having an active N-S pole pair, the second permanent magnet being moveable relative to the first permanent magnet; an actuator operatively coupled to the second permanent magnet to move the second permanent magnet relative to the first permanent magnet; and an electronic controller operatively coupled to the actuator. The electronic controller including logic which actuates the actuator to position the second permanent magnet relative to the first permanent magnet in at least each of: (a) a first state wherein the second permanent magnet has a first position relative to the first permanent magnet to provide a first level of magnetic flux available to the ferromagnetic workpiece at the workpiece contact interfaces, the first level of magnetic flux available to the ferromagnetic workpiece at the workpiece contact interfaces being insufficient to hold the ferromagnetic workpiece relative to the magnetic coupling device; and (b) a second state wherein the second permanent magnet has a second position relative to the first permanent magnet to provide a second level of magnetic flux available to the ferromagnetic workpiece at the workpiece contact interfaces, the second level of magnetic flux available to the ferromagnetic workpiece at the workpiece contact interfaces being sufficient to hold the ferromagnetic workpiece relative to the magnetic coupling device, the second level of magnetic flux being greater than the first level of magnetic flux.

In an example thereof, the at least one magnetic coupling device includes a plurality of magnetic coupling devices, each of the plurality of magnetic coupling devices has associated pole shoes with workpiece contact interfaces shaped to match a corresponding profile of the ferromagnetic workpiece. In a variation thereof, the plurality of magnetic coupling devices are spaced apart.

In still a further exemplary embodiment of the present disclosure, a method of moving a ferromagnetic workpiece positioned on a support with a magnetic coupling device. The method comprising the steps of: contacting the ferromagnetic workpiece with a plurality workpiece contact interfaces of the magnetic coupling device, the magnetic coupling device having at least one permanent magnet which contributes to a level of magnetic flux available to the ferromagnetic workpiece at the workpiece contact interfaces; transitioning the magnetic coupling device from a first state having a first level of magnetic flux available to the ferromagnetic workpiece at the workpiece contact interfaces to a second state having a second level of magnetic flux available to the ferromagnetic workpiece at the workpiece contact interfaces, the second level being greater than the first level; moving the ferromagnetic workpiece relative to the support with the magnetic coupling device from a first position to a second position while the magnetic coupling device is in the second state; transitioning the magnetic coupling device from the second state to a third state having a third level of magnetic flux available to the ferromagnetic workpiece at the workpiece contact interfaces, the third level being greater than the second level; moving the ferromagnetic workpiece with the magnetic coupling device from the second position to a third position while the magnetic coupling device is in the third state; and decoupling the ferromagnetic workpiece from the magnetic coupling device.

In yet still a further exemplary embodiment of the present disclosure, a method of moving a ferromagnetic workpiece positioned on a support with a magnetic coupling device is provided. The method comprising the steps of: receiving an identification of ferromagnetic workpiece to be moved with a magnetic coupling device having a plurality of workpiece contact interfaces adapted to contact the ferromagnetic workpiece, the magnetic coupling device having at least one permanent magnet which contributes to a level of magnetic flux available to the ferromagnetic workpiece at the workpiece contact interfaces; determining at least one state of the magnetic coupling device that corresponds to the identified ferromagnetic workpiece, the at least one state having a corresponding level of magnetic flux available to the ferromagnetic workpiece at the workpiece contact interfaces of the magnetic coupling device; contacting the identified ferromagnetic workpiece with the workpiece contact interfaces of the magnetic coupling device; moving the identified ferromagnetic workpiece relative to the support with the magnetic coupling device from an initial position to a final position while sequentially configuring the magnetic coupling device in at least three states, each of the three states having a corresponding level of magnetic flux available to the ferromagnetic workpiece at the workpiece contact interfaces of the magnetic coupling device, the at least three states including the at least one state of the magnetic coupling device that corresponds to the identified ferromagnetic workpiece; and decoupling the identified ferromagnetic workpiece from the magnetic coupling device.

Other aspects and optional and/or preferred embodiments will become apparent from the following description provided below with reference to the accompanying drawings.

Figure 1:
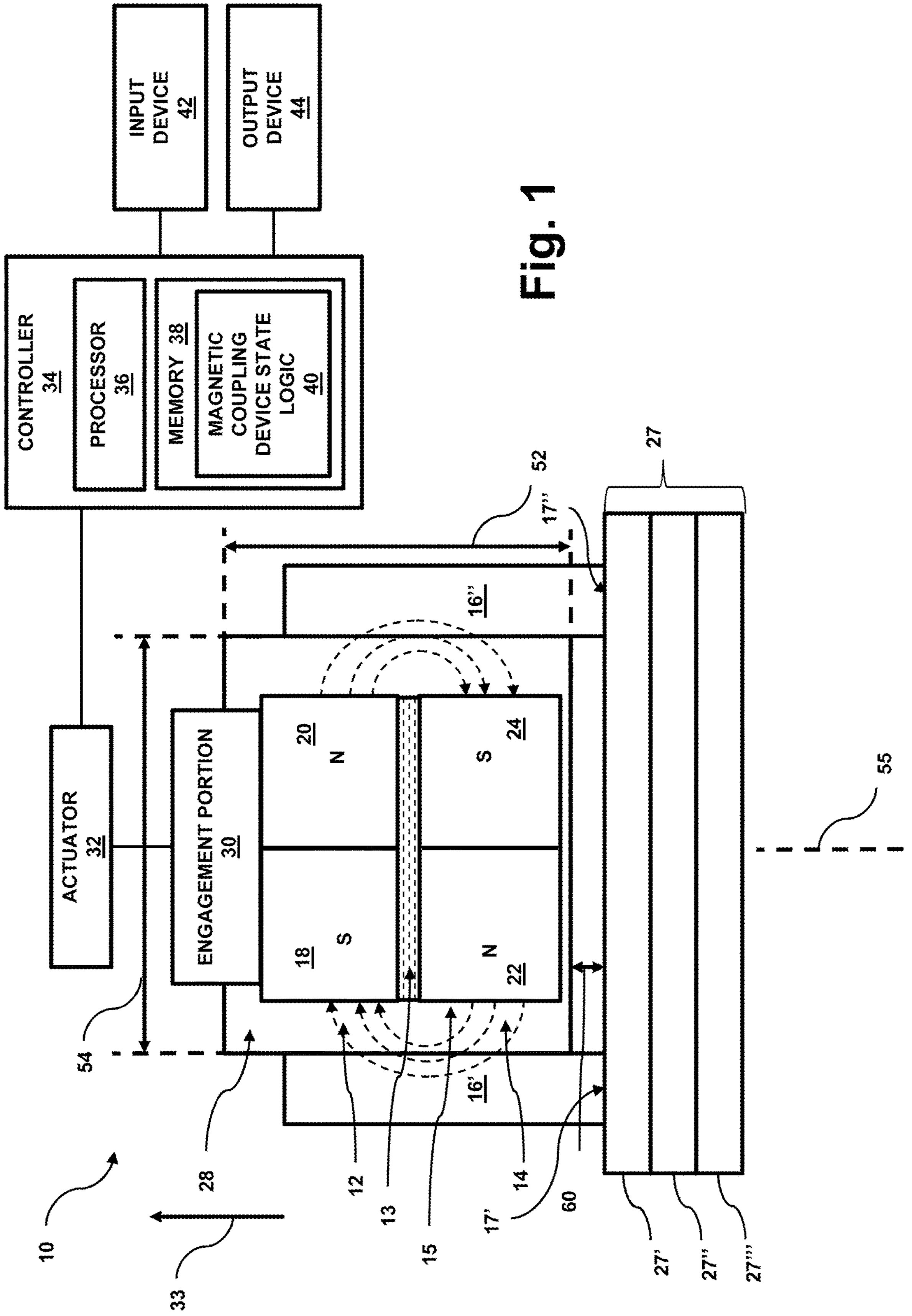
FIG. 1 illustrates a front representative view of an exemplary switchable magnetic coupler device in an exemplary off state positioned on top of a stack of a plurality of ferromagnetic workpieces.

While the disclosed subject matter is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure.

DETAILED DESCRIPTION OF THE DRAWINGS

Embodiments provided herein relate to switchable magnetic devices. Exemplary switchable magnetic devices are disclosed in U.S. Pat. No. 7,012,495, titled SWITCHABLE PERMANENT MAGNETIC DEVICE; U.S. Pat. No. 7,161,451, titled MODULAR PERMANENT MAGNET CHUCK; U.S. Pat. No. 8,878,639, titled MAGNET ARRAYS, U.S. Provisional Patent Application No. 62/248,804, filed Oct. 30, 2015, titled MAGNETIC COUPLING DEVICE WITH A ROTARY ACTUATION SYSTEM, German Utility Model DE202016006696U1; U.S. Provisional Patent Application No. 62/252,435, filed Nov. 7, 2015, titled MAGNETIC COUPLING DEVICE WITH A LINEAR ACTUATION SYSTEM, and U.S. patent application Ser. No. 15/964,884, filed Apr. 27, 2018, titled MAGNETIC COUPLING DEVICE WITH AT LEAST ONE OF A SENSOR ARRANGEMENT AND A DEGAUSS CAPABILITY, the entire disclosures of which are expressly incorporated by reference herein.

The illustrated examples herein in FIGS. 1-13 provide exemplary switchable magnetic devices having a first permanent magnet and a second permanent magnet movable relative to the first permanent magnet, similar to the exemplary switchable magnetic devices of the '495 Patent which is expressly incorporated by reference herein. The permanent magnets may each be cylindrical unitary di-pole body of a single type of rare earth magnet material, such as NdFeB or SmCo. Additional types of switchable magnetic devices may be implemented. Each type of switchable magnetic device includes at least a first permanent magnet that is movable relative to a second permanent magnet.

Further, exemplary switchable magnetic devices may include a first plurality of permanent magnets movable relative to a second plurality of permanent magnets. An example is provided in FIGS. 17-19. Exemplary systems are disclosed in U.S. Provisional Patent Application No. 62/248,804, filed Oct. 30, 2015, titled MAGNETIC COUPLING DEVICE WITH A ROTARY ACTUATION SYSTEM, German Utility Model DE202016006696U1; and U.S. Provisional Patent Application No. 62/252,435, filed Nov. 7, 2015, titled MAGNETIC COUPLING DEVICE WITH A LINEAR ACTUATION SYSTEM, U.S. Pat. No. 7,161,451; and U.S. patent application Ser. No. 15/964,884, filed Apr. 27, 2018, titled MAGNETIC COUPLING DEVICE WITH AT LEAST ONE OF A SENSOR ARRANGEMENT AND A DEGAUSS CAPABILITY, the entire disclosures of which are expressly incorporated by reference herein.

Additionally, exemplary switchable magnetic devices may include at least a first permanent magnet positioned within a first housing which acts as a pole extension of the at least a first permanent magnet, the first housing being movable relative to a second housing having at least a second permanent magnet positioned within the second housing, the second housing acts as a pole extension of the at least a second permanent magnet.

Referring to FIG. 1, an exemplary magnetic coupling device 10 is represented. Magnetic coupling device 10 is an exemplary switchable magnetic device which includes a magnetic flux source 15 including an upper permanent magnet 12 and a lower permanent magnet 14 positioned in a stacked relationship in a housing 28. Permanent magnet 12 comprises a south-pole portion (S-pole portion) 18 and a north-pole portion (N-pole portion) 20. Similarly, permanent magnet 14 comprises a N-pole portion 22 and a S-pole portion 24. Housing 28 may include multiple components assembled together to form a housing. Further, housing 28 may include features to maintain permanent magnet 12 spaced apart from permanent magnet 14 or to incorporate spacers, such as spacer 13 in the illustrated embodiment, which maintains permanent magnet 12 in a spaced apart relation relative to permanent magnet 14. Spacer 13 is made of a non-magnetic material to isolate permanent magnet 12 from permanent magnet 14.

Although each of permanent magnet 12 and permanent magnet 14 are shown as single magnets, switchable magnet device may include multiple permanent magnets which provide the functionality of permanent magnet 12 and multiple permanent magnets which provide the functionality of permanent magnet 14. Additionally, permanent magnet 12 (or multiple magnets providing the functionality of permanent magnet 12) and permanent magnet 14 (or multiple magnets providing the functionality of permanent magnet 14) may be positioned within respective housings that act as pole extensions for the respective magnets. Further, in embodiments, permanent magnets 12, 14 may include more than two poles. Examples including quadpole magnets and other magnets having more than two poles.

Pole shoes 16', 16" are illustratively shown being removably coupled to housing 28. In embodiments, pole shoes 16', 16" are integrally formed as part of housing 28. Pole shoes 16', 16" are made of a ferromagnetic material and are magnetically coupled to permanent magnets 12, 14 through portions of housing 28. A lower portion of each of pole shoes 16', 16" include a workpiece contact interface 17', 17" which may be brought into contact with a workpiece 27, illustratively a top sheet 27' of ferromagnetic material of a stack of sheets 27', 27", and 27" of the ferromagnetic material. The stack of sheets 27 is supported by a support, such as a floor, a frame, or other exemplary supports. Further, lower sheets 27 in the stack support the top sheet 27 in the stack.

Workpiece contact interfaces 17', 17" of pole shoes 16', 16" cooperate with magnets 12, 14 through pole shoes 16', 16" and housing 28 to form first and second poles of the magnets 12, 14. In one example, a single unitary pole shoe forms each of the pole shoes 16', 16". In another example, a plurality of pole shoes form each of the pole shoes 16', 16". Additional pole shoe arrangements are disclosed in U.S. Provisional Patent Application No. 62/623,407, filed Jan. 29, 2018, titled MAGNETIC LIFTING DEVICE HAVING POLE SHOES WITH SPACED APART PROJECTIONS, the entire disclosure of which is expressly incorporated by reference herein. Pole shoes 16', 16" extend beyond a lower surface of housing 28 to provide an air gap 60 between housing 28 and workpiece 27.

In embodiments, permanent magnet 14 is fixed relative to housing 28 and permanent magnet 12 is movable within housing 28 relative to permanent magnet 14 in order to alter an alignment of the magnet portions 18, 20 of the permanent magnet 12 relative to the magnet portions 22, 24 of permanent magnet 14. In the illustrated embodiment, permanent magnet 12 is rotatable relative to permanent magnet 14. Although permanent magnets 12, 14 are shown being vertically stacked with permanent magnet 12 rotatable about vertical axis 55, in other embodiments, permanent magnets 12, 14 are vertically stacked and permanent magnet 12 is rotatable about a horizontal axis. Additional layouts of permanent magnets 12, 14 are contemplated.

Switchable magnetic coupling device 10 based on the configuration of permanent magnets 12, 14 establishes multiple magnetic circuits. In particular, switchable magnetic device 10 may be configured in at least three states, each of which has a corresponding magnetic circuit characteristic. Switchable magnetic device 10 is capable to maintain the configurations of permanent magnets 12, 14 in each of the at least three states for an extended period of time, as explained in more detail herein. In one example, the current state of magnetic coupling device 10 is maintained until a different state is requested.

In a first state referred to herein as an off state, permanent magnet 12 has a first position relative to permanent magnet 14 to provide a first level of magnetic flux available to the ferromagnetic workpiece at the workpiece contact interfaces 17', 17" of the pole shoes 16', 16". In the off state, the first level of magnetic flux available to the ferromagnetic workpiece at the workpiece contact interfaces 17', 17" of the pole shoes 16', 16" is insufficient to lift the ferromagnetic workpiece with the magnetic coupling device 10.

Figure 2:
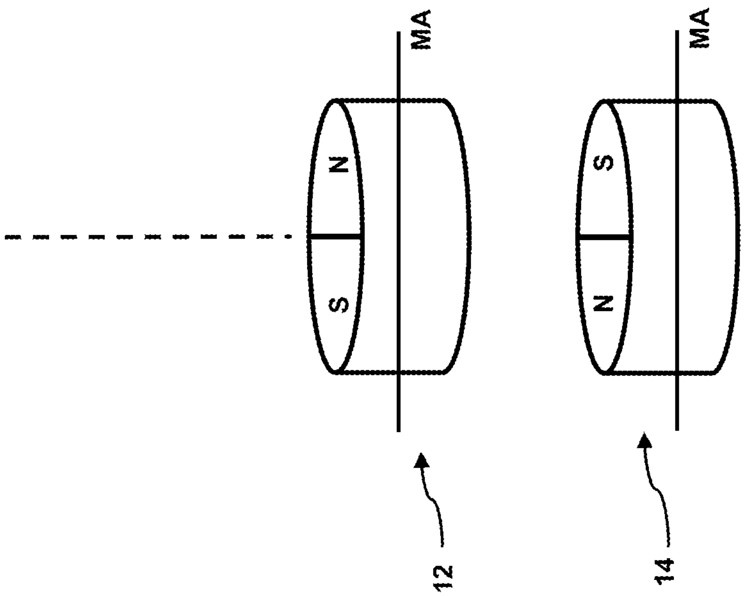
FIG. 2 illustrates a perspective view of the relative orientation of the permanent magnets of the magnetic coupler device of FIG. 1 for the exemplary off state of FIG. 1.

Referring to FIGS. 1 and 2, permanent magnets 12, 14 of magnetic coupling device 10 are arranged in the off state. In the off state, permanent magnet 12 is rotated relative to permanent magnet 14 such that the S-pole portion 18 of permanent magnet 12 is adjacent the N-pole portion 22 of permanent magnet 14 and the N-pole portion 20 of permanent magnet 12 is adjacent the S-pole portion 24 of permanent magnet 14 (shown in FIG. 2). Permanent magnets 12, 14 each act essentially as a dipole having a magnetization axis MA which is perpendicular to a vertical plane dividing the respective N-pole portions 20, 22 from the respective S-pole portions 18, 24. In the arrangement shown in FIG. 2, S-pole portion 18 of permanent magnet 12 is aligned with the N-pole portion 22 of permanent magnet 14 and the N-pole portion 20 of permanent magnet 12 is aligned with the S-pole portion 24 of permanent magnet 14 such that the magnetization axis MA of permanent magnet 12 is parallel to the magnetization axis MA of permanent magnet 14.

In the off state, the majority of the magnetic flux of permanent magnets 12, 14 remains in housing 28 as part of a first magnetic circuit between permanent magnets 12, 14 and is not available at the workpiece contact interfaces 17, 17' of pole shoes 16', 16" to pass through ferromagnetic workpiece 27 as shown in FIG. 1. It is contemplated that in some embodiments, a portion of the magnetic flux of permanent magnets 12, 14, is available at the workpiece contact interfaces 17', 17" of pole shoes 16', 16" to pass through ferromagnetic workpiece 27, but is not preferred. In one example, up to 4% percent of the magnetic flux produced by permanent magnets 12, 14 is available at the workpiece contact interfaces 17', 17" of pole shoes 16', 16" to pass through ferromagnetic workpiece 27 in the off state. In another example, up to 1% percent of the magnetic flux produced by permanent magnets 12, 14 is available at the workpiece contact interfaces 17', 17" of pole shoes 16', 16" to pass through ferromagnetic workpiece 27 in the off state.

In a second state referred to herein as an on state, permanent magnet 12 has a second position relative to the permanent magnet 14 to provide a second level of magnetic flux available to the ferromagnetic workpiece at the workpiece contact interfaces 17', 17" of the pole shoes 16', 16". In the on state, the second level of magnetic flux available to the ferromagnetic workpiece at the workpiece contact interfaces 17', 17" of the pole shoes 16', 16" is higher than the first level of the off state and is sufficient to lift the ferromagnetic workpiece with the magnetic coupling device 10.

Figure 4:
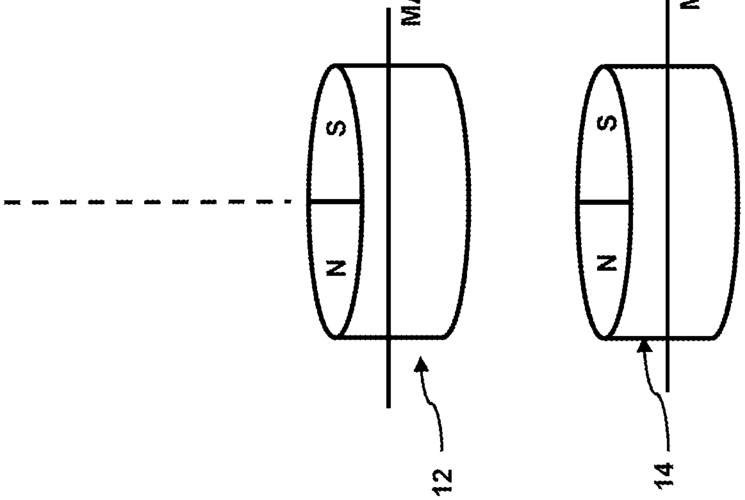
FIG. 4 illustrates a perspective view of the relative orientation of the permanent magnets of the magnetic coupler device of FIG. 1 for the exemplary on state of FIG. 3.
Figure 3:
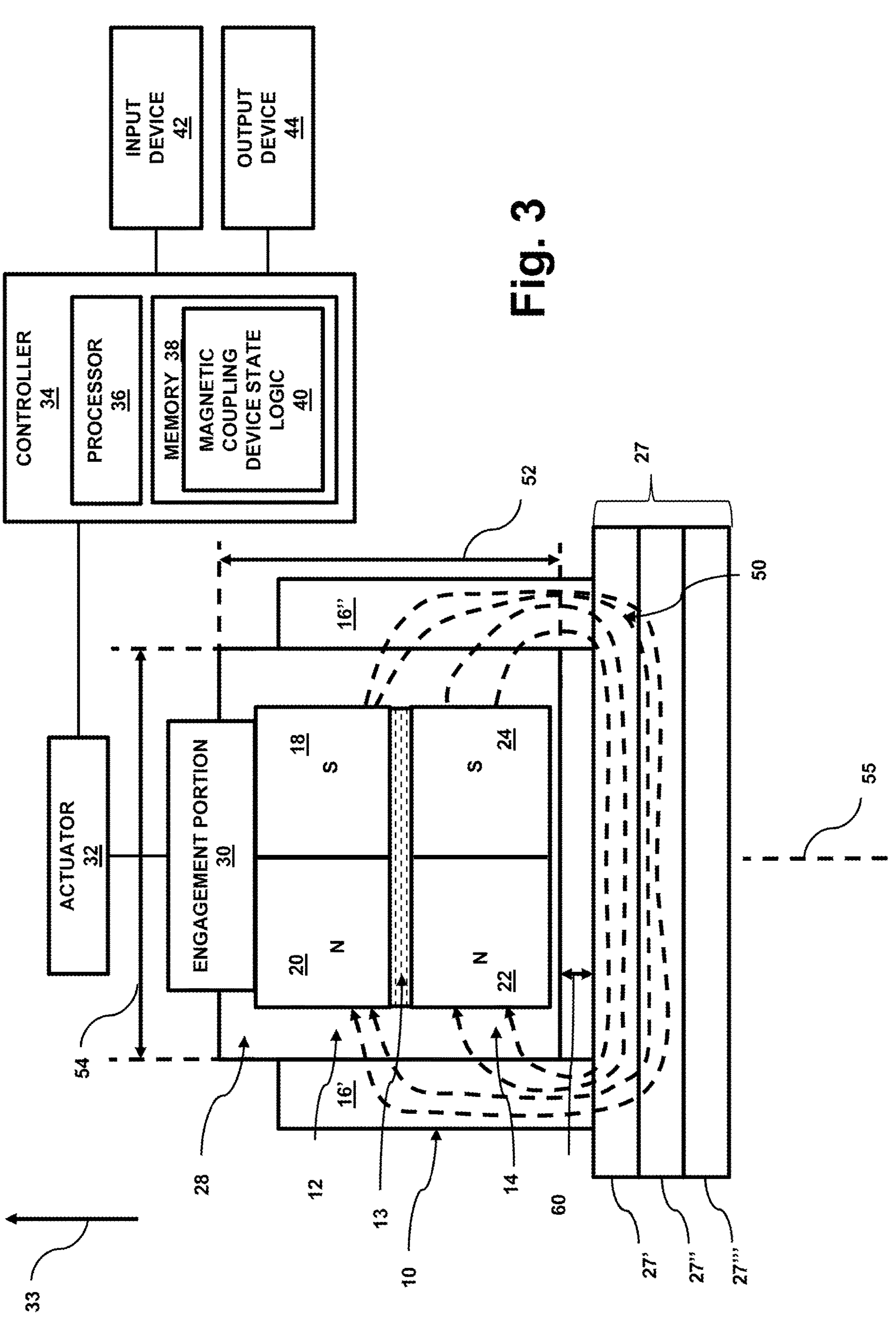
FIG. 3 illustrates a front representative view of the exemplary switchable magnetic coupler device of FIG. 1 in an exemplary on state positioned on top of the stack of ferromagnetic workpieces illustrated in FIG. 1.

Referring to FIGS. 3 and 4, permanent magnets 12, 14 of magnetic coupling device 10 are arranged in the on state. In the on state, permanent magnet 12 is rotated relative to permanent magnet 14 such that the S-pole portion 18 of permanent magnet 12 is adjacent the S-pole portion 24 of permanent magnet 14 and the N-pole portion 20 of permanent magnet 12 is adjacent the N-pole portion 22 of permanent magnet 14 (shown in FIG. 4). In the arrangement shown in FIG. 4, S-pole portion 18 of permanent magnet 12 is aligned with the S-pole portion 24 of permanent magnet 14 and the N-pole portion 20 of permanent magnet 12 is aligned with the N-pole portion 22 of permanent magnet 14 such that the magnetization axis MA of permanent magnet 12 is parallel to the magnetization axis MA of permanent magnet 14.

In the on state, the majority of the magnetic flux of permanent magnets 12, 14 is available at the workpiece contact interfaces 17', 17" of pole shoes 16', 16" to pass through ferromagnetic workpiece 27 as shown in FIG. 3. In the on-state, one or more workpieces 27 being made of a ferromagnetic material, such as iron or steel, are held by the switchable magnetic device 10 due to a completion of the magnetic circuit from the aligned or substantially aligned N-pole portions 20, 22 of the upper and lower magnets 12, 14, respectively, through the housing 28 and pole shoe 16', through one or more workpiece sheets 27, through pole shoe 16" and housing 28, and to the aligned or substantially aligned S-pole portions 18, 24 of the upper and lower magnets 12, 14, respectively. The workpiece contact interface 17' of pole shoe 16' functions as a North pole of switchable magnetic device 10. The workpiece contact interface 17" of pole shoe 16" functions as a South pole of switchable magnetic device 10.

In a third state referred to herein as a partial on state, permanent magnet 12 has a third position relative to the permanent magnet 14 to provide a third level of magnetic flux available to the ferromagnetic workpiece at the workpiece contact interfaces 17', 17" of the pole shoes 16', 16". In the partially on state, the third level of magnetic flux available to the ferromagnetic workpiece at the workpiece contact interfaces 17', 17" of the pole shoes 16', 16" is higher than the first level of the off state, is lower than the second level of the on state, and is sufficient to lift the ferromagnetic workpiece with the magnetic coupling device 10. In embodiments, magnetic coupling device 10 may be placed in multiple partial on states.

Figure 7:
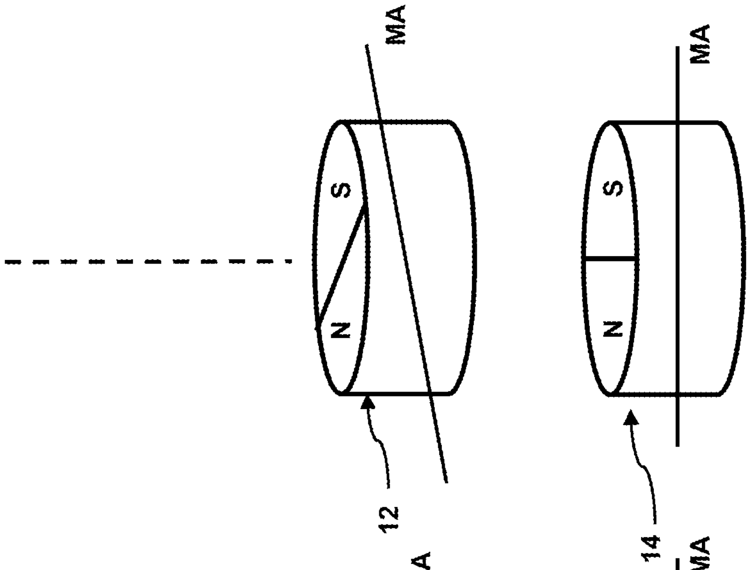
FIG. 7 illustrates a perspective view of the relative orientation of the permanent magnets of the magnetic coupler device of FIG. 1 for the exemplary partially on state of FIG. 6.
Figure 6:
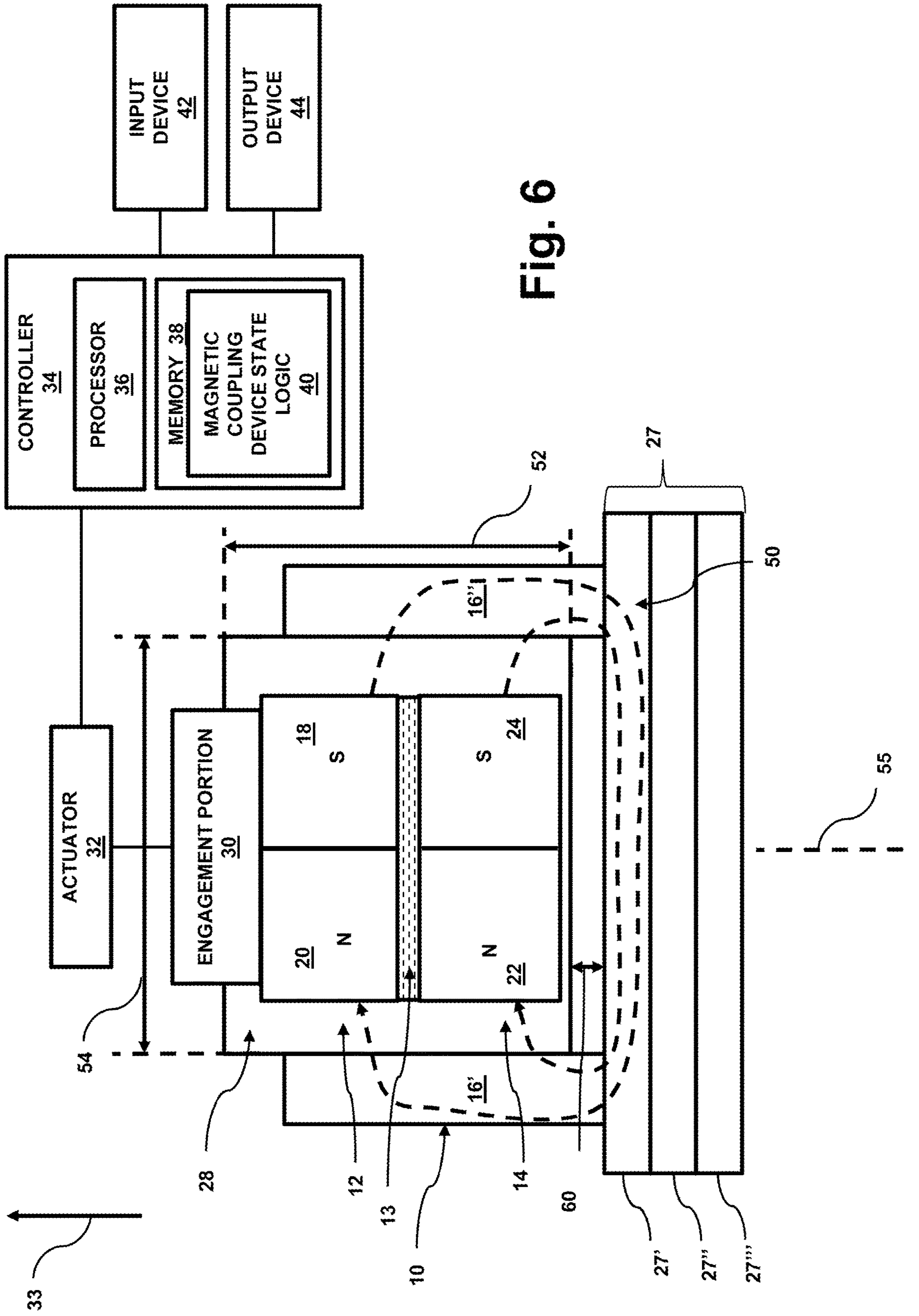
FIG. 6 illustrates a front representative view of the exemplary switchable magnetic coupler device of FIG. 1 in an exemplary partially on state.

Referring to FIGS. 6 and 7, permanent magnets 12, 14 of magnetic coupling device 10 are arranged in the partial on state. In the partial on state, permanent magnet 12 is rotated relative to permanent magnet 14 such that the magnetization axis MA of permanent magnet 12 is angled relative to the magnetization axis MA of permanent magnet 14. In a first partial on state the S-pole portion 18 of permanent magnet 12 is adjacent the S-pole portion 24 of permanent magnet 14 and the N-pole portion 20 of permanent magnet 12 is adjacent the N-pole portion 22 of permanent magnet 14 (shown in FIG. 4). In a second partial on state the S-pole portion 18 of permanent magnet 12 is adjacent the N-pole portion 22 of permanent magnet 14 and the N-pole portion 20 of permanent magnet 12 is adjacent the S-pole portion 24 of permanent magnet 14. In one example, in the partial on state, the magnetization axis MA of permanent magnet 12 is angled relative to the magnetization axis MA of permanent magnet 14 by 0.5° (relative to S-pole portion 18 of permanent magnet 12 being aligned with the S-pole portion 24 of permanent magnet 14) up to about 179.5°. In another example, in the partial on state, the magnetization axis MA of permanent magnet 12 is angled relative to the magnetization axis MA of permanent magnet 14 by 5° (relative to S-pole portion 18 of permanent magnet 12 being aligned with the S-pole portion 24 of permanent magnet 14) up to about 175°. In a further example, in the partial on state, the magnetization axis MA of permanent magnet 12 is angled relative to the magnetization axis MA of permanent magnet 14 by 15° (relative to S-pole portion 18 of permanent magnet 12 being aligned with the S-pole portion 24 of permanent magnet 14) up to about 165°.

In each of the partial on states, a portion of the magnetic flux of permanent magnets 12, 14 is available at the workpiece contact interfaces 17', 17" of pole shoes 16', 16" to pass through ferromagnetic workpiece 27 as shown in FIG. 3 and a portion of the magnetic flux of permanent magnets 12, 14 remain in the housing due to the angled nature of the magnetization axes of permanent magnets 12, 14. In each of the partial on states, one or more workpieces 27 being made of a ferromagnetic material, such as iron or steel, may be held by switchable magnetic device 10 due to a completion of the magnetic circuit from the angled N-pole portions 20, 22 of the upper and lower magnets 12, 14, respectively, through the housing 28 and pole shoe 16', through one or more workpiece sheets 27, through pole shoe 16" and housing 28, and to the angled S-pole portions 18, 24 of the upper and lower magnets 12, 14, respectively. The workpiece contact interface 17' of pole shoe 16' functions as a North pole of switchable magnetic device 10. The workpiece contact interface 17" of pole shoe 16" functions as a South pole of switchable magnetic device 10.

As explained in more detail herein, by being able to position and maintain magnetic switching device 10 in at least three states, the ability of configuring magnetic coupling device 10 for destacking ferromagnetic workpieces arranged in a stack is enhanced and the ability to use magnetic coupling device 10 for multiple different types of ferromagnetic workpieces is enhanced.

Figure 5:
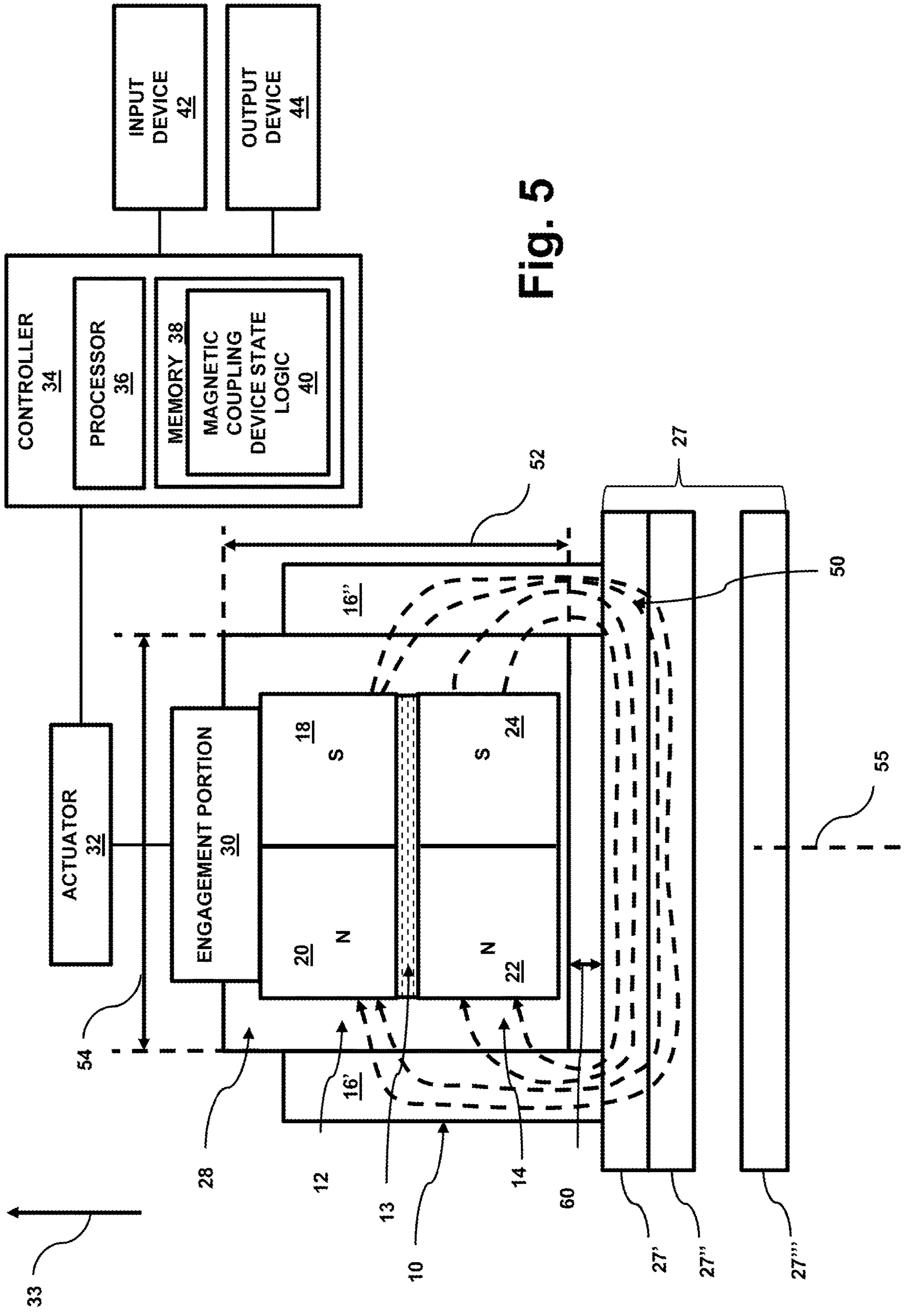
FIG. 5 illustrates the magnetic coupler device of FIG. 1 in the exemplary on state of FIG. 3 being moved upward along with a plurality of sheets of the stack of ferromagnetic workpieces illustrated in FIG. 1.
Figure 8:
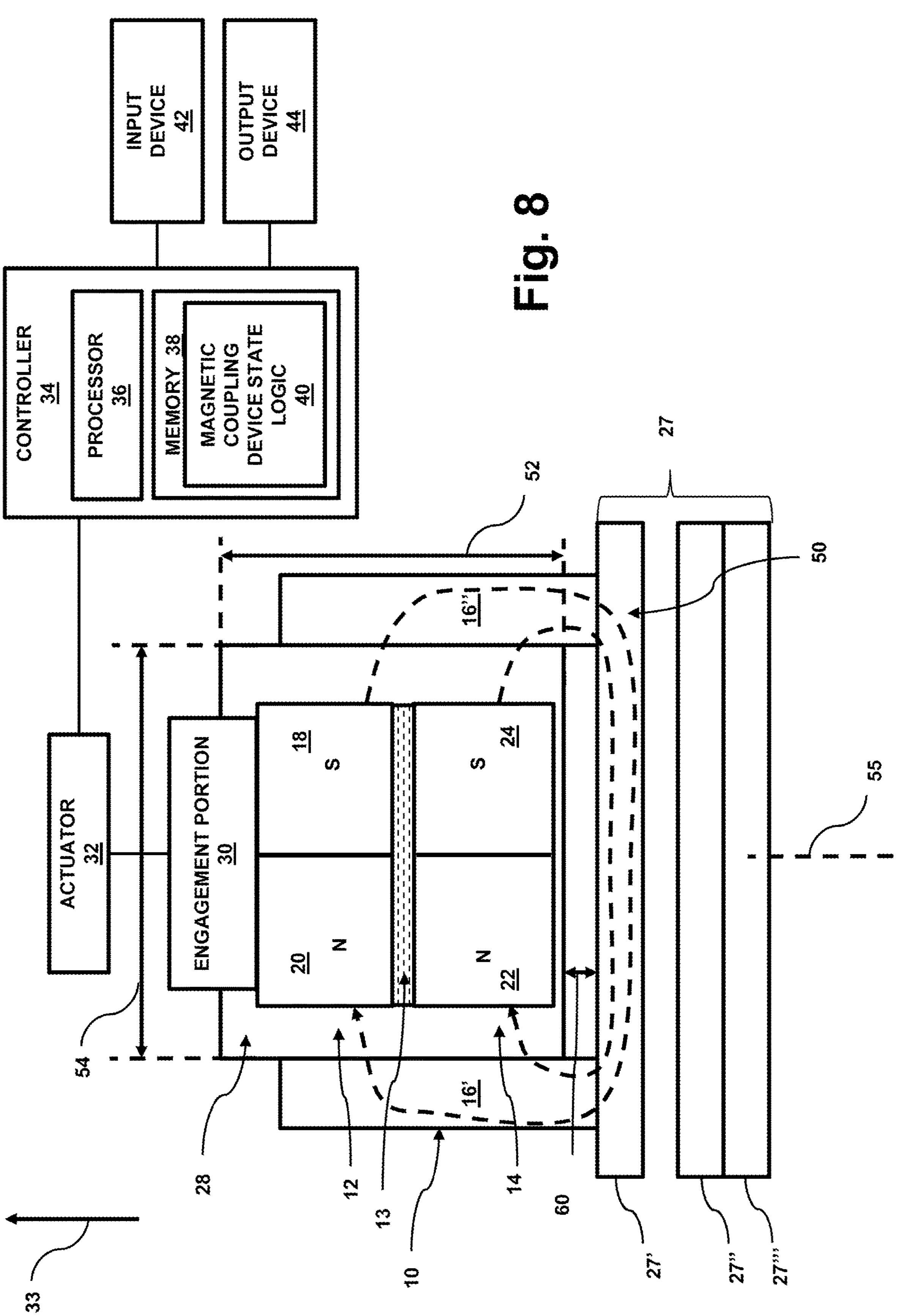
FIG. 8 illustrates the magnetic coupler device of FIG. 1 in the exemplary partially on state of FIG. 6 being moved upward along with a top sheet of the stack of ferromagnetic workpieces illustrated in FIG. 1.

By way of example, in the on state shown in FIG. 3, magnetic coupling device 10 makes available to workpiece sheets 27 a level of magnetic flux that more than saturates the capacity of top sheet 27' and thus extends down into second from top sheet 27". If magnetic coupling device 10 was raised in direction 33 in the on state both top sheet 27' and sheet 27" would be raised with magnetic coupling device 10 in direction 33, as shown in FIG. 5. Thus, magnetic device 10 did not destack sheet 27' from the remainder of the stack of sheets 27. However, by configuring magnetic coupling device 10 in a partial on state shown in FIG. 6, magnetic coupling device 10 makes available to workpiece sheets 27 a level of magnetic flux that holds top sheet 27' to magnetic coupling device 10 with sufficient holding force to lift top sheet 27', but does not hold the second from the top sheet 27" to magnetic coupling device 10 with sufficient holding force to lift second sheet 27". Thus, if magnetic coupling device 10 was raised in direction 33 in the partial on state of FIG. 6 only top sheet 27' would be raised with magnetic coupling device 10 in direction 33, as shown in FIG. 8. Although FIG. 6, illustrates the magnetic flux being confined to top sheet 27', in some embodiments, a portion of the magnetic flux provided to workpiece sheets 27 by magnetic coupling device 10 may enter sheet 27" of workpiece sheets 27, but not to a level that results in sheet 27" being lifted by magnetic coupling device 10 along with workpiece sheet 27'.

Figure 9:
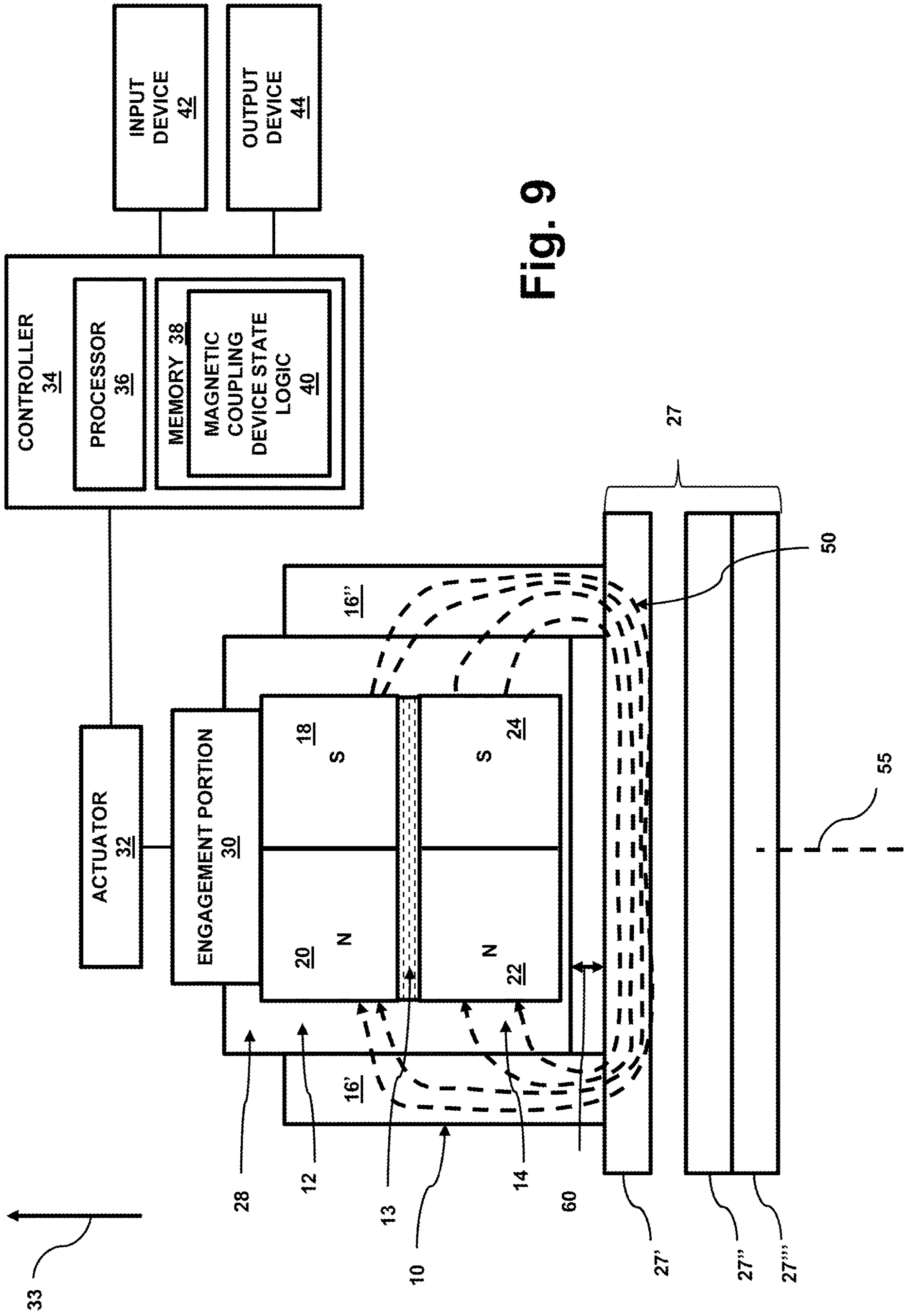
FIG. 9 illustrates the magnetic coupler device of FIG. 8 having been moved upward and being transitioned from the exemplary partially on state of FIG. 6 to the exemplary on state of FIG. 3.

Once raised in direction 33, magnetic coupling device 10 may be configured in the on state or an additional partial on state having a level of magnetic flux available to the workpiece contact interfaces 17', 17" of pole shoes 16',16" between the previously disclosed partial on state of FIG. 6 and the on state of FIG. 3 to increase the holding force between magnetic coupling device 10 and sheet 27', as illustrated in FIG. 9. For example, the level of magnetic flux available to the workpiece contact interfaces 17', 17" of pole shoes 16',16" in FIG. 6 is sufficient to destack ferromagnetic workpiece 27' from the remainder of the stack of workpieces 27 and once separated the level of magnetic flux available to the workpiece contact interfaces 17', 17" of pole shoes 16',16" in FIG. 6 is increased to a level to move the workpiece at a required speed limited by a maximum magnetic flux saturation capacity of workpiece 27'. In one example, as mentioned herein, magnetic coupling device 10 is an end-of-arm tool of a robotic system 700 and the required speed is the speed of a robotic arm 704 of robotic system 700 as it moves between poses (see FIG. 25A).

Returning to FIG. 1, magnetic coupling device 10 includes an engagement portion 30 and an actuator 32. Engagement portion 30 couples actuator 32 to permanent magnet 12 such that actuator 32 may reorient permanent magnet 12 relative to permanent magnet 14. Exemplary engagement portions 30 include one or more recesses in permanent magnet 12 and/or a housing supporting permanent magnet 12, one or more protrusions extending from permanent magnet 12 and/or a housing supporting permanent magnet 12, and/or one or more linkages or gear systems coupled to permanent magnet 12 and/or a housing coupled to permanent magnet 12. Exemplary actuators include rotary actuators and linear actuators, each of which through engagement portion 30 reorient permanent magnet 12 relative to permanent magnet 14.

Exemplary engagement portions and actuators are disclosed in U.S. Pat. No. 7,012,495, titled SWITCHABLE PERMANENT MAGNETIC DEVICE; U.S. Pat. No. 7,161,451, titled MODULAR PERMANENT MAGNET CHUCK; U.S. Pat. No. 8,878,639, titled MAGNET ARRAYS, U.S. Provisional Patent Application No. 62/248,804, filed Oct. 30, 2015, titled MAGNETIC COUPLING DEVICE WITH A ROTARY ACTUATION SYSTEM, German Utility Model DE202016006696U1; U.S. Provisional Patent Application No. 62/252,435, filed Nov. 7, 2015, titled MAGNETIC COUPLING DEVICE WITH A LINEAR ACTUATION SYSTEM, and U.S. patent application Ser. No. 15/964,884, filed Apr. 27, 2018, titled MAGNETIC COUPLING DEVICE WITH AT LEAST ONE OF A SENSOR ARRANGEMENT AND A DEGAUSS CAPABILITY, the entire disclosures of which are herein expressly incorporated by reference.

In embodiments, actuator 32 may be an electric motor, a pneumatic drive system, a hydraulic drive system, or other suitable systems for reorienting permanent magnet 12 relative to permanent magnet 14. In embodiments, actuator 32 is coupled to controller 34 which controls the operation of the respective actuator 32 and hence the alignment of permanent magnet 12 relative to permanent magnet 14 through engagement portion 30. In embodiments, controller 34 is an electronic controller which controls the operation of the respective actuator 32.

As illustrated in FIG. 1, electronic controller 34 includes a processor 36 with an associated computer readable medium, illustratively memory 38. Memory 38 includes a magnetic coupler state logic 40 which when executed by processor 36 causes electronic controller 34 to instruct actuator 32 to move permanent magnet 12 so that magnetic coupling device 10 is placed in one of the plurality of states of magnetic coupling device 10. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. This disclosure contemplates other embodiments in which the magnetic coupler state logic is not microprocessor-based, but rather is configured to control operation of magnetic coupling device 10 based on one or more sets of hardwired instructions and/or software instructions stored in memory 38. Further, electronic controller 34 may be contained within a single device or be a plurality of devices networked together to provide the functionality described herein.

In embodiments, electronic controller 34 changes the state of magnetic coupling device 10 in response to an input signal received from an input device 42. Exemplary input devices include switches, buttons, touch screens, microphones, detectors, controllers, and other devices whereby an operator may provide one of a tactile, audio, or visual input command For example, in one embodiment, magnetic coupling device 10 is coupled to an end of arm of a robotic arm and input device 42 is a network interface over which controller 34 receives instructions from a robot controller on when to place magnetic coupling device 10 in one of the plurality of states of magnetic coupling device 10. Exemplary network interfaces include a wired network connection and a wireless network connection including one or more of an antenna, an optical receiver or transceiver, or other suitable wireless communication receivers or transceivers. While the embodiments discussed herein relate to electronic, pneumatic, or hydraulic actuation, in alternative embodiments, a version of the magnetic coupling device is provided without electronic controller 34 and is actuated manually. Exemplary manual actuators include handles, knobs, and other devices actuatable by a human operator. By contrast, electronic controller 34 of magnetic coupling device 10 is able to control actuator 32 automatically without human intervention. Thus, electronic controller 34 may execute logic which places magnetic device 10 in a series of states automatically based on parameters of the logic, at least one of the states being a partial on state. In embodiments, the functionality of magnetic coupling device state logic 40 is executed by controller 770 of robot system 700 or other remote processing device.

Magnetic coupling device 10 further includes one or more output devices 44. Exemplary output devices include visual output devices and audio output devices. Exemplary visual output devices include lights, display screens, and other types of visual indicators or communication devices. Exemplary audio output devices include speakers and other types of audio indicator devices.

Figure 10:
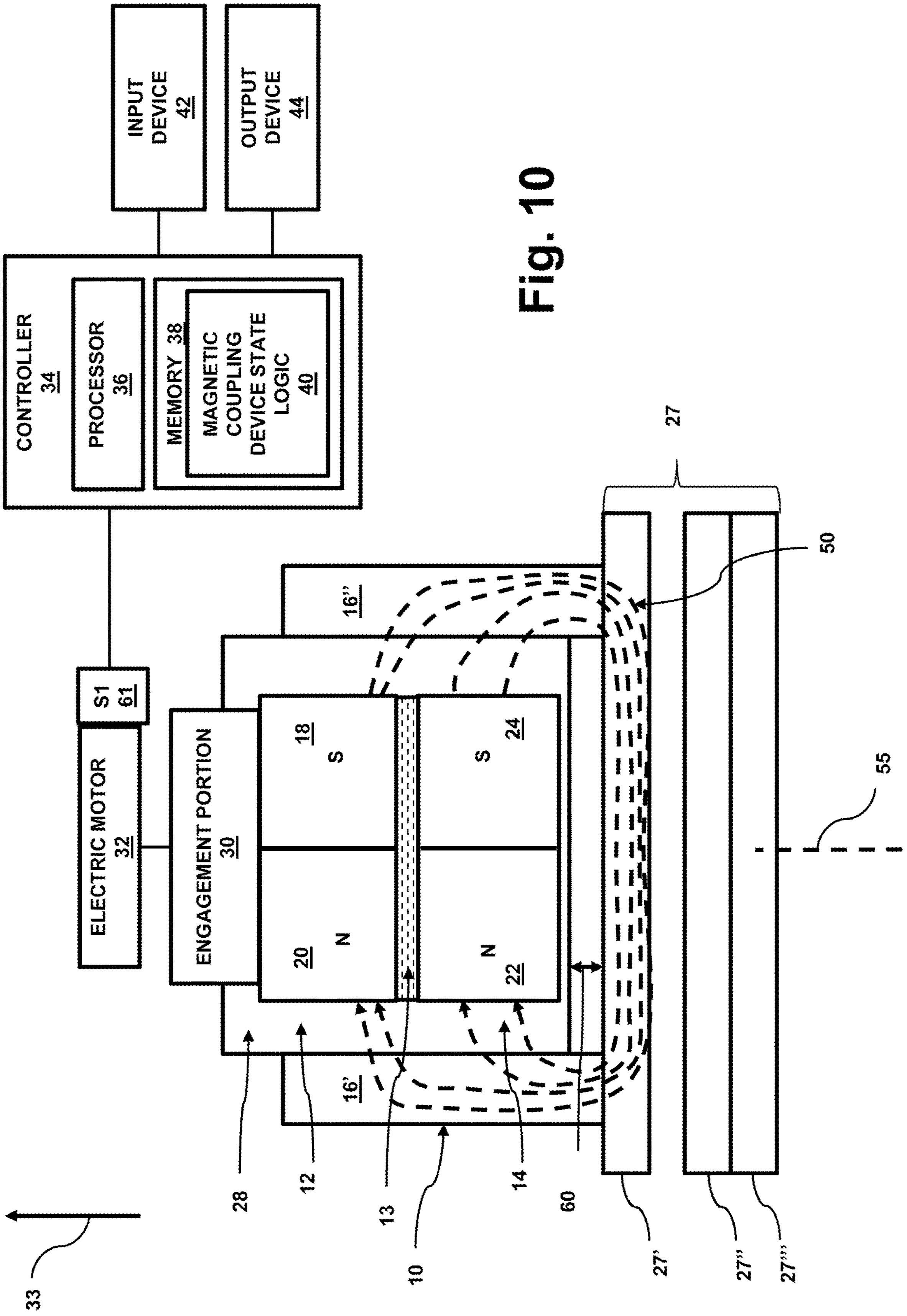
FIG. 10 illustrates the arrangement of FIG. 9 with the magnetic coupler device including an electric motor for the actuator and a first exemplary sensing system.
Figure 11:
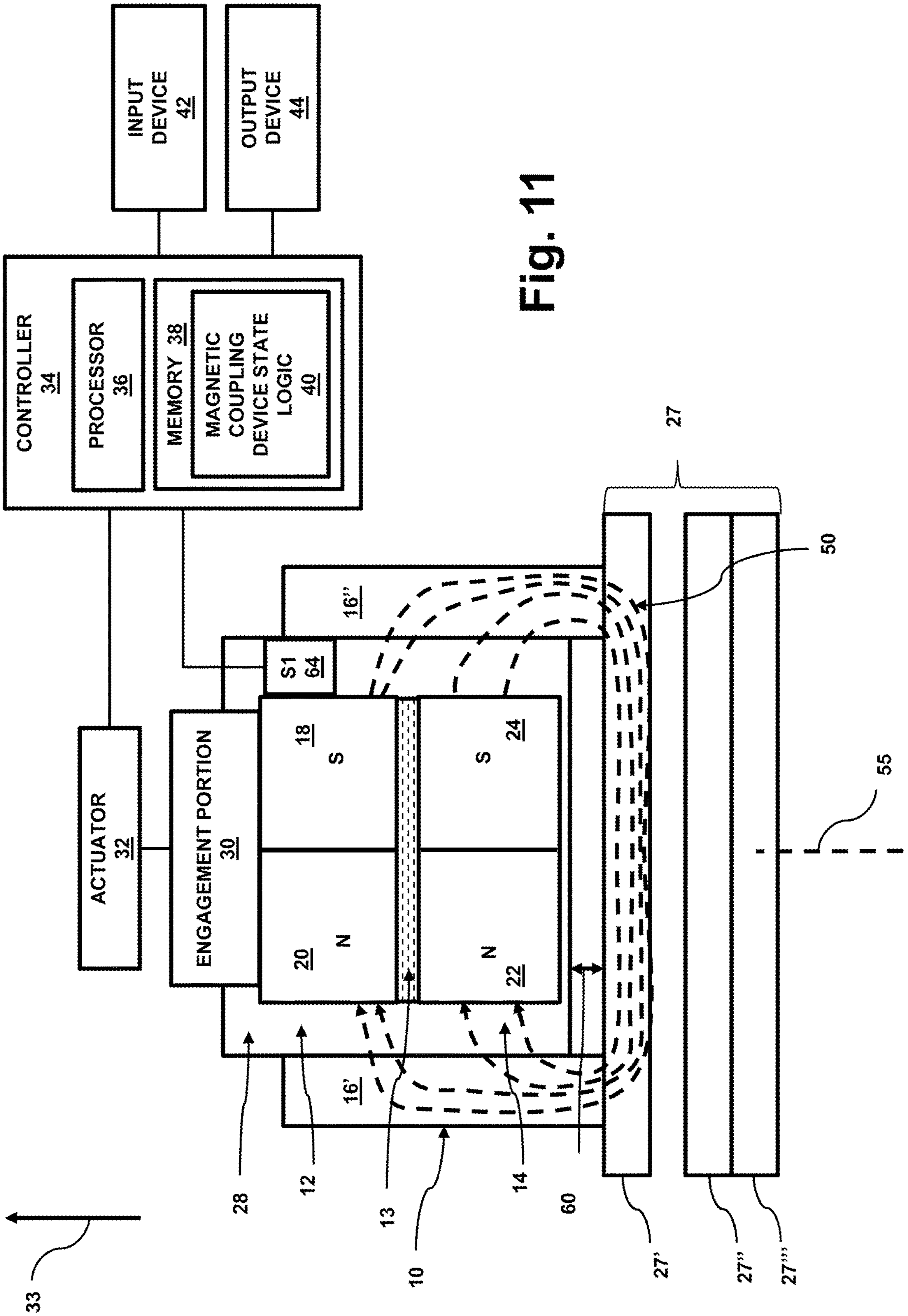
FIG. 11 illustrates the arrangement of FIG. 9 with the magnetic coupler device including a second exemplary sensing system.
Figure 12:
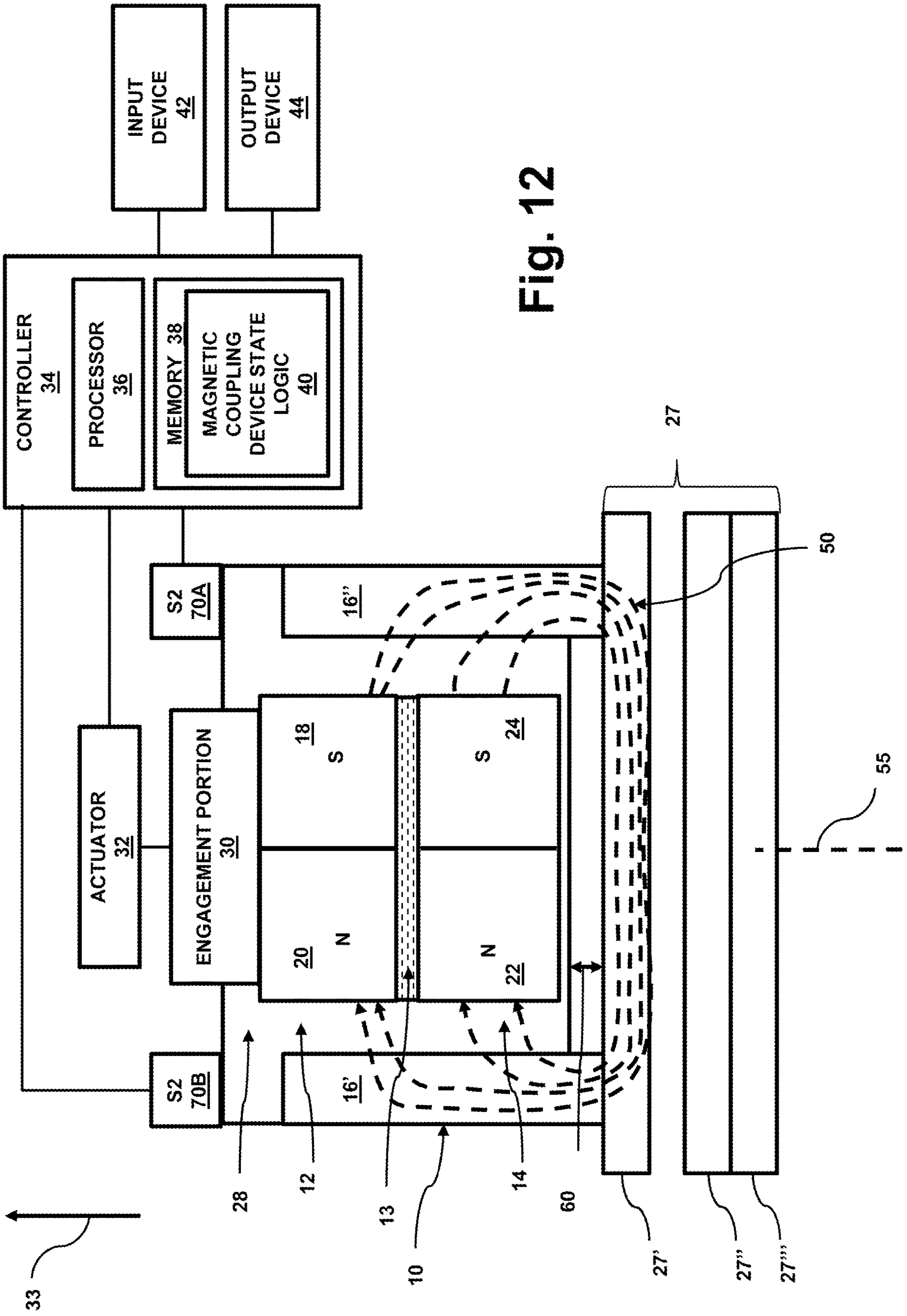
FIG. 12 illustrates the arrangement of FIG. 9 with the magnetic coupler device including a third exemplary sensing system.

Referring to FIGS. 10-12, exemplary sensor systems of magnetic coupling device 10 are disclosed. Referring to FIG. 10, actuator 32 is an electric motor 58. A first sensor 60 is provided that monitors a characteristic of electric motor 58. Electric motor 58 may include feedback electronics to regulate its motion. In one example, a DC motor is provided with limit switches or encoder and a proportional-integral-derivative controller to drive permanent magnet 12 through a particular motion range.

In another example, a stepper motor is provided. The stepper motor may be operated in open loop assuming it has sufficient drive torque to actuate the unit without losing steps. A sensor may be provided to assist in establishing the angular position of the output, such as a shaft or aperture to receive a shaft, of the stepper motor and hence the position of permanent magnet 12. For example, first sensor 61 counts the pulses used to drive the stepper motor and determines the angular position of the shaft of the stepper motor based on the number of pulses. Permanent magnet 12 is moved relative to permanent magnet 14 to a defined position by the steps the motor moves by counting the number of pulses. In another example, a stepper motor is provided that integrates an encoder with the stepper to check that the proper actuation angle is maintained.

An exemplary pneumatic rotary actuator is a semi rotary actuator with a rotary vane, or a semi-rotary actuator driven by linear pneumatic pistons coupled to a central output shaft by rack and pinon.

Figure 33:
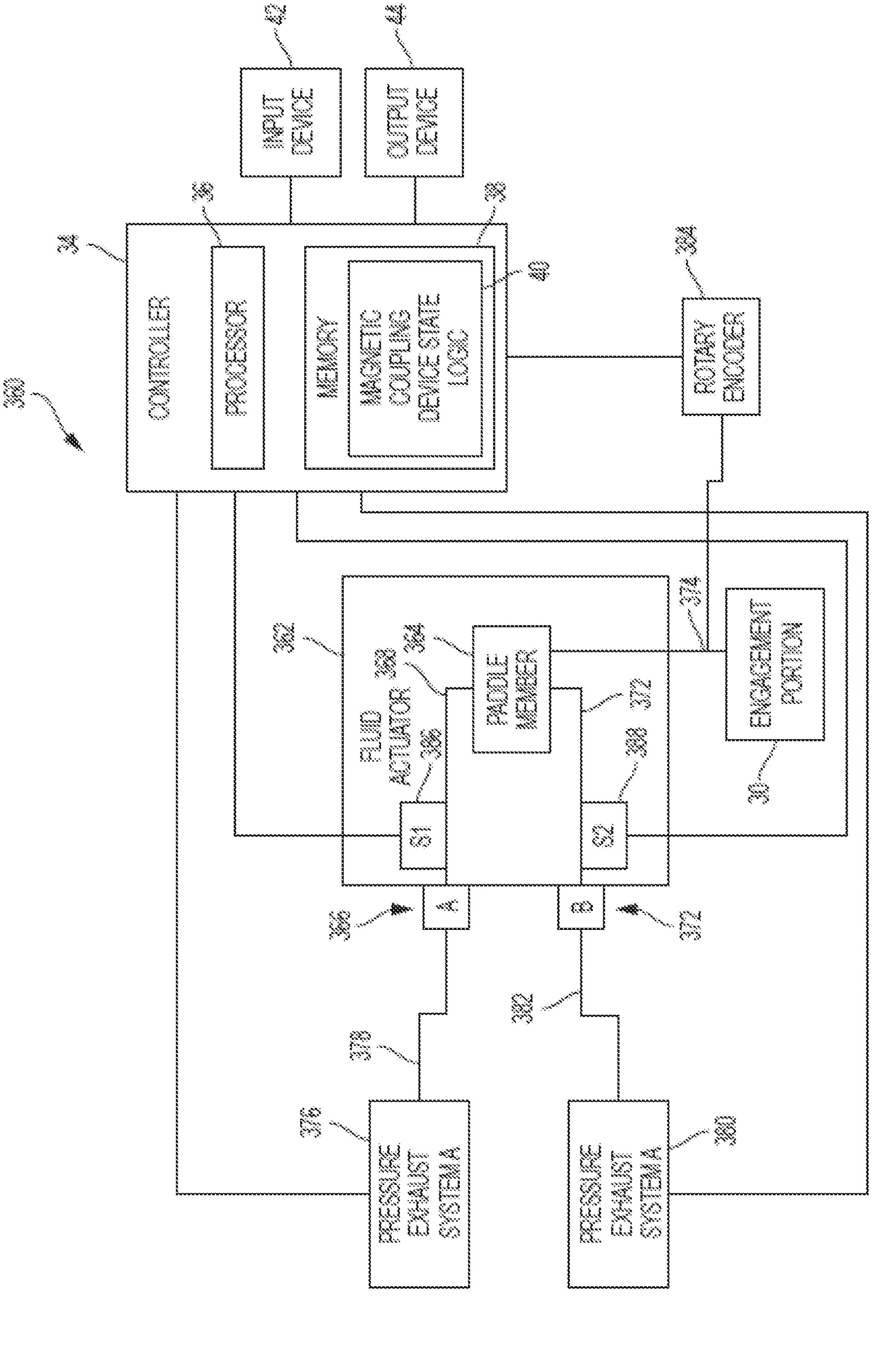
FIG. 33 illustrates a representative view of an exemplary fluid, pneumatic or hydraulic, actuator system.

Referring to FIG. 33, an exemplary fluid, pneumatic or hydraulic, actuator system 360 is illustrated. A pneumatic actuator uses a gas as a working fluid. A hydraulic actuator uses a liquid as a working fluid. Actuator system 360 includes a fluid actuator having a housing 362 and an internal paddle 364 which is in fluid communication with an A port 366 through fluid line 368 and a B port 370 through fluid line 372. Conventional fluid actuator systems pressurize fluid line 368 and exhaust fluid line 372 to rotate paddle 364 to a first limit position and pressurize fluid line 372 and exhaust fluid line 368 to rotate paddle 364 to a second limit position. The rotation of paddle 364 causes a rotation in an output 374 which is operatively coupled to engagement portion 30. A first limit position may be the on state position of magnet 12 and the second limit position may be the off state position of magnet 12.

Controller 34 is coupled to a pressure/exhaust system 376 which is in fluid communication with A port 366 through a fluid line 378 and to a pressure/exhaust system 380 which is in fluid communication with B port 370 through a fluid line 382. In embodiments, pressure/exhaust system 376 and pressure/exhaust system 380 are a single system. Each of pressure/exhaust system 376 and pressure/exhaust system 380 may either supply the working fluid to the respective A port 366 and B port 370 or exhaust the working fluid from the respective A port 366 and B port 370.

Controller 34, through pressure/exhaust system 376 and pressure/exhaust system 380 establishes a desired pressure on each side of paddle 364 to hold paddle 364 at an intermediate position, such as for a desired partial on state, between the first limit position and the second limit position of paddle 364. In embodiments, controller 34 stores in memory 38 a desired fluid characteristic of the working fluid, such as pressure or other suitable fluid characteristics, corresponding to various desired intermediate positions. Further, controller 34 monitors the fluid characteristics, such as pressures or other suitable fluid characteristics, associated with both sides of paddle 364 through sensors 386, 388. In embodiments, controller 34 further monitors another fluid characteristic of the working fluid, the flow of the working fluid through fluid lines 368, 372. In embodiments, fluid actuator 360, instead of and/or in addition to monitoring a fluid characteristic of the working fluid, monitors a rotary position of output 374 of the fluid actuator 362. For example, in embodiments, output 374 is an output shaft and a sensor 384, illustratively a rotary encoder sensor system, is used to monitor a rotational position of the output shaft. In one example, wherein fluid actuator 362 is a hydraulic actuator, a volume of flow of the working fluid is monitored by controller 34. In another example, wherein fluid actuator 362 is a pneumatic actuator, the rotary position of output 374 of the fluid actuator 362 is monitored by controller 34.

In another embodiment, first sensor 61 is a current sensor which monitors a current draw of electric motor 58. Based on the position of permanent magnet 12 relative to permanent magnet 14, the amount of current drawn by electric motor 58 changes due to changes in the required torque to move permanent magnet 12 relative to permanent magnet 14. By measuring motor current drawn by motor 58 as a function of the position of permanent magnet 12, the rotation position of permanent magnet 12 may be inferred by comparison to a table of values stored on memory 38 or a function stored on memory 38. In one example, the table of values includes rows of the position of permanent magnet 12 relative to permanent magnet 14 and the corresponding current draw of motor 58 when the workpiece interfaces 17', 17" of magnetic coupling device 10 are contacting workpiece 27. The corresponding current draw values are experimentally determined by measuring the current draw of motor 58 for various positions of permanent magnet 12 relative to permanent magnet 14 when the workpiece interfaces 17', 17" of magnetic coupling device 10 are contacting workpiece 27.

Further, the positioning of the magnetic coupling device 10 in close proximity with ferromagnetic workpiece 27 alters the current required to move permanent magnet 12. Thus, a controlled actuation of the motor 58 over a range of motion as magnetic coupling device 10 approaches workpiece 27 may be used to determine a proximity of magnetic coupling device 10 to workpiece 27.

For example, as magnetic coupling device 10 approaches workpiece 27 motor 58 may be periodically actuated to move permanent magnet 12 relative to permanent magnet 14 from a first known position, such as the off position, to a second known position, such as a known partial on position, and subsequently returned to the first known position. The current draw to accomplish the actuation to move permanent magnet 12 relative to permanent magnet 14 from the first known position to the second known position may be compared to a table of values stored on memory 38 to infer proximity of the magnetic coupling device 10 to the workpiece 27. The table of values may include rows of the measured proximity of the workpiece interfaces 17', 17" of magnetic coupling device 10 relative to workpiece 27 and the corresponding measured current drawn by motor 58 for the actuation to move permanent magnet 12 relative to permanent magnet 14 from the first known position to the second known position at the measured proximity of the workpiece interfaces 17', 17" of magnetic coupling device 10 relative to workpiece 27.

Additionally, the coupling of multiple workpieces to magnetic coupling device 10 alters the current required to move permanent magnet 12 relative to permanent magnet 14 compared to the coupling of a single workpiece. Thus, by experimentally determining the current draw required to complete a controlled actuation of the motor 58 over a range of motion, a determination may be made whether the magnetic coupling device 10 is coupled to a single workpiece 27 or multiple workpieces.

Referring to FIG. 11, another sensor 64 is provided. Sensor 64 is provided to measure the rotational position of permanent magnet 12 and/or of a housing supporting permanent magnet 12. Exemplary sensors include optical sensors which monitor reflective strips affixed to permanent magnet 12 and/or a housing coupled to permanent magnet 12. Other sensor systems may be used to determine a rotational position of permanent magnet 12.

Referring to FIG. 12, another sensor system is shown including a plurality of magnetic flux sensors 70. The magnetic flux sensors 70 include a first sensor 70A positioned generally over pole shoe 16" and a second sensor 70B positioned generally over pole shoe 16'. Exemplary magnetic flux sensors include Hall effect sensors. Sensors 70A, 70B measure the leakage flux proximate to the respective north and south poles of magnetic coupling device 10. The amount of leakage flux at each sensor 70A, 70B varies based on the position of permanent magnet 12 relative to permanent magnet 14 and based on the amount of flux passing through the respective pole shoe 16', 16" workpiece contact interface 17', 17" to workpiece 27'. By monitoring the magnetic flux at locations opposite workpiece interface 17' of pole shoe 16' and opposite workpiece interface 17" of pole shoe 16", the relative position of permanent magnet 12 may be determined. In embodiments, magnetic working device 10 is positioned on top of workpiece 27 and the magnetic fluxes measured by sensors 70A, B are recorded as a function of position of permanent magnet 12 and a first set of measurements are assigned to a desired partial on position of permanent magnet 12. An exemplary sensing system having sensors 70 is disclosed in U.S. Provisional Application No. 62/490,705, titled SMART SENSE EOAMT, filed Apr. 27, 2017 and U.S. patent application Ser. No. 15/964,884, filed Apr. 27, 2018, titled MAGNETIC COUPLING DEVICE WITH AT LEAST ONE OF A SENSOR ARRANGEMENT AND A DEGAUSS CAPABILITY, the entire disclosures of which are expressly incorporated by reference herein. As explained in more detail in U.S. Provisional Application No. 62/490,705, titled SMART SENSE EOAMT, filed Apr. 27, 2017 and U.S. patent application Ser. No. 15/964,884, filed Apr. 27, 2018, titled MAGNETIC COUPLING DEVICE WITH AT LEAST ONE OF A SENSOR ARRANGEMENT AND A DEGAUSS CAPABILITY, additional sensors may be used to determine a proximity to a workpiece and to determine a quality of the magnetic connection between a magnetic coupling device and a workpiece.

As mentioned herein switchable magnetic coupling device 10 is capable to maintain the configurations of permanent magnets 12, 14 in each of the at least three states for an extended period of time, as explained in more detail herein. In one example, the current state of magnetic coupling device 10 is maintained until a different state is requested. In embodiments, actuator 32 is a stepper motor and the ability of the stepper motor to hold its output shaft at a current position also holds permanent magnet 12 at a current position and hence magnetic coupling device 10 in a current state.

Figure 13:
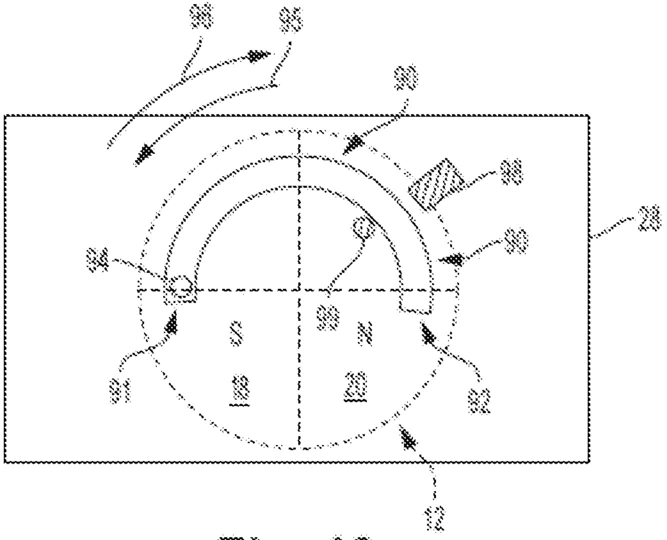
FIG. 13 illustrates a pin carried by the rotatable permanent magnet of the magnetic coupling device of FIG. 1 which is received in a recess in the housing of the magnetic coupling device of FIG. 1, the rotatable permanent magnet being in the off state of FIG. 1.
Figure 14:
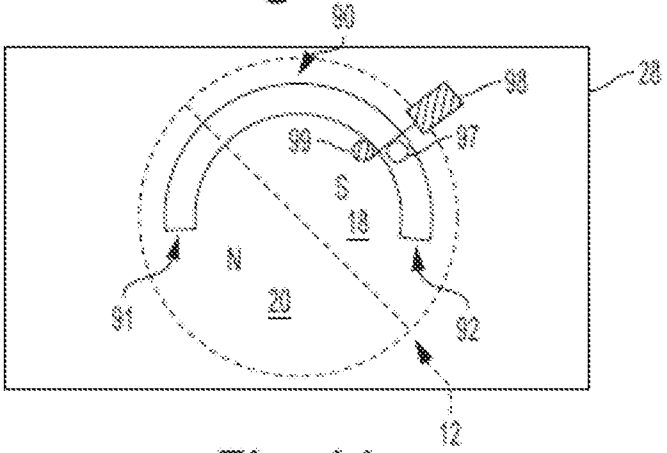
FIG. 14 illustrates the system of FIG. 13 with the rotatable permanent magnet being in the partial state of FIG. 6 and a blocker positioned to hold the rotational position of the rotatable permanent magnet.
Figure 15:
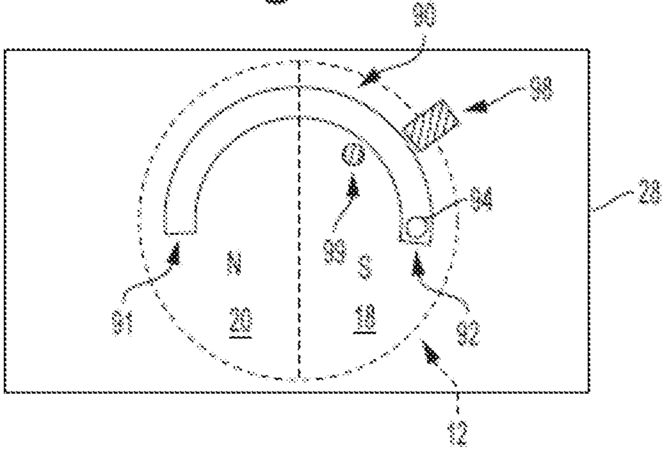
FIG. 15 illustrates the system of FIG. 13 with the rotatable permanent magnet being in the on state of FIG. 3.

Referring to FIGS. 13-15, another exemplary system for maintaining the position of permanent magnet 12 relative to permanent magnet 14 is shown. Referring to FIG. 13, housing 28 includes an arcuate recess 90 having a first end 91 and a second end 92. Recess 90 may be a groove on an internal surface of housing 28, such as in a lower side of a cover of housing 28. A pin 94 is coupled to permanent magnet 12 or to a housing rotatable with permanent magnet 12. Pin 94 extends into recess 90 of housing 28.

As shown in FIG. 13, permanent magnet 12 is positioned as shown in FIGS. 1 and 2, the off state for magnetic coupling device 10, and pin 94 is located at the first end 91 of recess 90. When pin 94 contacts first end 91 of recess 90 further rotation of permanent magnet 12 in direction 95 is prevented. Additionally, the magnet circuit completed between permanent magnets 12, 14 resist further rotation permanent magnet 12 due to the aligned states of the magnetization axes of permanent magnets 12, 14.

As shown in FIG. 15, permanent magnet 12 is positioned as shown in FIGS. 3 and 4, the on state for magnetic coupling device 10, and pin 94 is located at the second end 92 of recess 90. When pin 94 contacts second end 92 of recess 90 further rotation of permanent magnet 12 in direction 96 is prevented. In one example, the configuration shown in FIG. 15 is a partial on state due to an over rotation of permanent magnet 12 in direction 96 past the alignment of the magnetization axes of permanent magnets 12, 14. This over rotation of up to 5° results in permanent magnet 12 being biased to further rotation in direction 96 due to the attraction with permanent magnet 14, as opposed to being biased to rotate back in direction 95.

Referring to FIG. 14, permanent magnet 12 is positioned as shown in FIGS. 6 and 7, the partial on state for magnetic coupling device 10, and pin 94 is located at an intermediate position along recess 90. Pin 94 contacts a blocker 97 which prevents further rotation of permanent magnet 12 back in direction 95. Blocker 97 is a retractable pin extendable from a housing 98. In embodiments, pin 94 is retractable with an electrical solenoid. The position of blocker 97 is controlled by controller 34. Blocker 97 may be positioned in an open position wherein it is outside of an envelope of recess 90 as shown in FIGS. 13 and 15 and in a closed position wherein it extends over recess 90 to contact pin 94. An end of blocker 97 is positioned against a pin 99. Other systems may be used to maintain the position of permanent magnet 12 relative to permanent magnet 14. In embodiments, blocker 97 is carried by a moveable support which permits the positioning of blocker 97 at various locations along recess 90. Exemplary moveable supports include a base coupled to housing 28 through a ratchet system and a base having at least one indexing feature which cooperates with at least one indexing feature of housing 28 to position blocker 97 relative to recess 90. Exemplary indexing features include protrusions, such as pins, and recesses. In embodiments, the moveable support is moved under the control of an electrical motor.

In embodiments, magnetic coupling device 10 includes a brake, such as a frictional brake which may interact with a rotatable member coupled to permanent magnet 12. The frictional brake may be applied to maintain the current position of rotatable member and hence the current position of permanent magnet 12. In embodiments, controller 34 actuates the brake to hold the current position of permanent magnet 12 if power is interrupted to magnetic coupling device 10. In another embodiment, the brake is normally applied to hold the current position of permanent magnet 12 and is actuated to permit the movement of permanent magnet 12.

Figure 32A:
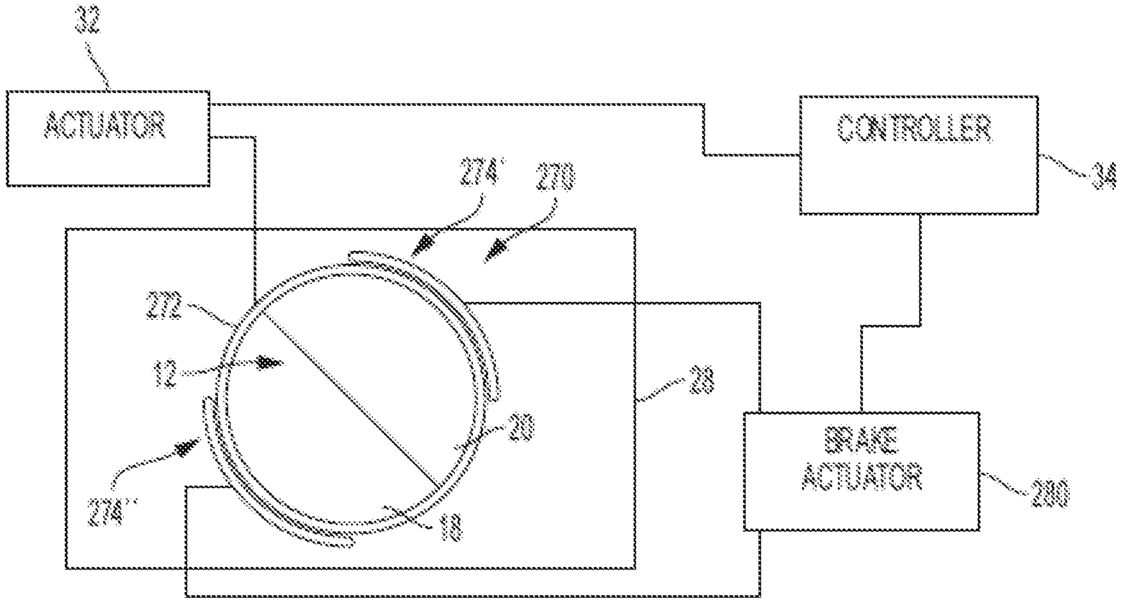
FIG. 32A illustrates an exemplary brake in an engaged state for the magnetic coupling device of FIG. 1.
Figure 32B:
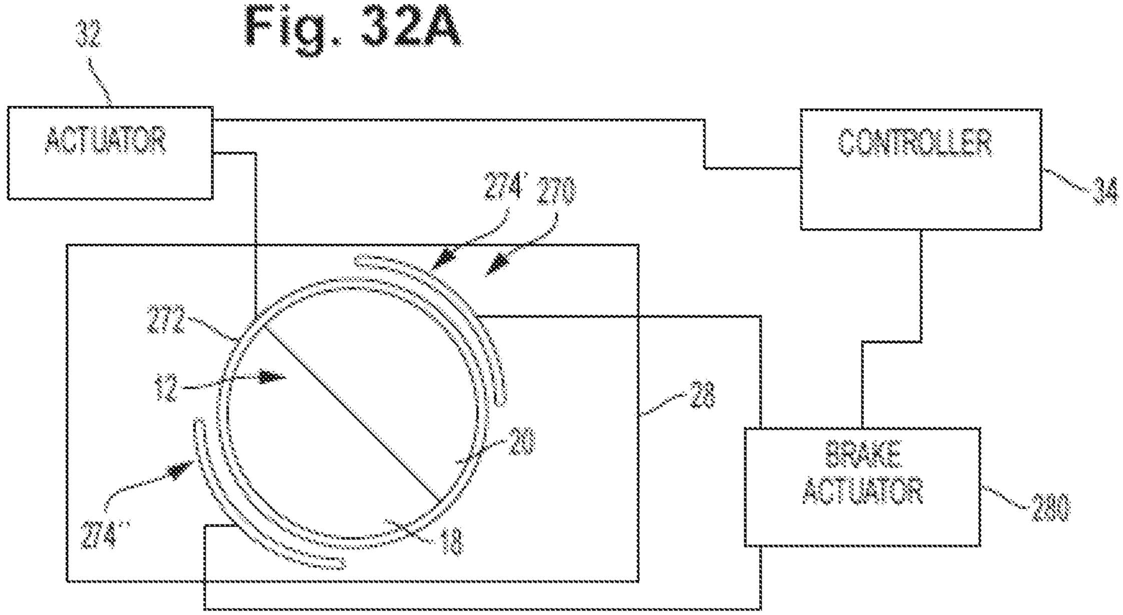
FIG. 32B illustrates the exemplary brake of FIG. 32A in a disengaged state.

Referring to FIGS. 32A and 32B, an exemplary brake 270 is illustrated. Permanent magnet 12 is housed in a housing 272 which acts as a pole extension. Further, housing 272 may be frictionally engaged by brake pads 274', 274" of brake 270. Brake pads 274', 274" are supported by housing 28. As shown in FIG. 32A, brake pads 274', 274" are engaged, illustrated as contacting housing 272, and prevent further rotation of permanent magnet 12 relative to housing 28. As shown in FIG. 32B, brake pads 274', 274" are disengaged, illustrated as spaced apart from housing 272, to allow further rotation of permanent magnet 12 relative to housing 28. The engagement and disengagement of brake pads 274', 274" relative to housing 272 is controlled by a brake actuator 280. Exemplary brake actuators include conventional hydraulic brake systems and pneumatic brake systems.

Figure 35:
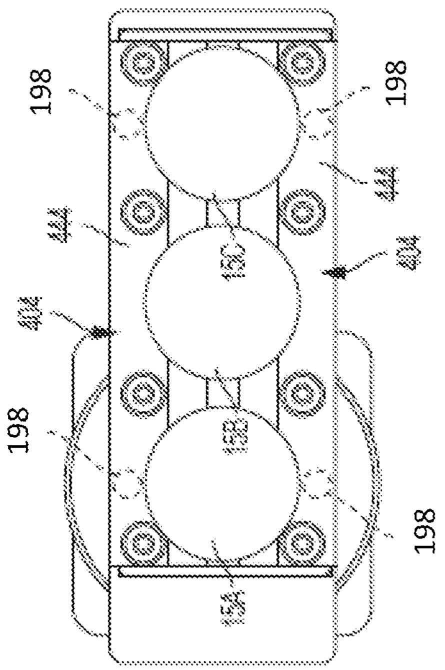
FIG. 35 illustrates a bottom view of the linear array magnetic coupling device of FIG. 34.
Figure 34:
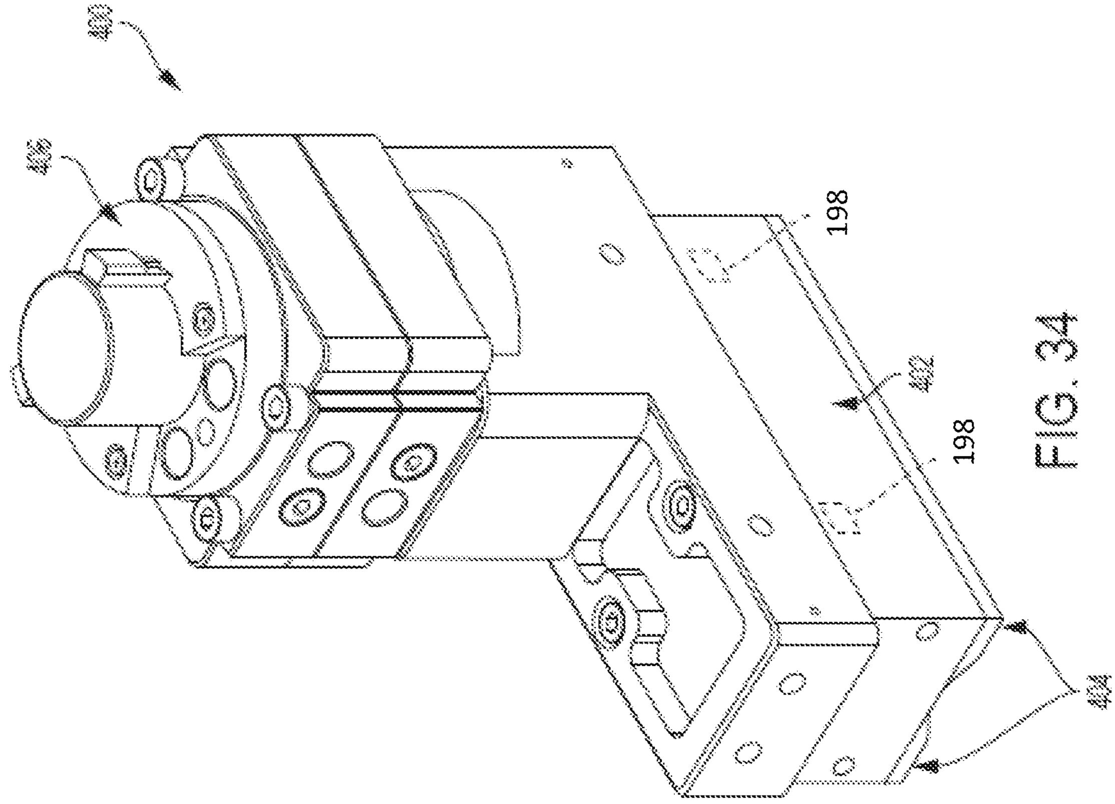
FIG. 34 illustrates a perspective view of an exemplary linear array magnetic coupling device including sensors and a controller for determining operational states of the magnetic coupling device.

In embodiments, magnetic coupling device 10 has an elongated housing to hold multiple instances of magnetic flux source 15 in a linear array. An exemplary device having multiple instances of magnetic flux source 15 is the LAY Series unit as manufactured and sold by Magswitch Technology Inc. Referring to FIGS. 34 and 35, a magnetic coupling device 400 is shown. Magnetic coupling device 400 includes a housing 402 containing multiple instances of magnetic flux source 15, illustratively flux sources 15A-C. Pole extension shoes 404 are provided along a lower side of housing 402. The relative positions of the respective magnet 12 of each instance of magnetic flux source 15 is controlled through an actuator 406. Each instance of magnetic flux source 15 operates in the same manner as for magnetic coupling device 10 and are configurable in any one of an on state, an off state, and a partial on state.

Further, magnetic coupling device 400 includes magnetic field sensors 198 positioned within housing 402. Magnetic field sensors 198 are shown being positioned proximate the pole shoes 404 of two of the magnetic flux sources 15, illustratively flux sources 15A and 15C. In embodiments, magnetic field sensors 198 are associated with only a single flux source 15 of the plurality of magnetic flux sources 15A-C. In embodiments, magnetic field sensors 198 are associated with each flux source 15 of the plurality of magnetic flux sources 15A-C. Controller 34 by monitoring the magnetic field sensors 198 is able to determine the operating state (on state, off state, or one of a partial on state) of the monitored magnetic flux sources 15. Other sensing system disclosed herein may be used in place of magnetic field sensors 198 or in addition to magnetic field sensors 198.

Figure 37:
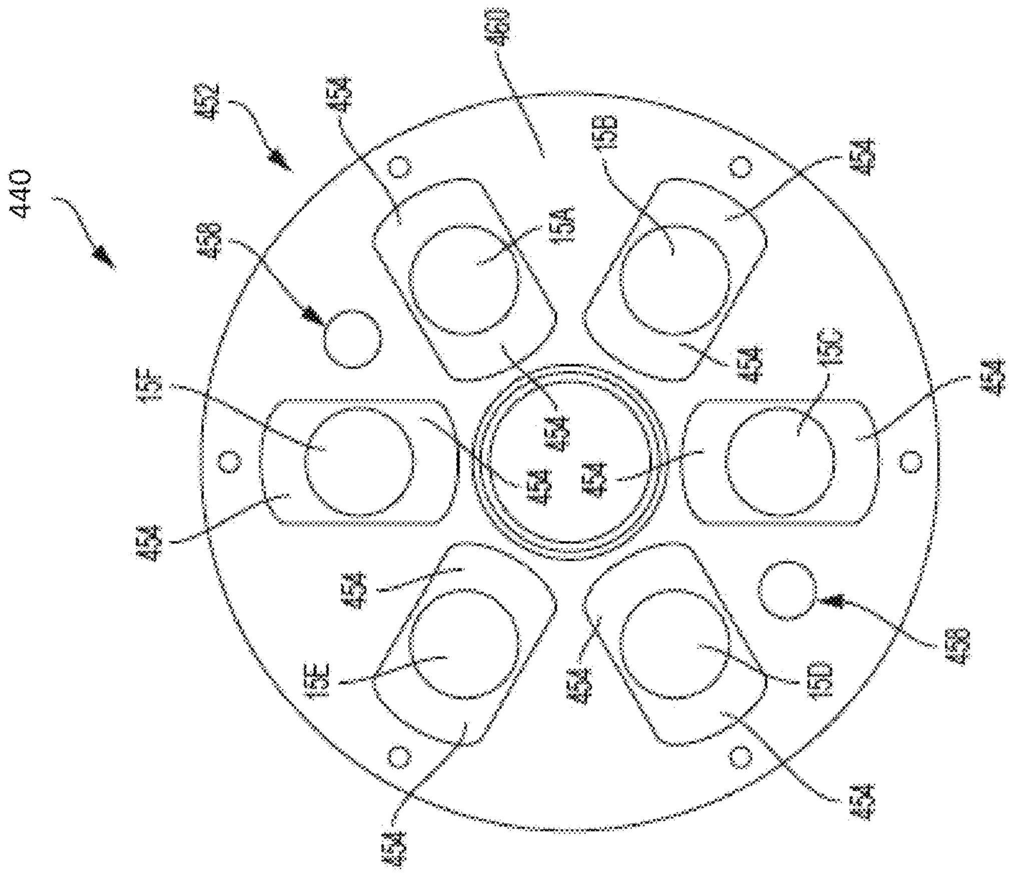
FIG. 37 illustrates a bottom view of the circular array magnetic coupling device of FIG. 36.
Figure 36:
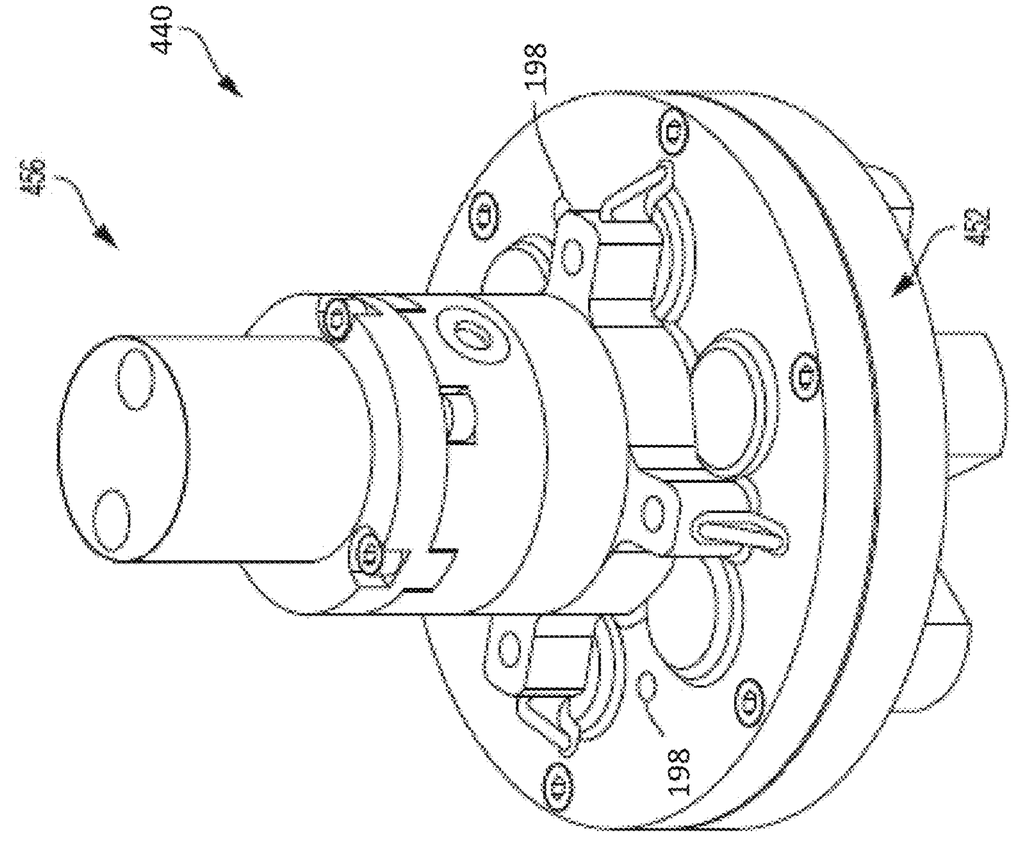
FIG. 36 illustrates a perspective view of an exemplary circular array magnetic coupling device including sensors and a controller determining operational states of the magnetic coupling device.

In embodiments, magnetic coupling device 10 has an elongated housing to hold multiple instances of magnetic flux source 15 in a circular array. An exemplary device having multiple instances of magnetic flux source 15 is the AY Series unit as manufactured and sold by Magswitch Technology Inc. Referring to FIGS. 36 and 37, a magnetic coupling device 440 is shown. Magnetic coupling device 440 includes a housing 452 supporting multiple instances of magnetic flux source 15, illustratively flux sources 15A-F, each having its own pair of workpiece contact interfaces 454. The relative position of magnet 12 for each instance of magnetic flux source 15 is controlled through an actuator 456. Each instance of magnetic flux source 15 operates to form magnetic working circuits therebetween through workpiece 27. The operation of magnetic coupling device 450 is described in more detail in U.S. Pat. No. 9,484,137, the entire disclosure of which is expressly incorporated by reference.

Further, magnetic coupling device 440 includes magnetic field sensors 198 positioned within housing 452. In embodiments, magnetic field sensors 198 are positioned in cylindrical protrusions 458 extending down from a lower surface 460 of housing 452. In the illustrated embodiment, two magnetic sensors 198 are positioned in respective protrusions 458, one being positioned between magnetic flux source 15F and 15A and the other positioned between magnetic flux sources 15C and 15D. In embodiments, a magnetic field sensor 198 is positioned in a protrusion 458 between any two of magnetic flux sources. In embodiments, magnetic field sensors 198 are positioned in respective protrusions between each pair of adjacent magnetic flux sources 15A-F along a diameter of the circular array. Controller 34 by monitoring the magnetic field sensors 198 is able to determine the operating state (on state, off state, or one of a partial on state) of the monitored magnetic flux sources 15. Other sensing system disclosed herein may be used in place of magnetic field sensors 198 or in addition to magnetic field sensors 198.

Figure 16:
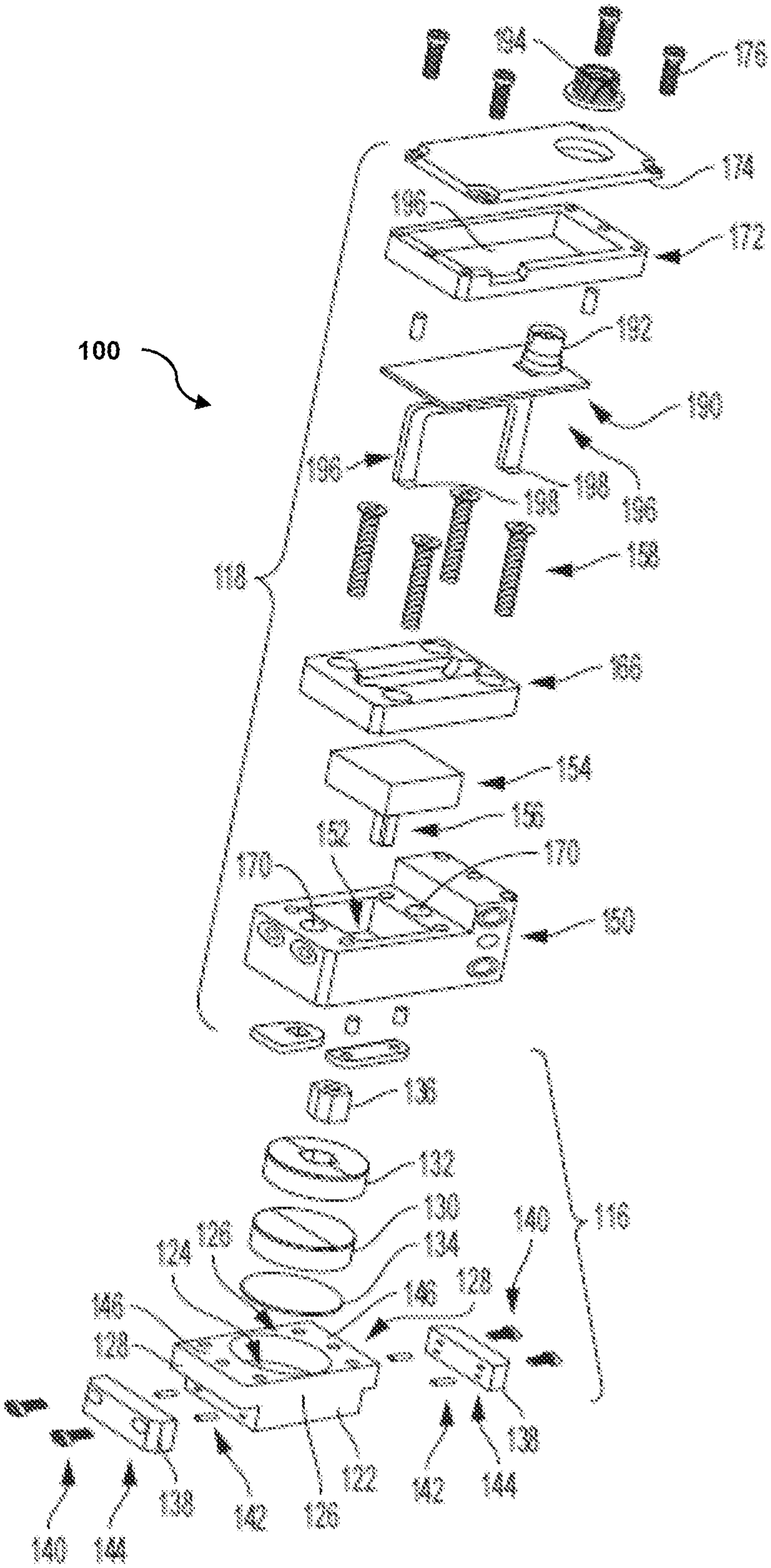
FIG. 16 illustrates an exploded, perspective view of an exemplary magnetic coupling device and sensor arrangement.

Referring to FIG. 16, an exemplary embodiment of the magnetic coupling devices disclosed in U.S. Provisional Application No. 62/490,705 is provided. In FIG. 16, an exploded view of a magnetic coupling device 100 is shown. Magnetic coupling device 100 includes a switchable permanent magnet assembly 116 and an actuator and electronic sensor and feedback assembly 118. Switchable permanent magnet assembly 116 includes a switchable permanent magnet device 120 as described in U.S. Pat. No. 7,012,495, the entire disclosure of which is expressly incorporated by reference herein. Switchable permanent magnet device 120 comprises a ferromagnetic steel housing 122 illustratively of rectangular foot print. A circular bore 124 extends axially from the bottom to the top of housing 122, with its axis coinciding with the intersection of the width and depth symmetry planes of housing 122, so that a small web 126 of material is left standing on opposite depth ends of housing 122, which subdivide housing 122 in essentially magnetically isolated portions along the height of housing 122. The wall thickness of the width-ward housing portions 128 is substantial and sufficient to fully carry magnetic flux provided by two cylindrical, diametrically magnetized rare earth permanent magnets 130, 132 which are received in bore 124. A shunt plate 134 is inserted to close the bottom end of bore 124. Bottom magnet 130 is fixed against rotation in bore 124 in such an orientation that the N-S pole separation plane (p) of magnet 130 bisects the web portions 126 and polarizes the opposite width-ward housing portions with the respective N- and S-polarities of the dipole magnet 130. Top magnet 132, despite having a hexagonal prism depression on its upper face to allow for hexagonal prism drive shaft 136 to be inserted into it, has ideally and as far as possible the same magnetization characteristics as lower magnet 130.

Two identical ferromagnetic pole shoes 138 of essentially rectangular prismatic configuration (but for chamfered edges at an outside face), of a material magnetically compatible with or the same as housing 122, are mounted to the width-ward sides at the lower portion of housing 122 to complement the shape of the upper portion of housing 122, using bolts 140 and locator pins 142. Pole shoes 138 define at a lower face respective work piece contact interfaces 144 which in the illustrated embodiment are planar, but could be of different geometry and/or contoured to form fittingly abut against a target surface of a work piece to be magnetically coupled to and handled by magnetic coupling device 100. As noted, the pole shoes 138 define at their lower terminal end the workpiece contact interfaces 144, whereas the top faces of the thick-walled width-ward portions of housing 122 define what will herein be termed flux detection surfaces 146. In absence of an external magnetic working circuit, and even when such is created, magnetic flux lines pass through both the workpiece contact interfaces 144 and flux detection surfaces 146 of housing 122.

Actuator and electronic sensor and feedback assembly 118 includes a lower rectangular-footprint actuator housing part 150 made from a non-ferromagnetic material, such as aluminium, and includes a rectangular depression 152 with a through passage opening towards the lower face of housing part 150, which serves to house a rotary actuator 154. Rotary actuator 154 has a torque output shaft 156 which in the assembled state of magnetic coupling device 100, in which lower housing part 150 is hermetically secured to the top of the magnet assembly's housing 122 using four fastening bolts 158 which extend through four bores in lower housing part 150 and engage with threaded bores on the top face of housing 122, is inserted into an engagement member, illustratively a hexagonal drive insert 136, present at the upper magnet 132. This enables actuator 154 to impart selective torque to rotate top magnet 132 in its housing 122 to turn the switchable permanent magnet device 120 between various states. Exemplary rotary actuators include hydraulic actuators, pneumatic actuators, and electrical actuators, as mentioned herein. The lines across the upper faces of both magnets 130, 132 represent the respective separation planes of the North and South active poles of magnets 130, 132.

An intermediate aluminium (or other non-ferromagnetic metallic) housing part 166 of housing assembly 118 has a rectangular footprint and is secured to the lower housing part 150 by the above mentioned fastening bolts 158. On top of intermediate housing part 166 is a rectangular frame-like upper housing part 172, also made from non-ferromagnetic metal material, whose upper open end is closed by a rectangular non-ferromagnetic cover plate 174 which by way of four fastening screws 176 extending through bores at the four corners of upper housing part 172 is sandwiched in sealing manner between cover plate 174 and intermediate housing part 166.

Assembly 118 further includes a magnetic field sensor and sensor signal processing circuit unit 190 including two leg portions 196 which at their respective terminal ends each carry a magnetic flux sensor 198 of Linear Hall Effect type. Processing circuit unit 190 includes an M12 electronic connector 192 for interfacing I/O signals to/from the sensors and microcontroller with external equipment. Other suitable connectors may be used based on the connection to be established.

Leg portions 196 of processing circuit unit 190 extend into the two cylindrical passage channels 170 in lower housing part 150 when upper housing assembly 118 is assembled. The overall arrangement ensures that the Hall Effect sensors 198 will be securely located in a defined position a small distance away from the flux detection surfaces 146 of housing 122. In essence, this arrangement ensures that one magnetic flux sensor 198 is positioned over a first one of the pole shoes 138 and a second magnetic flux sensor 198 is positioned over a second one of the pole shoes 138. Additional details of magnetic coupling device 100 are disclosed in U.S. Provisional Application No. 62/490,705, the entire disclosure of which is expressly incorporated by reference herein.

Figure 17:
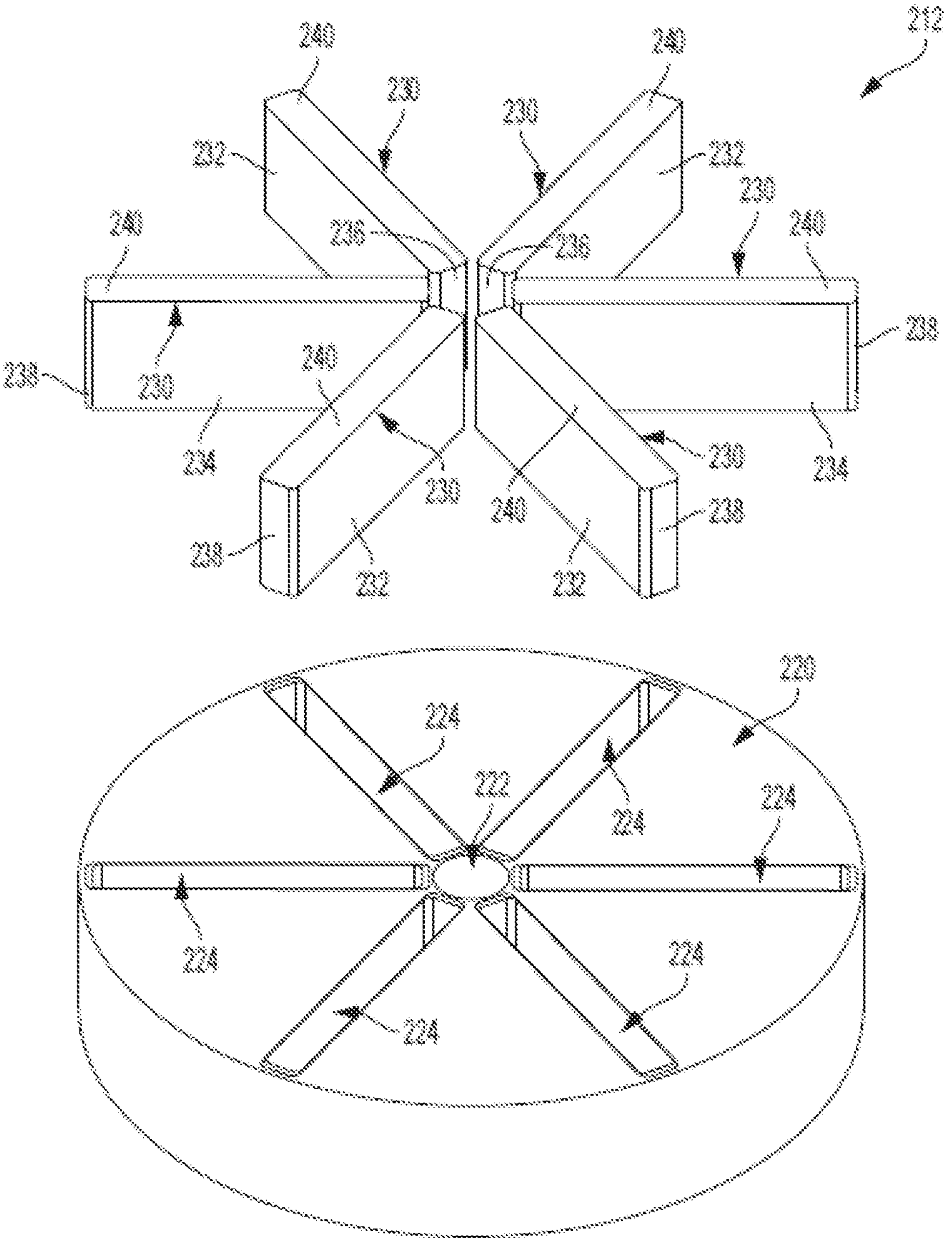
FIG. 17 illustrates an exploded, perspective view of an exemplary platter having a plurality of permanent magnets and pole portions.
Figure 18:
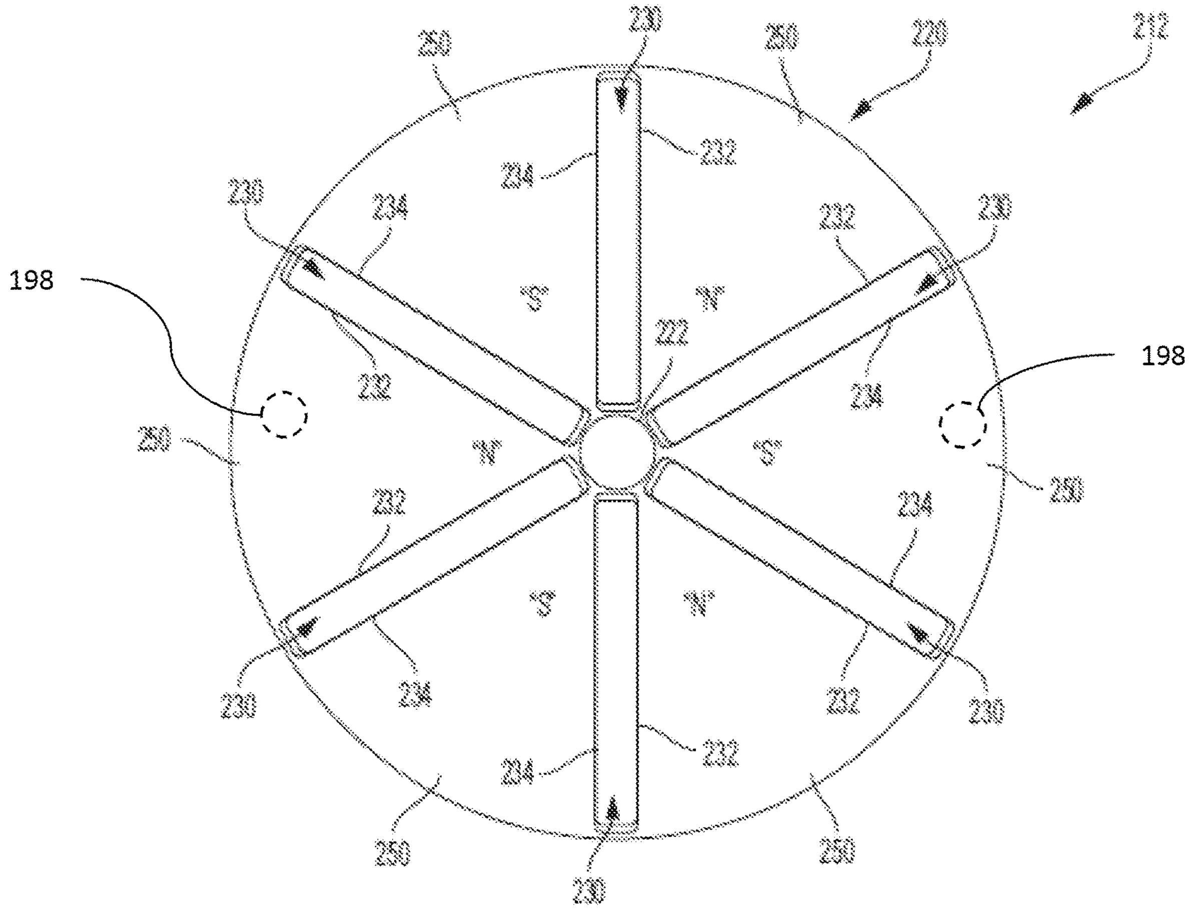
FIG. 18 illustrates a top, assembled view of the platter of FIG. 17.
Figure 19:
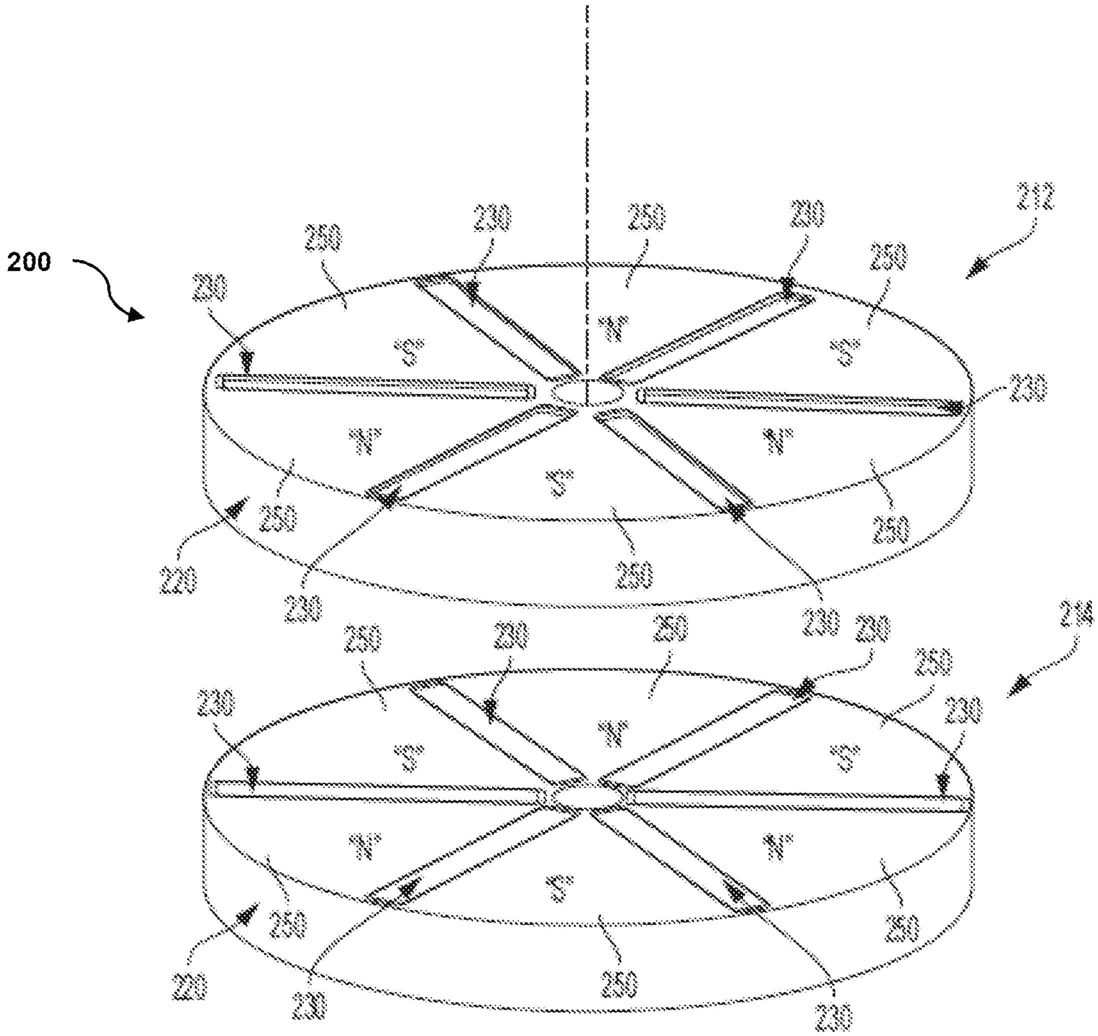
FIG. 19 illustrates a perspective view of the two instances of the platter of FIG. 17.

As mentioned herein other configurations of magnets may be used in place of permanent magnets 12, 14 or permanent magnets 130, 132. Referring to FIGS. 17-19, an exemplary switchable magnetic coupling device 200 of the present disclosure is represented. Switchable permanent magnetic coupling device 200 may replace the magnetic flux source 15 of magnetic coupling device 10 (permanent magnets 12, 14) or magnetic coupling device 100 (permanent magnets 130, 132). Further, switchable magnetic coupling device 200 is placed in a non-ferrous housing, as opposed to housing 28 for magnetic coupling device 10 and housing 150 for magnetic coupling device 100. As explained in more detail herein pole portions 250 of switchable magnetic coupling device 200 are located at a lower side of the housing and contact workpiece 27 (see FIGS. 19A and 19B) or have pole extension members positioned directly below pole portions 250 and contacting workpiece 27.

Switchable magnetic coupling device 200 includes an upper platter 212 and a lower platter 214. Each of platters 212 and 214 include a plurality of spaced-apart permanent magnets 230 and a plurality of pole portions 250. Each of the plurality of spaced-apart permanent magnets 230 are illustratively shown as a single permanent magnet, but may comprise multiple permanent magnets and/or at least one permanent magnet positioned within a housing. Exemplary platters are provided in U.S. Pat. No. 7,161,451; U.S. Provisional Patent Application No. 62/248,804, filed Oct. 30, 2015, titled MAGNETIC COUPLING DEVICE WITH A ROTARY ACTUATION SYSTEM, and German Utility Model DE202016006696U1, the entire disclosures of which are expressly incorporated by reference herein.

Returning to the example of FIGS. 17-19, each permanent magnet 230 has a north pole side 232 and a south pole side 234. The permanent magnets 230 and pole portions 250 of platter 212 and of platter 214 are each arranged to form a closed shape wherein one of pole portions 250 is positioned between two of permanent magnets 230. Further, the permanent magnets 230 are arranged so that each of the two permanent magnets 230 contacting the pole portion 250 therebetween have either their north pole sides or their south pole sides contacting the pole portion 250. When the north pole sides of the adjacent permanent magnets 230 are contacting a pole portion 250, the pole portion 250 is referred to as a north pole portion. When the south pole sides of the adjacent permanent magnets 230 are contacting a pole portion 250, the pole portion 250 is referred to as a south pole portion.

Each of upper platter 212 and lower platter 214 includes an equal and even number of permanent magnet sections and an equal number of pole portions 250. In one embodiment, in each of upper platter 212 and lower platter 214, permanent magnets 230 and pole portions 250 are arranged in a circular configuration.

In embodiments, lower platter 214, like magnet 14 in magnetic coupling device 10, is held stationary relative to the housing containing lower platter 214 and upper platter 212, like magnet 12 in magnetic coupling device 10, rotates relative to lower platter 214. Upper platter 212 is rotatable in directions 290, 292 about a central axis 294 relative to lower platter 214 to alter an alignment of the permanent magnets 230 and pole portions 250 of upper platter 212 relative to the permanent magnets 230 and pole portions 250 of lower platter 214.

Magnetic coupling device 200 is considered to be in an on state when the south pole portions 250 of lower platter 214 are aligned with the south pole portions 250 of upper platter 212 and the north pole portions 250 of lower platter 214 are aligned with the north pole portions 250 of upper platter 212. In the on-state, workpiece 27 is held by magnetic coupling device 10 due to a completion of a magnetic circuit from the aligned north pole portions 250 of upper platter 212 and lower platter 214, through the workpiece 27, and to the aligned south pole portions 250 of upper platter 212 and 214.

Magnetic coupling device 200 is considered to be in an off state when the south pole portions 250 of lower platter 214 are aligned with the north pole portions 250 of upper platter 212 and the north pole portions 250 of lower platter 214 are aligned with the south pole portions 250 of upper platter 212. In the off state, a workpiece 27 is not held by magnetic coupling device 10 due to a completion of a magnetic circuit within upper platter 212 and lower platter 214 from the aligned north pole portions 250 of upper platter 212 to the south pole portions 250 of lower platter 214 and from the aligned north pole portions of upper platter 212 to the south pole portions 250 of lower platter 214.

Magnetic coupling device 200 is considered to be in a partial on state when the south pole portions 250 of upper platter 212 are partially overlapping the north pole portions 250 of lower platter 214 and the north pole portions 250 of upper platter 212 are partially overlapping the south pole portions 250 of lower platter 214. When in the partial on state, a workpiece 27 may be held by magnetic coupling device 10 due to a completion of a magnetic circuit from the overlapping north pole portions 250 of upper platter 212 and lower platter 214, through the workpiece 27, and to the overlapping south pole portions 250 of upper platter 212 and lower platter 214. The strength of the magnetic circuit increases as the degree of overlap of the overlapping north pole portions 250 of upper platter 212 and lower platter 214 and the overlapping south pole portions 250 of upper platter 212 and lower platter 214 increases.

Referring to FIG. 17, upper platter 212 is illustrated. Upper platter 212 includes a cylindrical base component 220 having a central aperture 222 and a plurality of radially extending apertures 224. Each of the radially extending apertures 224 is sized and shaped to receive a permanent magnet 230. Each permanent magnet 230 has a north side 232, a south side 234, a radially inward facing side 236, a radially outward facing side 238, a top 240, and a bottom 242 (see FIG. 19A).

Referring to FIG. 18, a top view of upper platter 212 is shown. Cylindrical base component 220 surrounds each of north sides 232, south sides 234, radially inward facing side 136, and radially outward facing side 138 of permanent magnet 230. In one embodiment, apertures 224 are not through apertures, but rather blind depth apertures from the bottom side of cylindrical base component 220 and hence cylindrical base component 220 would also surround top portion 240 of permanent magnet 230. In the illustrated embodiment, cylindrical base component 220 is a single integral component. In one embodiment, cylindrical base component 220 is comprised of two or more components joined together.

As shown in FIG. 18, permanent magnets 230 are arranged so that the north side 232 of adjacent magnets are facing each other and the south side 234 of adjacent magnets 230 are facing each other. This arrangement results in the portions 250 of cylindrical base component 220 between permanent magnet 230 to act as pole extensions for permanent magnet 230. In embodiments, base component 220 and hence pole portions 250 are made of steel. Other suitable ferromagnetic materials may be used for base component 220.

Referring to FIG. 19, upper platter 212 is shown exploded relative to lower platter lower platter 214. Lower platter 214 is generally identical to upper platter 212. Upper platter 212 may be rotated relative to lower platter 214 to place magnetic coupling device 10 in an on state, a partial on state, or an off state.

Figure 19A:
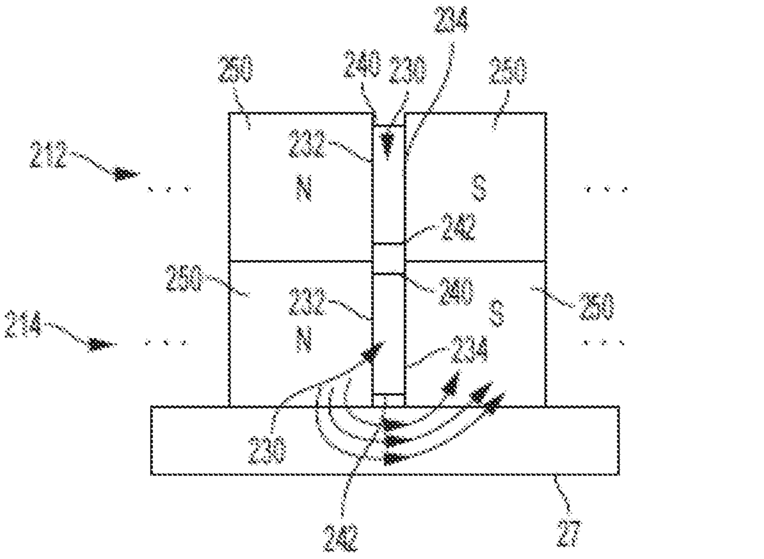
FIG. 19A is a partial sectional view of the platters of FIG. 19 coupled to a workpiece, the platters being arranged in an on-state.

Referring to FIG. 19A, upper platter 212 and lower platter 214 are arranged in an on-state wherein the south pole portions 250 of upper platter 212 are adjacent the south pole portions 250 of lower platter 214 and the north pole portions 250 of upper platter 212 are adjacent the north pole portions 250 of lower platter 214. In the on-state, a workpiece 27 being made from a ferromagnetic material is held by magnetic coupling device including the upper and lower platters 212, 214 due to a completion of a magnetic circuit from the aligned north pole portions 250 of upper platter 212 and lower platter 214, through the workpiece 27, and to the aligned south pole portions 250 of upper platter 212 and lower platter 214. The lower surfaces of north and south pole portions 250 forming the workpiece contact interfaces. Alternatively, instances of pole shoes 16', 16", although of different shape than in FIG. 1, may positioned between the lower surfaces of north and south pole portions 250 and the workpiece 27 to provide the workpiece contact interfaces with workpiece 27.

Figure 19B:
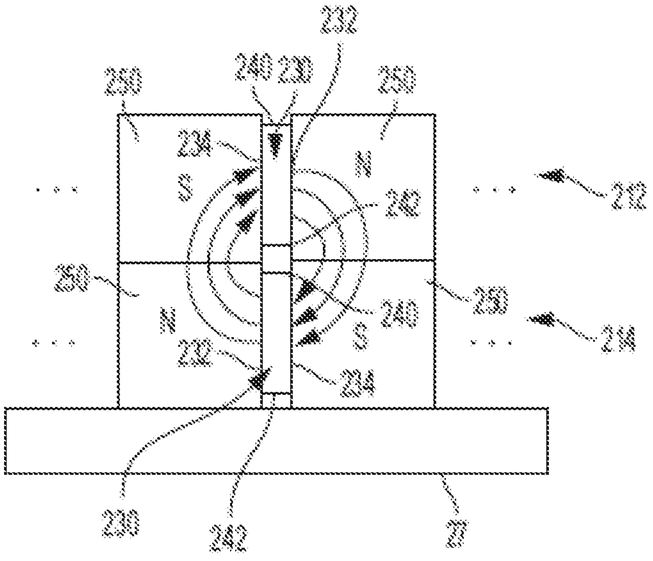
FIG. 19B is a partial sectional view of the platters of FIG. 19 coupled to a workpiece, the platters being arranged in an off-state.

Referring to FIG. 19B, upper platter 212 and lower platter 214 are arranged in an off-state when the south pole portions 250 of upper platter 212 are adjacent the north pole portions 250 of lower platter 214 and the north pole portions 250 of upper platter 212 are adjacent the south pole portions 250 of lower platter 214. In the off-state, a workpiece 27 being made from a ferromagnetic material is not held by magnetic coupling device including the upper and lower platters 212, 214 due to a completion of a magnetic circuit between the aligned south pole portions 250 of upper platter 212 and the north pole portions 250 of lower platter 214 and between the aligned north pole portions 250 of upper platter 212 and the south pole portions 250 of lower platter 214. In other words, platters 212 and 214 shunt the magnetic circuit within the pole portions 150 causing the external magnetic field to collapse. Upper platter 212 and lower platter 214 may also be arranged to provide one or more partial on states of the magnetic coupling device including upper platter 212 and lower platter 214.

In embodiments, at least one of the north pole portions 250 and at least one of the south pole portions 250 has a magnetic flux sensor 198 associated therewith to monitor the leakage flux associated with the respective north pole portion and the respective south pole portion. As shown in FIG. 18, a first magnetic flux sensor 198 may be placed proximate to a north pole portion 250, such as directly over north pole portion 250 or radially outward of north pole portion 250, and a second magnetic flux sensor 198 may be placed proximate to a south pole portion 250, such as directly over south pole portion 250 or radially outward of south pole portion 250. Controller 34 may perform calibration runs for switchable permanent magnet assembly 200 in a similar fashion as described herein to store sensor values for determining operating states of the device including switchable permanent magnet assembly 200, such as the leakage flux associated with the monitored pole portions 250 for the on state, the off state, and at least one desired partial on state for a given workpiece 27.

Figure 20:
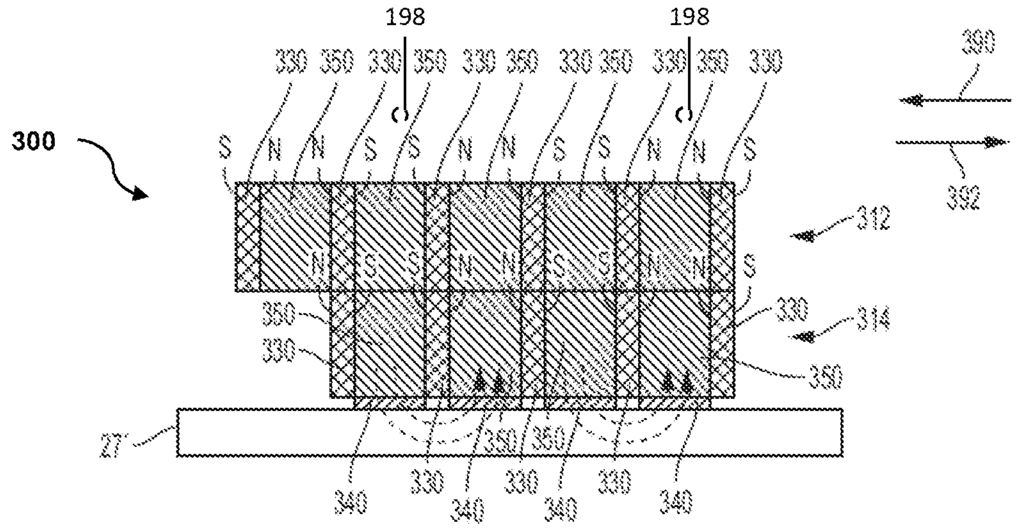
FIG. 20 illustrates a diagrammatical view of an exemplary magnetic coupling device having an upper assembly and a lower assembly, each including a plurality of permanent magnets and pole portions arranged in a linear array, the magnetic coupling device being in an on state.
Figure 21:
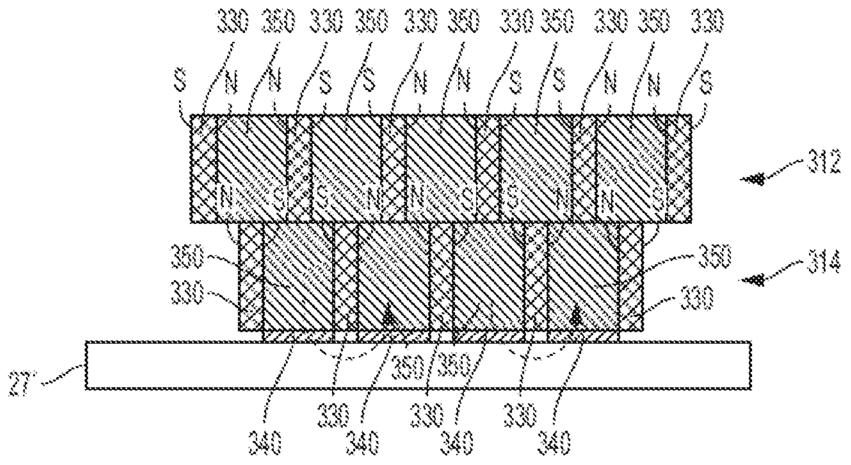
FIG. 21 illustrates the magnetic coupling device of FIG. 20 in a partial on state.
Figure 22:
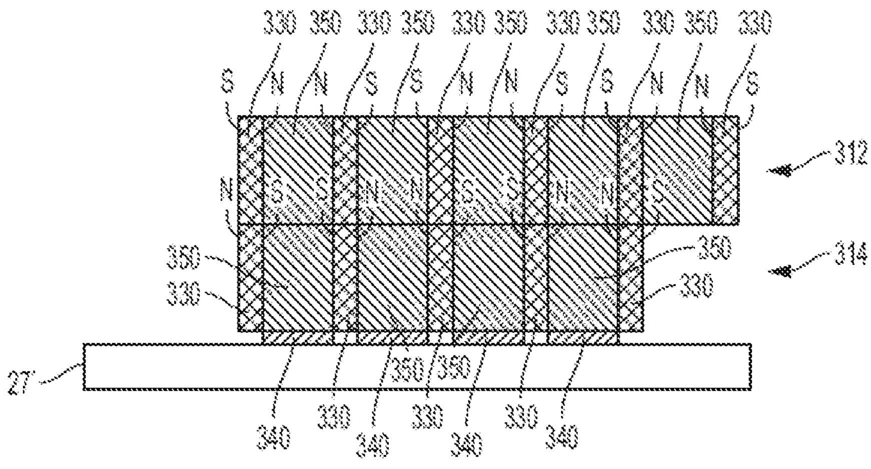
FIG. 22 illustrates the magnetic coupling device of FIG. 20 in an off state.

Referring to FIGS. 20-22, an exemplary magnetic coupling device 300 of the present disclosure is represented. Magnetic coupling device 300 includes an upper assembly 312 and a lower assembly 314. Each of assemblies 312 and 314 include a plurality of spaced-apart permanent magnets 330 and a plurality of pole portions 350. Each of the plurality of spaced-apart permanent magnets 330 are illustratively shown as a single permanent magnet, but may comprise multiple permanent magnets and/or at least one permanent magnet positioned within a housing. Further, magnetic coupling device 300 is placed in a non-ferrous housing, as opposed to housing 28 for magnetic coupling device 10 and housing 150 for magnetic coupling device 100. As explained in more detail herein pole portions 350 of magnetic coupling device 300 are located at a lower side of the housing and contact workpiece 27 or have pole extension members positioned directly below pole portions 250 and contacting workpiece 27 (see FIGS. 20-22).

Each permanent magnet 330 has a north pole side (N) and a south pole side(S). The permanent magnets 330 and pole portions 350 of assembly 312 and of assembly 314 are each arranged in a linear array wherein one of pole portions 350 is positioned between two of permanent magnets 330. Further, the permanent magnets 330 are arranged so that each of the two permanent magnets 330 contacting the pole portion 350 therebetween have either their north pole sides (N) or their south pole sides(S) contacting the pole portion 350. When the north pole sides (N) of the adjacent permanent magnets 330 are contacting a pole portion 350, the pole portion 350 is referred to as a north pole portion. When the south pole sides(S) of the adjacent permanent magnets 330 are contacting a pole portion 350, the pole portion 350 is referred to as a south pole portion.

In embodiments, lower assembly 314, like permanent magnet 14 in magnetic coupling device 10 or permanent magnet 130 in magnetic coupling device 100 is held stationary relative to the housing containing lower assembly 314 and upper assembly 312, like permanent magnet 12 of magnetic coupling device 10 or permanent magnet 132 of magnetic coupling device 100, rotates relative to lower assembly 314. Upper assembly 312 is translatable relative to lower assembly 314 in directions 390 and 392 to alter an alignment of the permanent magnets 330 and pole portions 350 of upper assembly 312 relative to the permanent magnets 330 and pole portions 350 of lower assembly 314. Permanent magnets 330 of lower assembly 312 are spaced apart from workpiece 27 due to pole shoes 340 coupled to pole portions 350. Alternatively, pole portions may be extended to provide the spacing. Additionally, a spacer (not shown) is provided between the permanent magnets of upper assembly 312 and lower assembly 314.

Magnetic coupling device 300 is considered to be in an on state when the south pole portions 350 of lower assembly 314 are aligned with the south pole portions 350 of upper assembly 312 and the north pole portions 350 of lower assembly 314 are aligned with the north pole portions 350 of upper assembly 312 (see FIG. 20). In the on-state, workpiece 27 is held by magnetic coupling device 300 due to a completion of a magnetic circuit from the aligned north pole portions 350 of upper assembly 312 and lower assembly 314, through the workpiece 27, and to the aligned south pole portions 350 of upper assembly 312 and lower assembly 314.

Magnetic coupling device 300 is considered to be in an off state when the south pole portions 350 of lower assembly 314 are aligned with the north pole portions 350 of upper assembly 312 and the north pole portions 350 of lower assembly 314 are aligned with the south pole portions 350 of upper assembly 312 (see FIG. 22). In the off state, a workpiece 27 is not held by magnetic coupling device 10 due to a completion of a magnetic circuit within upper assembly 312 and lower assembly 314 from the aligned north pole portions 350 of upper assembly 312 to the south pole portions 350 of lower assembly 314 and from the aligned north pole portions of upper assembly 312 to the south pole portions 350 of lower assembly 314.

Magnetic coupling device 300 is considered to be in a partial on state when the south pole portions 350 of upper assembly 312 are partially overlapping the north pole portions 350 of lower assembly 314 and the north pole portions 350 of upper assembly 312 are partially overlapping the south pole portions 350 of lower assembly 314. When in the partial on state, a workpiece 27 may be held by magnetic coupling device 10 due to a completion of a magnetic circuit from the overlapping north pole portions 350 of upper assembly 312 and lower assembly 314, through the workpiece 27, and to the overlapping south pole portions 350 of upper assembly 312 and lower assembly 314. The strength of the magnetic circuit increases as the degree of overlap of the overlapping north pole portions 350 of upper assembly 312 and lower assembly 314 and the overlapping south pole portions 350 of upper assembly 312 and lower assembly 314 increases.

In embodiments, at least one of the north pole portions 350 and at least one of the south pole portions 350 has a magnetic flux sensor 198 associated therewith to monitor the leakage flux associated with the respective north pole portion and the respective south pole portion. As shown in FIG. 20, a first magnetic flux sensor 198 may be placed proximate to a north pole portion 350, such as directly over north pole portion 350 or radially outward of north pole portion 350, and a second magnetic flux sensor 198 may be placed proximate to a south pole portion 350, such as directly over south pole portion 350 or radially outward of south pole portion 350. Controller 34 may perform calibration runs for magnetic coupling device 300 in a similar fashion as described herein to store sensor values for determining operating states of the device including magnetic coupling device 300, such as the leakage flux associated with the monitored pole portions 350 for the on state, the off state, and at least one desired partial on state for a given workpiece 27.

Figure 23:
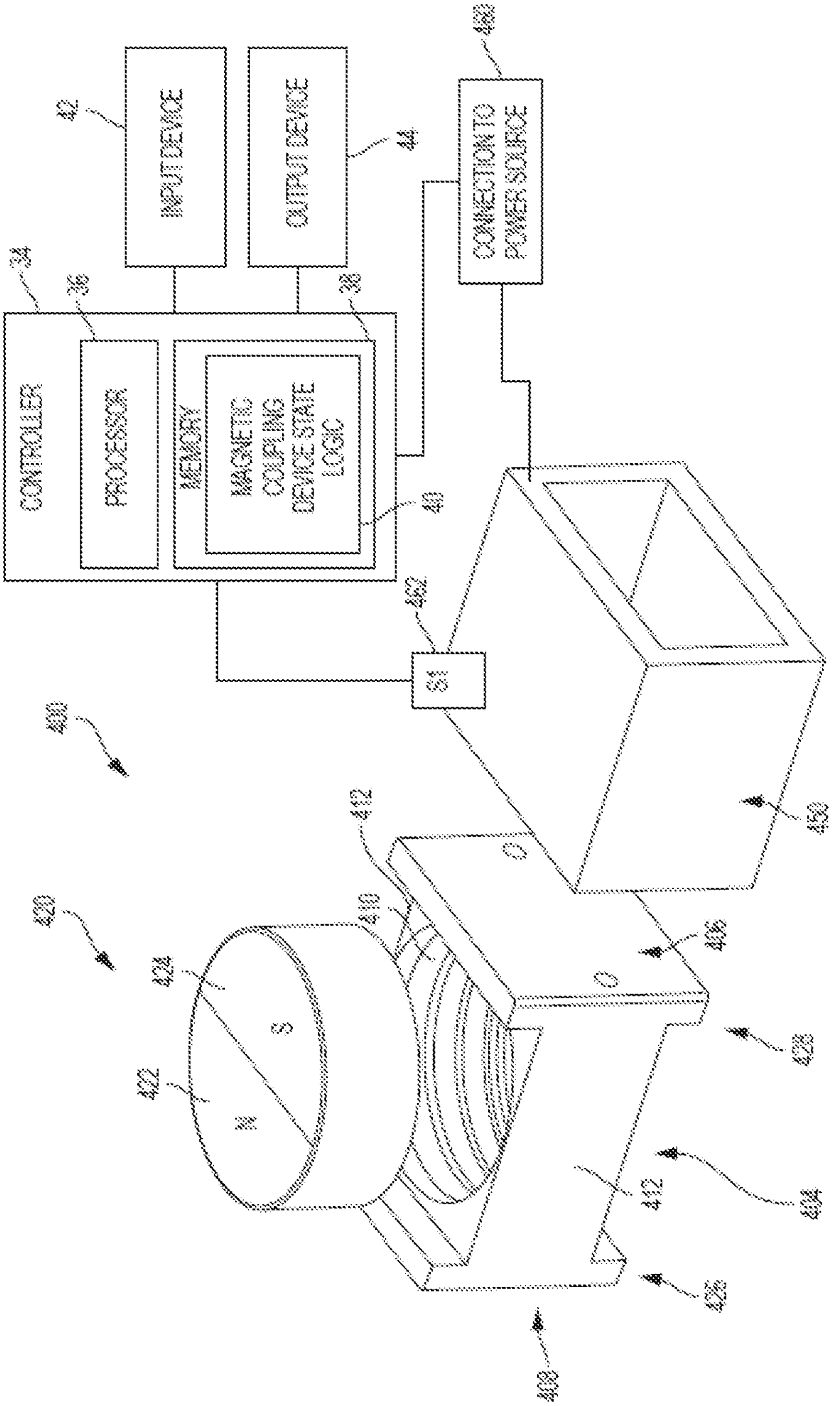
FIG. 23 illustrates an exploded, perspective view of another exemplary magnetic coupling device including a permanent magnet and an electrical coil.
Figure 24:
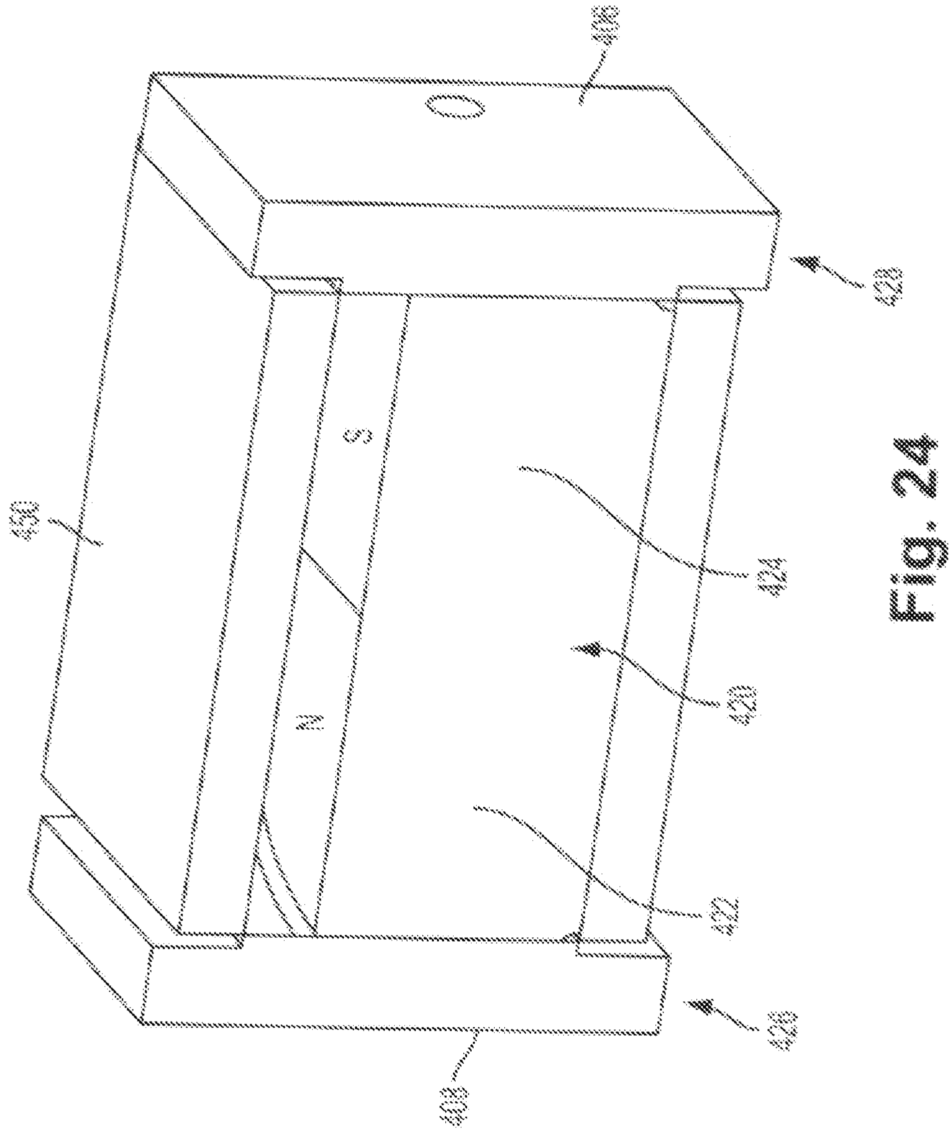
FIG. 24 illustrates an assembled view of the exemplary magnetic coupling device of FIG. 23.

Referring to FIGS. 23 and 24, another exemplary magnetic coupling device 400 is illustrated. Magnetic coupling device 400 includes a housing 402 made of a ferromagnetic material (i.e. low magnetic reluctance material), having a central parallelepiped section 404 extending between a first end 406 and a second end 408. Pole shoes 16', 16" may be coupled to ends 406 and 408. A central cylindrical cavity 410, which takes up a substantial part of the volume of housing 400, extends between upper and lower terminal faces of central section 404 and has such diameter that relatively thin walled vertical wall sections 412 remain at the front and rear faces of section 404 only, whereas the wall sections on either side of wall sections 412 have an increasing wall thickness towards ends 406, 408. This configuration of housing 402 separates housing 402 into two magnetically isolated sections 426 and 428.

A permanent magnet 420 having a north pole 422 and a south pole 424 is positioned in central cavity 410. Permanent magnet 420 providing a generally constant level of magnetic flux. Since central section 404 is made of a ferromagnetic material, sections 406, 408 of housing 402 act as pole extensions of south pole portion 424 and north pole portion 422, respectively. Permanent magnet 420 is fixed in housing 402 to not rotate relative to housing 402. Fixing the orientation of permanent magnet 420 within housing 402 may be achieved by selecting the respective diameters of cavity 410 and magnet 420 to provide a press or tight interference fit, or by gluing permanent magnet 420 in cavity 410 or suitable methods of holding permanent magnet 420 relative to housing 402.

A coil 450 including one or more windings of electrically insulated wire is wound around the central section 412 of housing 402. Ends 406, 408 of housing 402 act as containment walls in between which coil 450 is wound. Coil 450 comprises, for example, a single coil of copper wire which is wound around wall sections 412 of central section 404, in effect covering central cavity 410 of housing 402 and permanent magnet 420 received therein.

Coil 450 is operatively coupled to an electrical power source through a connection 460. Exemplary connections include switches or circuitry which controls a level of current supplied to coil 450. As shown in FIG. 14, connection 460 is connected to controller 34. Controller 34 provides signals to connection 460 to control a level of current supplied to coil 450. By controlling the current level through coil 450 and the direction of the current through coil 450, the magnetic field made available by magnetic coupling device 400 at the workpiece contact interfaces 17', 17" of pole shoes 16', 16" may be increased or decreased as the magnetic flux produced by the current flowing through coil 450 is one of additive of the generally constant magnetic flux of permanent magnet 420 or subtractive of the generally constant magnetic flux of permanent magnet 420 depending on the direction of the current flow through coil 450. In embodiment, a current sensor 462 is provided to maintain the current through coil 450. When current is traveling in a first direction through coil 450, the resultant magnetic field increases the magnetic flux available at the workpiece contact interfaces 17', 17" of pole shoes 16', 16". When current is traveling is a second direction through coil 450, the resultant magnetic field decreases the magnetic flux available at the workpiece contact interfaces 17', 17" of pole shoes 16', 16". The current level setting a degree of the increase or decrease in the magnetic flux available at the workpiece contact interfaces 17', 17" of pole shoes 16', 16".

Magnetic coupling device 400 based on the properties of permanent magnet 420 and the properties of an electrical current level and an electrical current direction passing through coil 450 may establish multiple magnetic circuits. In particular, magnetic coupling device 400 may be configured in at least three states, each of which has a corresponding magnetic circuit characteristic. Magnetic coupling device 400 is capable of maintaining each of the at least three states for an extended period of time by maintaining an effectively constant current level through coil 450 or no current through coil 450. In one example, the extended period of time is up to 120 seconds. In another example, the extended period of time is up to 10 seconds. In a further example, the extended period of time is up to 5 seconds. In yet another example, the extended period of time is up to 2 seconds. In still another example, the extended period of time is up to 1 second. In yet a further example, the above exemplary ranges have a minimal duration set based on system requirements, such as of at least 0.1 seconds.

In embodiments, a temperature sensor is included to monitor a temperature of coil 450. In one example, magnetic coupling device 400 is operated as long as the measured temperature is below a threshold temperature. An exemplary threshold temperature is 80° Celsius.

In a first state referred to herein as an off state, a first current level is passed through coil 450 to effectively mitigate or cancel the magnetic flux of permanent magnet 420 to provide a first level of magnetic flux available to the ferromagnetic workpiece 27 at the workpiece contact interfaces 17', 17" of the pole shoes 16', 16". In the off state, the first level of magnetic flux available to the ferromagnetic workpiece 27 at the workpiece contact interfaces 17', 17" of the pole shoes 16', 16" is insufficient to lift the ferromagnetic workpiece with the magnetic coupling device 420. In one example, at least 96% percent of the magnetic flux produced by permanent magnet 420 is cancelled by coil 450 when magnetic coupling device 400 is in the off state. In another example, at least 99% of the magnetic flux produced by permanent magnet 420 is cancelled by coil 450 when magnetic coupling device 400 is in the off state.

In a second state referred to herein as an on state, a second current level is passed through coil 450 to provide a second level of magnetic flux available to the ferromagnetic workpiece at the workpiece contact interfaces 17', 17" of the pole shoes 16', 16". In one example, no current is passed through coil 450 such that the full amount of magnetic flux produced by permanent magnet 420 is available to the ferromagnetic workpiece 27 at the workpiece contact interfaces 17', 17" of the pole shoes 16', 16". In the on state, the second level of magnetic flux available to the ferromagnetic workpiece 27 at the workpiece contact interfaces 17', 17" of the pole shoes 16', 16" is higher than the first level of the off state and is sufficient to lift the ferromagnetic workpiece with the magnetic coupling device 400. In one example, the magnetic flux produced by permanent magnet 420 alone is sufficient to lift the ferromagnetic workpiece. Thus, if power is inadvertently cut to coil 450, magnetic coupling device 400 retains the ferromagnetic workpiece 27 coupled to magnetic coupling device 400.

In a third state referred to herein as a partial on state, a third current level is passed through coil 450 to provide a third level of magnetic flux available to the ferromagnetic workpiece 27 at the workpiece contact interfaces 17', 17" of the pole shoes 16', 16". The third current level cancels out at least a part of the magnetic flux available at the workpiece contact interfaces 17', 17" of the pole shoes 16', 16" from the permanent magnet 420. In the partial on state, the third level of magnetic flux available to the ferromagnetic workpiece 27 at the workpiece contact interfaces 17', 17" of the pole shoes 16', 16" is higher than the first level of the off state, is lower than the second level of the on state, and is sufficient to lift the ferromagnetic workpiece with the magnetic coupling device 400. In one example, the partial on state is sufficient to lift top sheet 27' of stack 27, but not both top sheet 27' and second from the top sheet 27".

In embodiments, a sensor 462 is provided to monitor a characteristic of coil 450. In one example, sensor 462 is a current sensor which monitors a current level passing through coil 450 or supplied to coil 450.

As explained in more detail herein, by being able to configure magnetic coupling device 400 in at least three states, the ability of configuring magnetic coupling device 400 for destacking ferromagnetic workpieces 27 arranged in a stack is enhanced and the ability to use magnetic coupling device 400 for multiple different types of ferromagnetic workpieces 27 is enhanced. Additional details regarding an exemplary magnetic coupling device 400 are disclosed in U.S. Provisional Application Ser. No. 62/517,043, filed Jun. 8, 2017, titled SWITCHABLE MAGNETIC APPARATUS, the entire disclosure of which is expressly incorporated by reference herein.

Figure 1A:
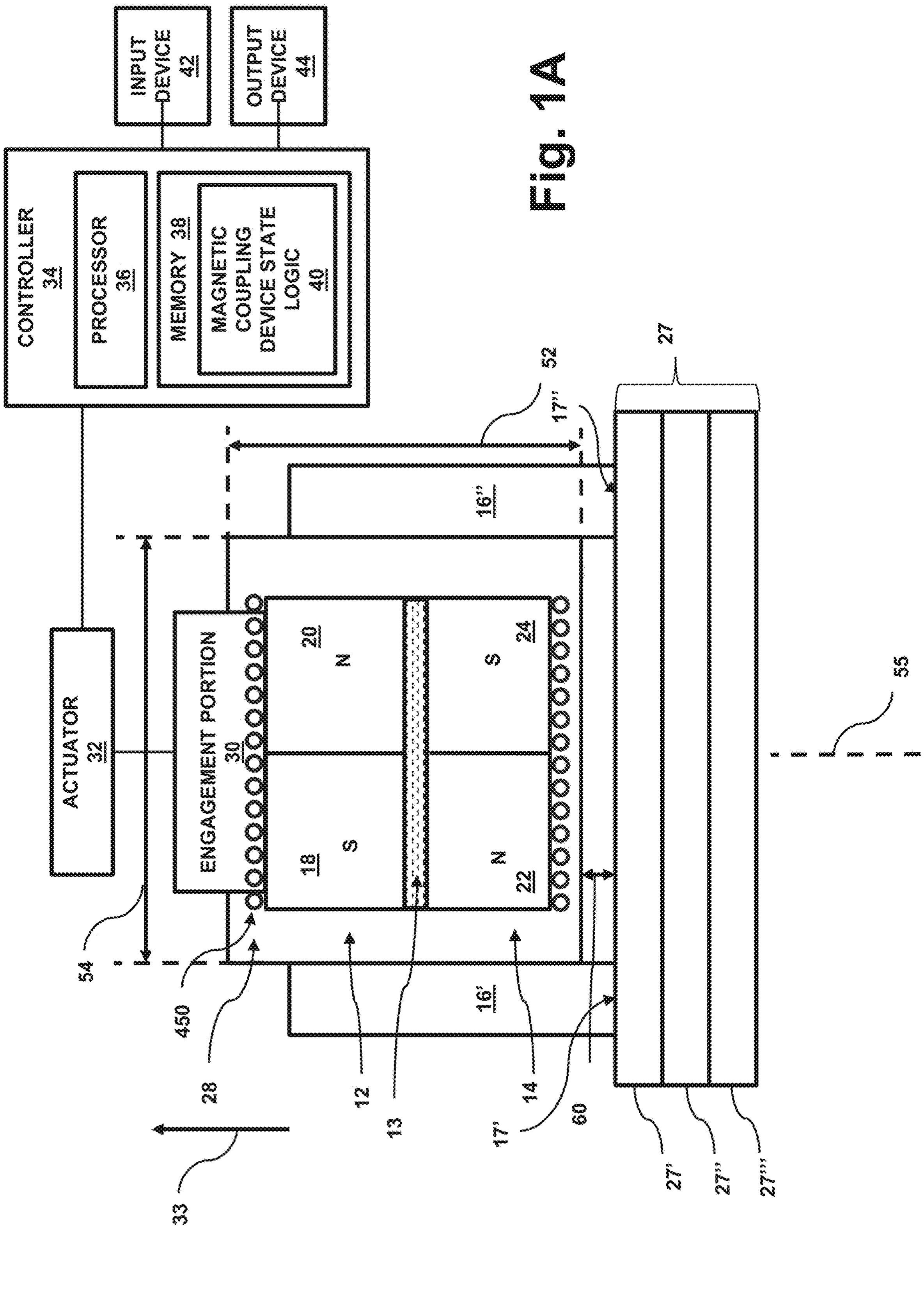
FIG. 1A illustrates the magnetic coupler of device of FIG. 1 with a coil wrapped about a first permanent magnet and a second permanent magnet.
Figure 1B:
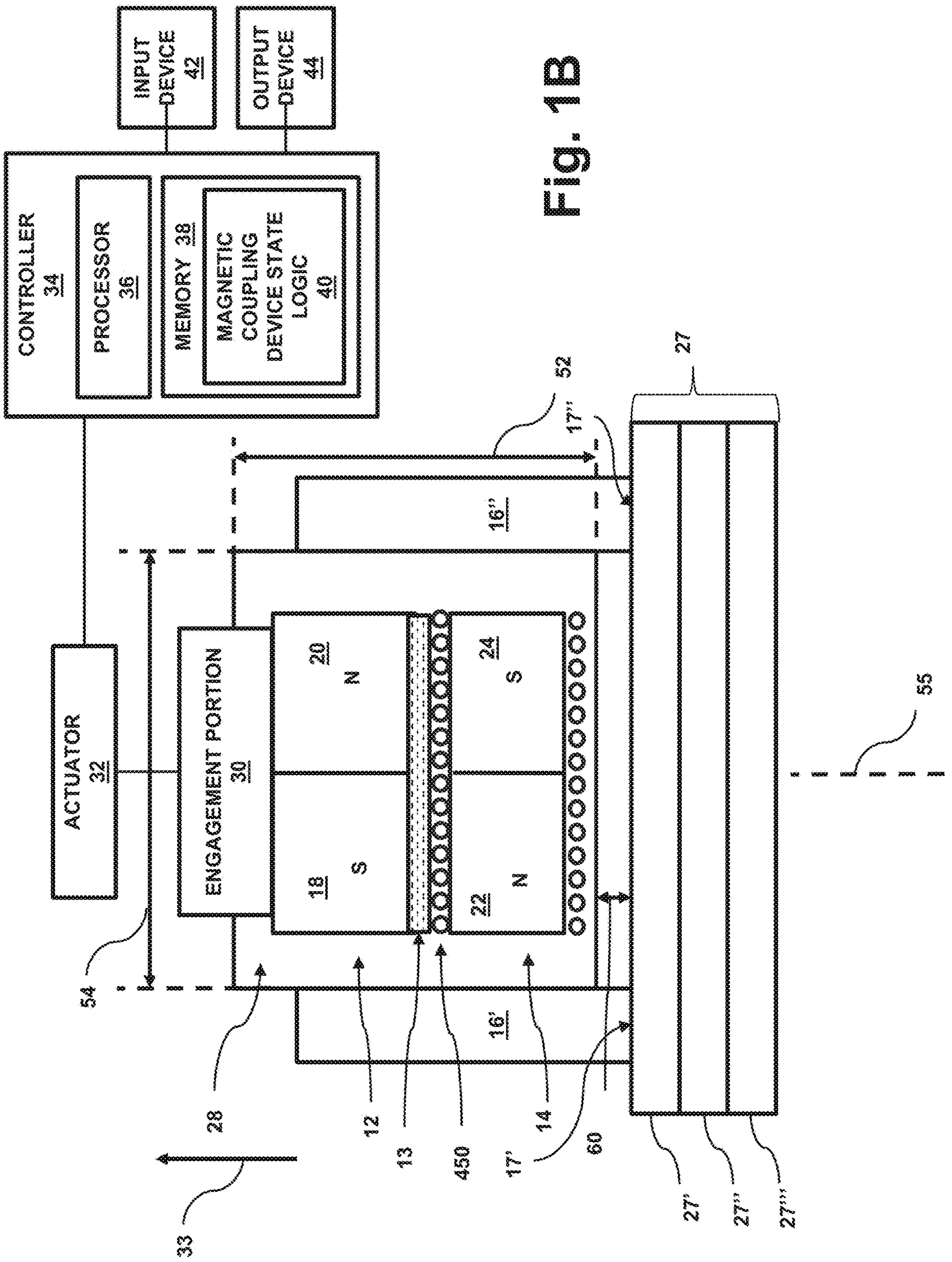
FIG. 1B illustrates the magnetic coupler of device of FIG. 1 with a coil wrapped about a permanent magnet.

In embodiments, a coil 450 is wrapped around both of permanent magnets 12, 14 of magnetic coupling device 10 (see FIG. 1A) and is used to further increase the magnetic flux available at workpiece contact interfaces 17', 17" of pole shoes 16', 16" over the on state. In embodiments, coil 450 is wrapped around permanent magnet 14 of magnetic coupling device 10 (see FIG. 1B) to cancel or reduce the effective magnetic flux of permanent magnet 14 acting on permanent magnet 12 to lower the torque needed to rotate permanent magnet 12 relative to permanent magnet 14.

In embodiments, instead of being fixed in housing 402, permanent magnet 420 is rotatable in housing 402. An actuation system 470 is operatively coupled to permanent magnet 420 to rotate permanent magnet 420 relative to housing 402. In one embodiment, actuation system may be an electrical actuation system, such as a stepper motor, a hydraulic actuation system, a pneumatic actuation system, or other suitable actuation systems. In one embodiment, permanent magnet 420 is rotated relative to housing 402 through current applied to one or more coils positioned about permanent magnet 420. Additional details of exemplary coil actuation systems are provided in U.S. Provisional Application No. 62/517,057, titled ELECTROMAGNET-SWITCHABLE PERMANENT MAGNET DEVICE, filed Jun. 8, 2017, the entire disclosure of which is expressly incorporated by reference herein.

Figure 24A:
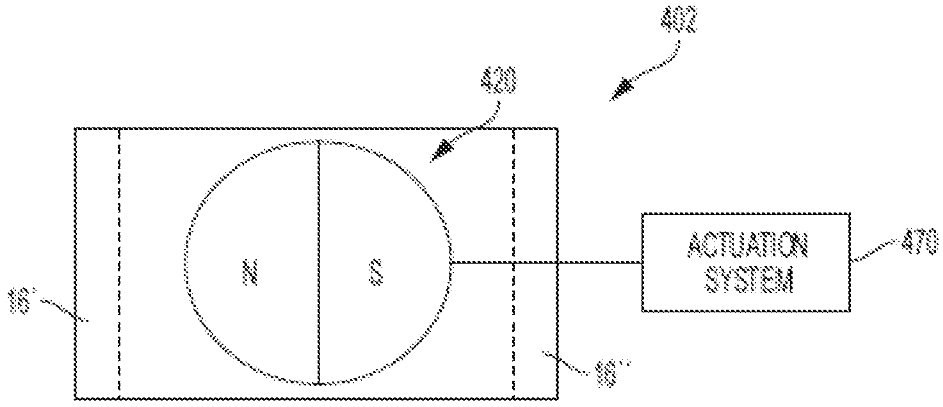
FIGS. 24A-C illustrate exemplary configurations of an exemplary magnetic coupling device.
Figure 24B:
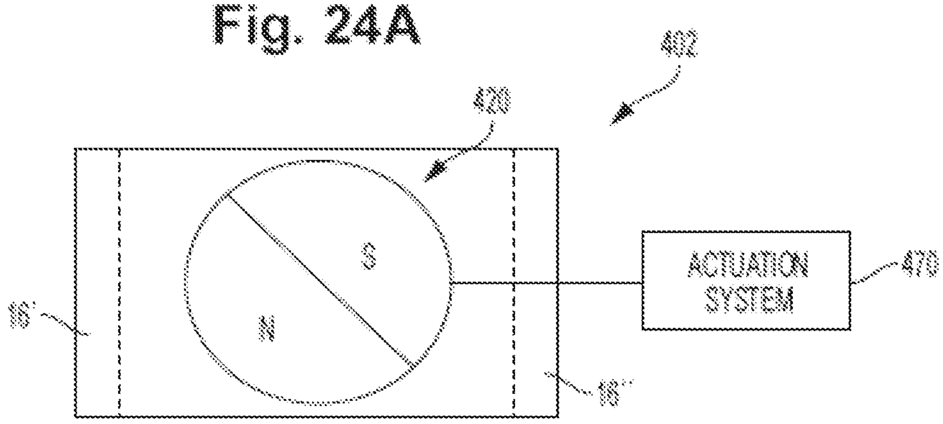
Figure 24C:
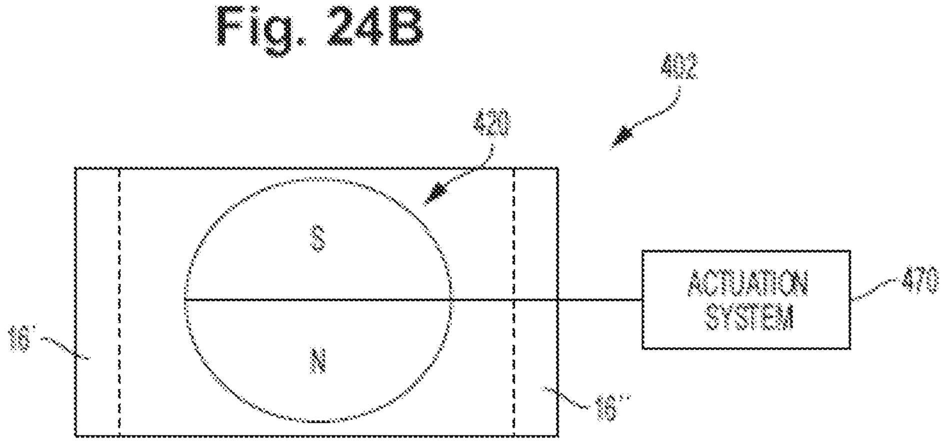

Referring to FIG. 24C, an arrangement of permanent magnet 420 relative to housing 402 is illustrated. The arrangement of FIG. 24C is a first state referred to herein as an off state wherein a first level of magnetic flux is available to the ferromagnetic workpiece 27 at the workpiece contact interfaces 17', 17" of the pole shoes 16', 16" which is insufficient to lift the ferromagnetic workpiece with the magnetic coupling device 420. A majority of the magnetic flux is passively shunted within housing 402. In one example, at least 96% percent of the magnetic flux produced by permanent magnet 420 is cancelled by coil 450 when magnetic coupling device 400 is in the off state. In another example, at least 99% of the magnetic flux produced by permanent magnet 420 is cancelled by coil 450 when magnetic coupling device 400 is in the off state.

Referring to FIG. 24A, an arrangement of permanent magnet 420 relative to housing 402 is illustrated. The arrangement of FIG. 24A is a second state referred to herein as an on state wherein a second level of magnetic flux produced by permanent magnet 420 is available to the ferromagnetic workpiece 27 at the workpiece contact interfaces 17', 17" of the pole shoes 16', 16" attached to housing 402. In the on state, the second level of magnetic flux available to the ferromagnetic workpiece 27 at the workpiece contact interfaces 17', 17" of the pole shoes 16', 16" is higher than the first level of the off state and is sufficient to lift the ferromagnetic workpiece with the magnetic coupling device 400.

Referring to FIG. 24B, an arrangement of permanent magnet 420 relative to housing 402 is illustrated. The arrangement of FIG. 24B is a third state referred to herein as a partial on state wherein a third level of magnetic flux is available to the ferromagnetic workpiece 27 at the workpiece contact interfaces 17', 17" of the pole shoes 16', 16". In the partial on state, the third level of magnetic flux available to the ferromagnetic workpiece 27 at the workpiece contact interfaces 17', 17" of the pole shoes 16', 16" is higher than the first level of the off state, is lower than the second level of the on state, and is sufficient to lift the ferromagnetic workpiece with the magnetic coupling device 400. In one example, the partial on state is sufficient to lift top sheet 27' of stack 27, but not both top sheet 27' and second from the top sheet 27".

Each of the disclosed magnetic coupling devices may be used in combination with mechanical lifting apparatus 430 (See FIG. 25) having a support structure 431. The mechanical lifting apparatus 430 lift and transport ferromagnetic workpiece from a first location to a second location through one or more magnetic coupling devices. Exemplary mechanical lifting apparatus 430 include mechanical gantries 432 (See FIG. 25B), crane hoists 434 (see FIG. 25C), and robotic systems 700 (see FIG. 25A).

Exemplary mechanical gantries 432 include a pair of vertical support members having a horizontal cross member extending therebetween. Magnetic coupling device 10 may be suspended from or coupled to the horizontal cross member through a mechanism to raise and lower magnetic coupling device 10 relative to the horizontal cross member and hence to lift and transport a ferromagnetic workpiece coupled to magnetic coupling device 10.

Exemplary crane hoists 434 include a chain mechanism that raises or lowers a first portion of chain hoist 434 relative to a second portion of chain hoist 434. Magnetic coupling device 10 may be suspended from or coupled to the first portion of chain hoist 434. Hence, magnetic coupling device 10 is raised and lowered with the first portion of chain hoist 434 which in turn lifts and transports a ferromagnetic workpiece coupled to magnetic coupling device 10.

Figure 25C:
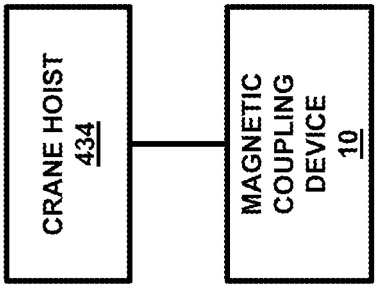
FIG. 25C illustrates a crane hoist including one of the exemplary magnetic coupling device of FIG. 1 suspended therefrom.
Figure 25B:
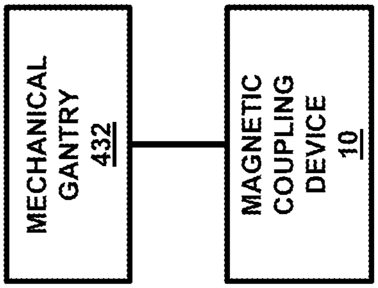
FIG. 25B illustrates a mechanical gantry including one of the exemplary magnetic coupling device of FIG. 1 suspended therefrom.
Figure 25:
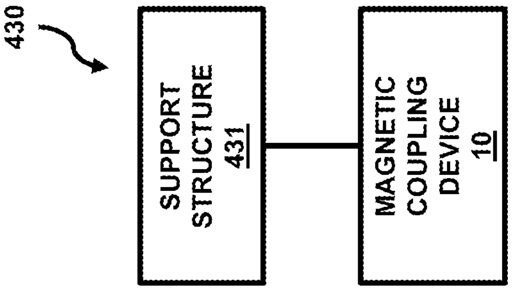
FIG. 25 illustrates a support structure including one of the exemplary magnetic coupling device of FIG. 1 attached thereto.
Figure 25A:
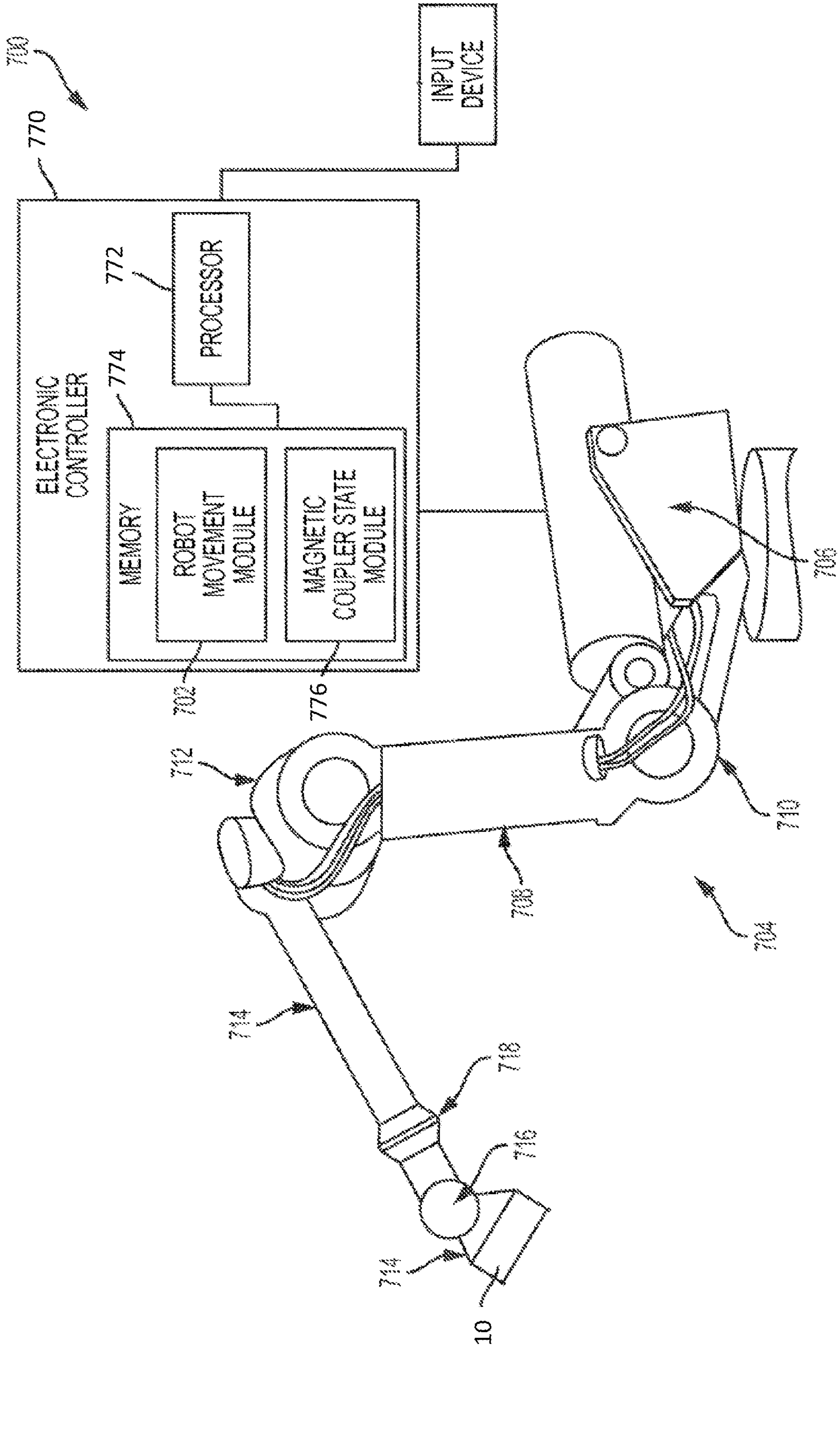
FIG. 25A illustrates a robotic system including one of the exemplary magnetic coupling device of FIG. 1 attached as an end of arm coupler.

Referring to FIG. 25C, an exemplary robotic system 700 is illustrated. The embodiments described in relation to robotic system 700 may be applied to other types of machines, (e.g., mechanical gantries, crane hoists, pick and place machines, etc.).

Robotic system 700 includes electronic controller 770. Electronic controller 770 includes additional logic stored in associated memory 774 for execution by processor 772. A robotic movement module 702 is included which controls the movements of a robotic arm 704. In the illustrated embodiment, robotic arm 704 includes a first arm segment 706 which is rotatable relative to a base about a vertical axis. First arm segment 706 is moveably coupled to a second arm segment 708 through a first joint 710 whereat second arm segment 708 may be rotated relative to first arm segment 706 in a first direction. Second arm segment 708 is moveably coupled to a third arm segment 711 through a second joint 712 whereat third arm segment 711 may be rotated relative to second arm segment 708 in a second direction. Third arm segment 711 is moveably coupled to a fourth arm segment 714 through a third joint 716 whereat fourth arm segment 714 may be rotated relative to third arm segment 711 in a third direction and a rotary joint 718 whereby an orientation of fourth arm segment 714 relative to third arm segment 711 may be altered. Magnetic coupling device 10 is illustratively shown secured to the end of robotic arm 704. Magnetic coupling device 10 is used to couple a workpiece 27 (not shown) to robotic arm 704. Although magnetic coupling device 10 is illustrated, any of the magnetic coupling devices described herein and any number of the magnetic coupling devices described herein may be used with robotic system 700.

In one embodiment, electronic controller 770 by processor 772 executing robotic movement module 702 moves robotic arm 704 to a first pose whereat magnetic coupling device 100 contacts the workpiece at a first location. Electronic controller 770 by processor 772 executing a magnetic coupler state module 776 instructs magnetic device 10 to move upper magnet 12 relative to lower magnet 14 to place magnetic coupling device 10 in one of the on state or a partial on state to couple the workpiece to robotic system 700. Electronic controller 770 by processor 772 executing robotic movement module 702 moves the workpiece from the first location to a second, desired, spaced apart location. Once the workpiece is at the desired second position, electronic controller 770 by processor 772 executing magnetic coupler state module 76 instructs magnetic device 10 to move upper magnet 12 relative to lower magnet 14 to place magnetic coupling device 10 in the off state to decouple the workpiece from robotic system 700. In one example, electronic controller 770 by processor 772 executing magnetic coupler state module 76 instructs magnetic coupling device 10 to sequentially place the magnetic coupling device 10 in the partially on state to lift a ferromagnetic workpiece 27', after lifting the ferromagnetic workpiece 27' by moving robotic arm 704 instructs magnetic coupling device 10 to move upper magnet 12 relative to lower magnet 14 to place magnetic coupling device 10 in the on state or another partial on state to increase the holding force of magnetic coupling device 10 on ferromagnetic workpiece 27', and after positioning the ferromagnetic workpiece 27' in a desired location by further moving the robotic arm 704 instructs magnetic coupling device 10 to move upper magnet 12 relative to lower magnet 14 to place magnetic coupling device 10 in the off state to decouple ferromagnetic workpiece 27' from robotic system 700. Electronic controller 770 then repeats the process to couple, move, and decouple another workpiece 27.

Figure 26:
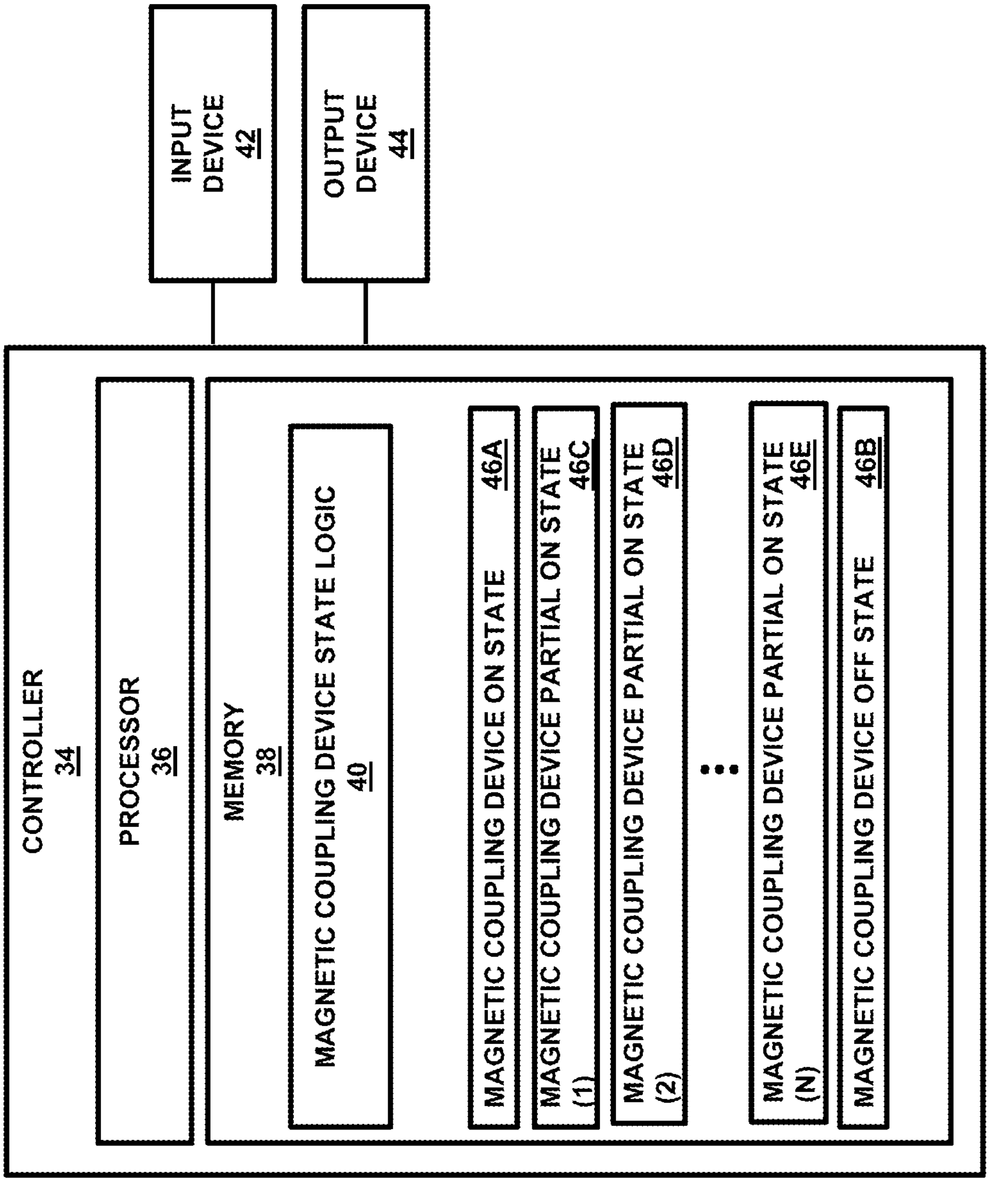
FIG. 26 illustrates an exemplary collection of state data information stored on a memory of the electronic controller of the exemplary magnetic coupling devices.

Referring to FIG. 26, an exemplary collection of state data information 46 stored on memory 38 of controller 34 is shown. State data information 46 may be part of a database or other types of data structures. State data information 46 includes information on each saved state of the respective magnetic coupling device, such as magnetic coupling device 10. As illustrated in FIG. 26, state data information 46 includes a magnetic coupling device on state information 46A, a magnetic coupling device off state information 46B, and a first partial on state information 46C, a second partial on state information 46D, and an nth partial on state information 46E.

Figure 27:
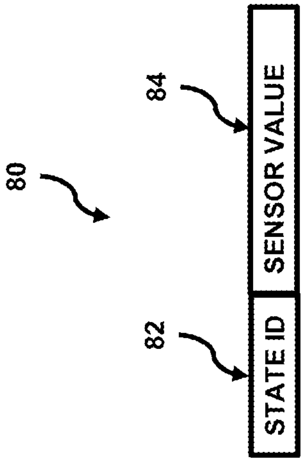
FIG. 27 illustrates an exemplary data record for a state stored on a memory of the electronic controller of the exemplary magnetic coupling devices.

Referring to FIG. 27 an exemplary data record 80 for a stored state information 46 which would be stored on memory 38 of controller 34 is illustrated. Data record 80 includes a state identifier 82 and at least one sensor value 84 corresponding to the respective state. For example, if the data record is for one of the partial on states, the sensor value may be a magnetic flux reading for one or both of sensors 70 of the embodiment of magnetic coupling device 10 shown in FIG. 12, a position value for the sensor of the embodiment of the magnetic coupling device 10 shown in FIG. 11, a position of a stepper motor used for actuator 32 in the embodiment of the magnetic coupling device shown in FIG. 10, an electrical current value of sensor 462 of the embodiment of the magnetic coupling device 400 shown in FIG. 14, or any other sensor value which provides an indication of the position of the permanent magnet 12 for magnetic coupling device 10, 100 or an electrical current value for coil 450 of magnetic coupling device 400. In another example, if the data record is for one of the on state or the off state, the sensor value may be a magnetic flux reading for one or both of sensors 70 of the embodiment of magnetic coupling device 10 shown in FIG. 12, a position value for the sensor of the embodiment of the magnetic coupling device 10 shown in FIG. 11, a position of a stepper motor used for actuator 32 in the embodiment of the magnetic coupling device shown in FIG. 10, an activation of a limit switch positioned in housing 28 which interacts with a pin 94 rotatable with permanent magnet 12 for magnetic coupling device 10, an electrical current value of sensor 462 of the embodiment of the magnetic coupling device 400, or any other sensor value which provides an indication of the position of the permanent magnet 12 for magnetic coupling device 10 or an electrical current value for coil 450 of magnetic coupling device 400.

Magnetic coupling device state logic 40 may select the appropriate data record based on a requested state of the magnetic coupling device 10, 100, 200, 300 or 400 requested by input device 42. As mentioned herein, in embodiments, magnetic coupling devices 10, 100, 200, 300 or 400 may be coupled to a robotic arm 704 of a robotic system 700 and electronic controller 770 of robotic system 700 may request a desired state of magnetic coupling device 10, 100, 200, 300 or 400 based on a position of robotic arm 704 by providing the state identifier 82 of the desired state to controller 34 of magnetic coupling device 10, 100, 200, 300 or 400.

In practice, an operator of magnetic coupling device 10, 100, 200, 300 or 400 may position magnetic coupling device 10, 100, 200, 300 or 400 on a stack of ferromagnetic workpieces, such as sheets 27. The operator may through input device 42 manually request actuation of actuator 32 to rotate permanent magnet 12 to a partial on position or similar movement for magnetic coupling devices 100, 200, or 300. Through experimentation or through monitoring sensor readings, the operator will continue to alter a position of permanent magnet 12 until a position is reached that provides sufficient lifting force to raise the top sheet 27' in direction 33, but not raise the second from the top sheet 27" in direction 33. The sensor values associated with this orientation of permanent magnet 12 are stored in a data record 80 as corresponding to a partial on state identifier 82. Then, when working with sheets 27, robotic system 700 is able to specify the correct state identifier 82 for the partial on data record. In a similar manner, the current in coil 450 may be monitored and recorded for system 400.

The sensor values for a plurality of partial on states may be stored in corresponding data records 80 on memory 38. In one example, data records 80 are stored for each state for which the magnetic coupling device is to be configured.

Figure 28:
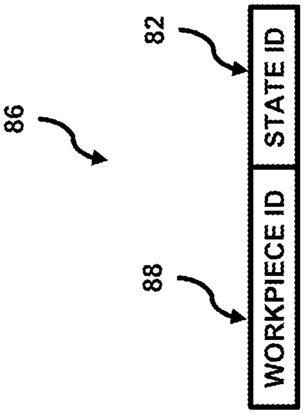
FIG. 28 illustrates an exemplary data record for a ferromagnetic workpiece and corresponding state stored on a memory of the electronic controller of the exemplary magnetic coupling devices.

In embodiments, robotic system 700 or magnetic coupling device 10 includes a workpiece data record 86 that correlates a given workpiece identifier 88 with a given state identifier 82, as illustrated in FIG. 28. Thus, an operator may configure a plurality of partial on states for a plurality of different ferromagnetic workpieces for later retrieval. For example, an operator of robotic system 700 may specify a workpiece to be handled with robotic system 700. Assuming that the specified workpiece has a corresponding workpiece data record 86 the correct settings for a partial on state for the magnetic coupling device 10 and the specified workpiece may be easily selected without further experimental testing or configuration. An advantage, among others is the ability to use a robot system 700 or other mechanical lifting system with multiple workpiece types, such as different thicknesses of ferromagnetic sheets, without incurring system downtime to switch magnetic coupling devices, as long as the new ferromagnetic workpiece has a corresponding workpiece data record 86.

Figure 29:
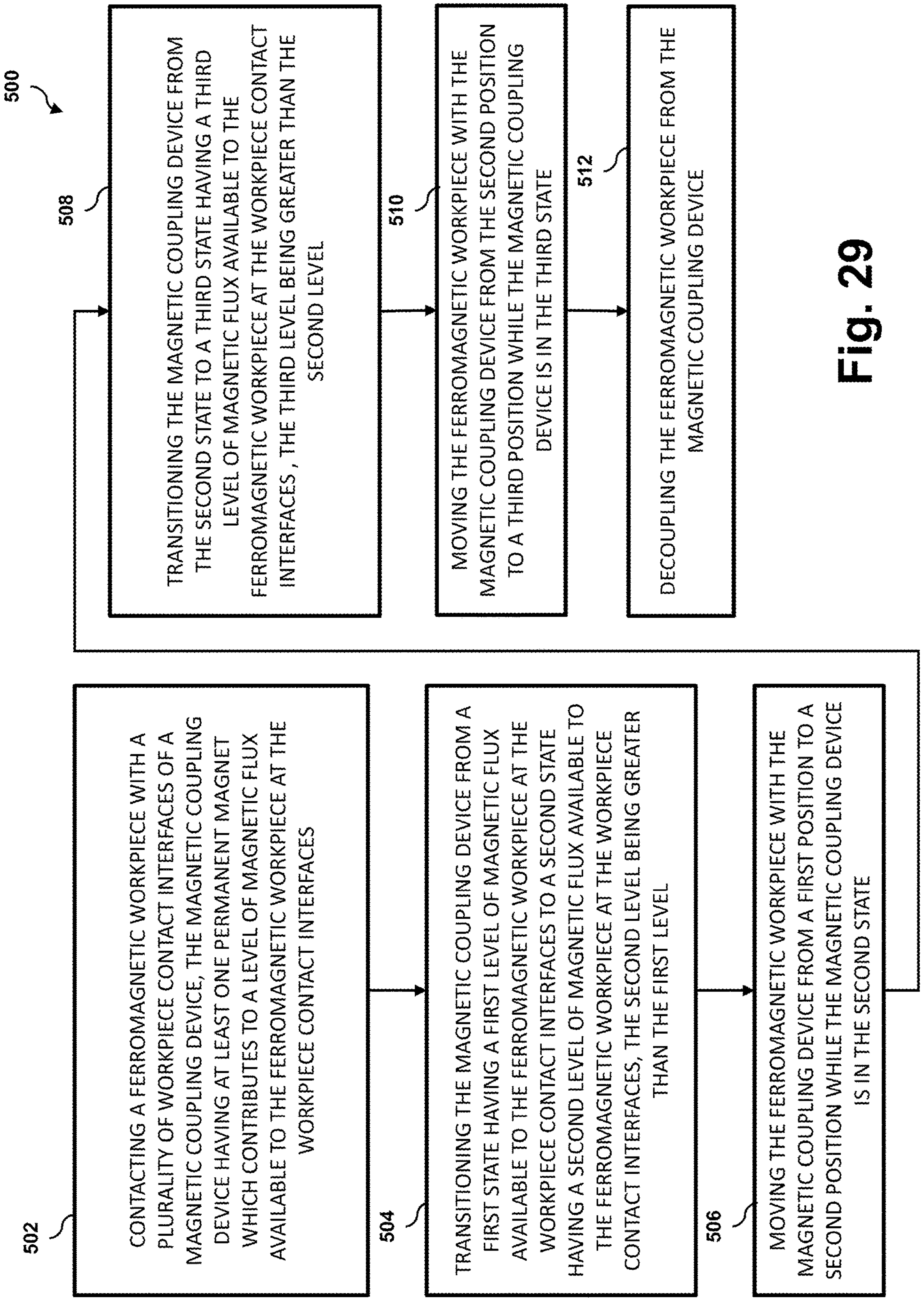
FIG. 29 illustrates an exemplary processing sequence.

FIG. 29 illustrates an exemplary processing sequence 500 of moving a ferromagnetic workpiece with a magnetic coupling device, such as one of the disclosed magnetic coupling devices, is provided. The processing sequence 500 including contacting the ferromagnetic workpiece with a plurality of pole shoes of the magnetic coupling device, each of the plurality of pole shoes having a workpiece contact interface which contacts the ferromagnetic workpiece, the magnetic coupling device having at least one permanent magnet which contributes to a level of magnetic flux available to the ferromagnetic workpiece at the workpiece contact interfaces of the plurality of pole shoes, as represented by block 502. The pole shoes may be attached to the housing of the magnetic coupling device or be integral portions of the housing of the magnetic coupling device. The magnetic coupling device is then transitioned from a first state having a first level of magnetic flux available to the ferromagnetic workpiece at the workpiece contact interfaces of the plurality of pole shoes to a second state having a second level of magnetic flux available to the ferromagnetic workpiece at the workpiece contact interfaces of the plurality of pole shoes, the second level being greater than the first level, as represented by block 504. In one example, the first state is the off state and the second state is a partial on state. In another example, the first state is a partial on state and the second state is a partial on state. The ferromagnetic workpiece is moved with the magnetic coupling device from a first position to a second position while the magnetic coupling device is in the second state, as represented by block 506. The magnetic coupling device is transitioned from the second state to a third state having a third level of magnetic flux available to the ferromagnetic workpiece at the workpiece contact interfaces of the plurality of pole shoes, the third level being greater than the second level, as represented by block 508. In one example, the second state is a partial on state and the third level is one of a second partial on state and the on state. The ferromagnetic workpiece is moved with the magnetic coupling device from the second position to a third position while the magnetic coupling device is in the third state, as represented by block 510. The ferromagnetic workpiece is decoupled from the magnetic coupling device, as represented by block 512. In one example, the ferromagnetic workpiece is decoupled by transitioning the magnetic coupling device back to the first state, wherein the first state is the off state. In another example, the ferromagnetic workpiece is decoupled by transitioning the magnetic coupler to one of the off state and a partial on state having a level of magnetic flux available at the workpiece contact interfaces of the pole shoes below a level that is capable of holding the workpiece to the magnetic coupling device. Any of the exemplary magnetic coupling devices disclosed herein may be used to carry out processing sequence 500. Further, any of the exemplary magnetic coupling devices disclosed herein may be used in combination with robotic system 700 to carry out processing sequence 500.

In embodiments, between steps 510 and 512, the magnetic coupling device is transitioned from the third state to a fourth state having a fourth level of magnetic flux available to the ferromagnetic workpiece at the workpiece contact interfaces, the fourth level being less than the third level, but still sufficient to hold the workpiece relative to the magnetic coupling device. In one example, the fourth level is used when the workpiece is approaching a second stack of workpieces that the workpiece is to be placed on top of the stack. By reducing the level of magnetic flux, the chance that a workpiece already on the stack is moved due to the magnetic flux of the magnetic coupling device. In another example, the workpiece is being placed in a nesting relationship relative to a second workpiece and once the second workpiece is in place, the magnetic flux level is increased so that both workpieces are coupled to the magnetic coupling device with sufficient magnetic flux to move the multiple workpieces.

In embodiments, the second level of magnetic flux in the second stack is sufficient to couple multiple workpieces in a stack of workpieces to the magnetic coupling device. Once the multiple workpieces are coupled, the multiple workpieces are moved to a second position. At this point the magnetic flux level may be increased to strengthen the level of connection with magnetic coupling device. In one example, the magnetic coupling device moves the multiple workpieces to a first drop location and the level of magnetic flux is lowered to release a bottom one of the multiple workpieces. This is repeated at different locations until all of the multiple workpieces are released.

Figure 30:
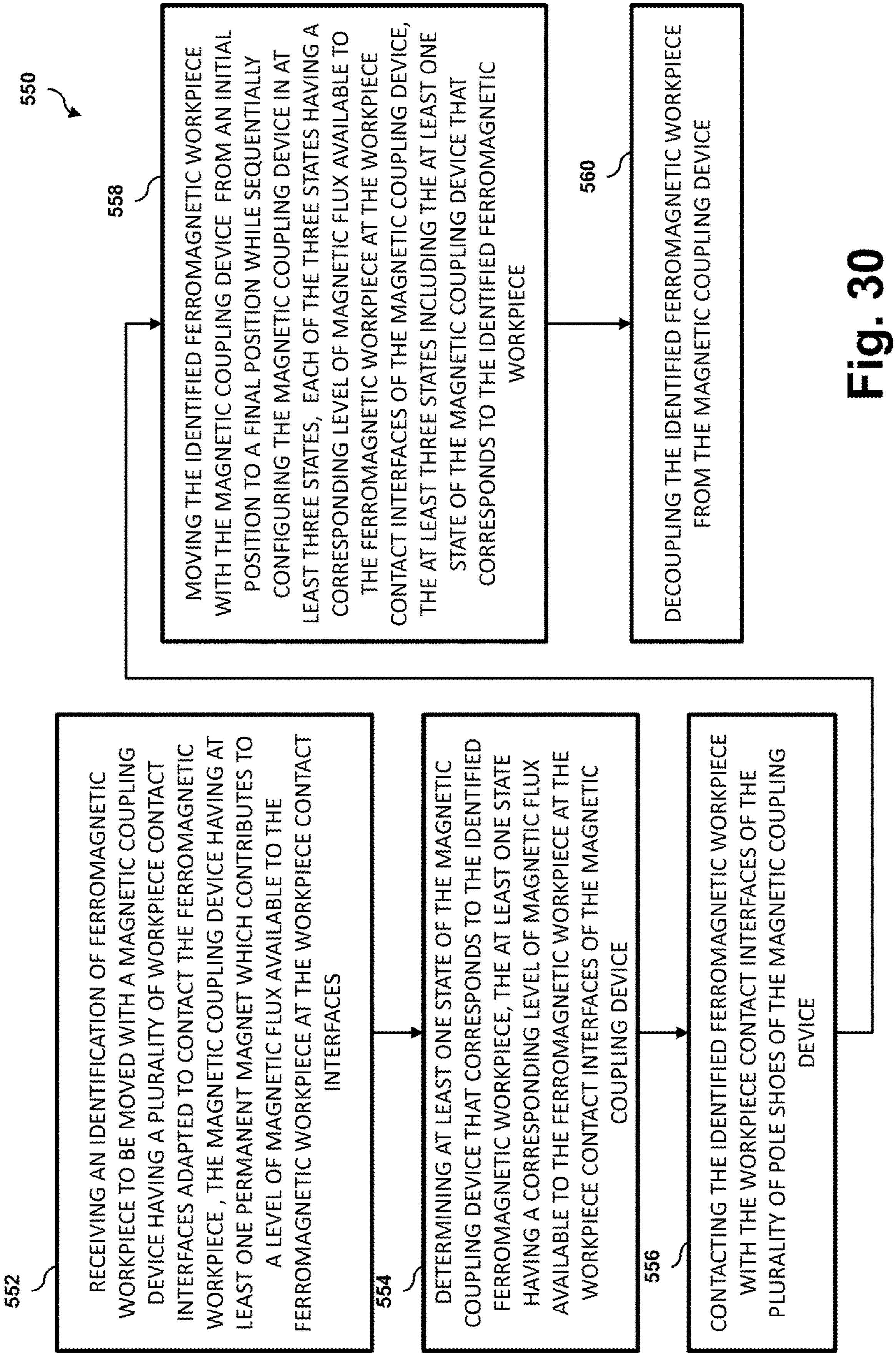
FIG. 30 illustrates another exemplary processing sequence.

FIG. 30 illustrates an exemplary processing sequence 550 of moving a ferromagnetic workpiece with a magnetic coupling device. The processing sequence including receiving an identification of ferromagnetic workpiece to be moved with a magnetic coupling device having a plurality of pole shoes, each of the plurality of pole shoes having a workpiece contact interface adapted to contact the ferromagnetic workpiece, as represented by block 552. The pole shoes may be attached to the housing of the magnetic coupling device or be integral portions of the housing of the magnetic coupling device. The magnetic coupling device having at least one permanent magnet which contributes to a level of magnetic flux available to the ferromagnetic workpiece at the workpiece contact interfaces of the plurality of pole shoes. At least one state of the magnetic coupling device that corresponds to the identified ferromagnetic workpiece is determined, as represented by block 554. The at least one state having a corresponding level of magnetic flux available to the ferromagnetic workpiece at the workpiece contact interfaces of the plurality of pole shoes of the magnetic coupling device. The identified ferromagnetic workpiece is contacted with the workpiece contact interfaces of the plurality of pole shoes of the magnetic coupling device, as represented by block 556. The identified ferromagnetic workpiece is moved with the magnetic coupling device from an initial position to a final position while sequentially configuring the magnetic coupling device in at least three states, each of the three states having a corresponding level of magnetic flux available to the ferromagnetic workpiece at the workpiece contact interfaces of the plurality of pole shoes of the magnetic coupling device, the at least three states including the at least one state of the magnetic coupling device that corresponds to the identified ferromagnetic workpiece, as represented by block 558. The identified ferromagnetic workpiece is decoupled from the magnetic coupling device, as represented by block 560.

In embodiments, a magnetic coupling device having at least three states is an electro-permanent magnetic coupling device including at least one first permanent magnet, at least one second permanent magnet, and an electrical coil placed around the at least one second permanent magnet. The at least one first permanent magnet is/are a high coercivity magnet and the at least one second permanent magnet is/are a low coercivity magnet whose magnet poles may be changed due to the influence of an electrical current supplied to the electrical coil placed around the at least one second permanent magnet. An exemplary high coercivity magnet is an NdFeB (Neodymium, Iron, Boron) magnet. An exemplary low coercivity magnet is an AlNiCo (Aluminium, Nickel, Cobalt) magnet.

The at least one first permanent magnet, the at least one second permanent magnet, and the electrical coil are contained in a housing having associated pole shoes with workpiece contact interfaces. The orientation of the magnetic poles of the at least one second permanent magnet may have a first orientation wherein a first level of magnetic flux is available to the workpiece contact interfaces of the pole shoes, the first level being sufficient to lift ferromagnetic workpiece 27. Further, the orientation of the magnetic poles of the at least one second permanent magnet may have a second orientation wherein a second level of magnetic flux is available to the workpiece contact interfaces of the pole shoes, the second level being insufficient to lift ferromagnetic workpiece 27. When in the first orientation a first current level may be applied to coils that reduces the magnetic flux available at the workpiece contact interfaces of the pole shoes to a third level less than the first level and greater than the second level. The third level corresponding to a partial on state. In one example, the third level is sufficient to destack ferromagnetic workpiece 27' from the remainder of ferromagnetic workpieces. The first current level being insufficient to alter the magnetic poles of the at least one second permanent magnet to the second orientation. When in the second orientation a second current may be applied to coils that increases the magnetic flux available at the workpiece contact interfaces of the pole shoes to a fourth level less than the first level and greater than the second level. The fourth level corresponding to a partial on state. In one example, the fourth level is sufficient to destack ferromagnetic workpiece 27' from the remainder of ferromagnetic workpieces. The second current level being insufficient to alter the magnetic poles of the at least one second permanent magnet to the first orientation.

Figure 31:
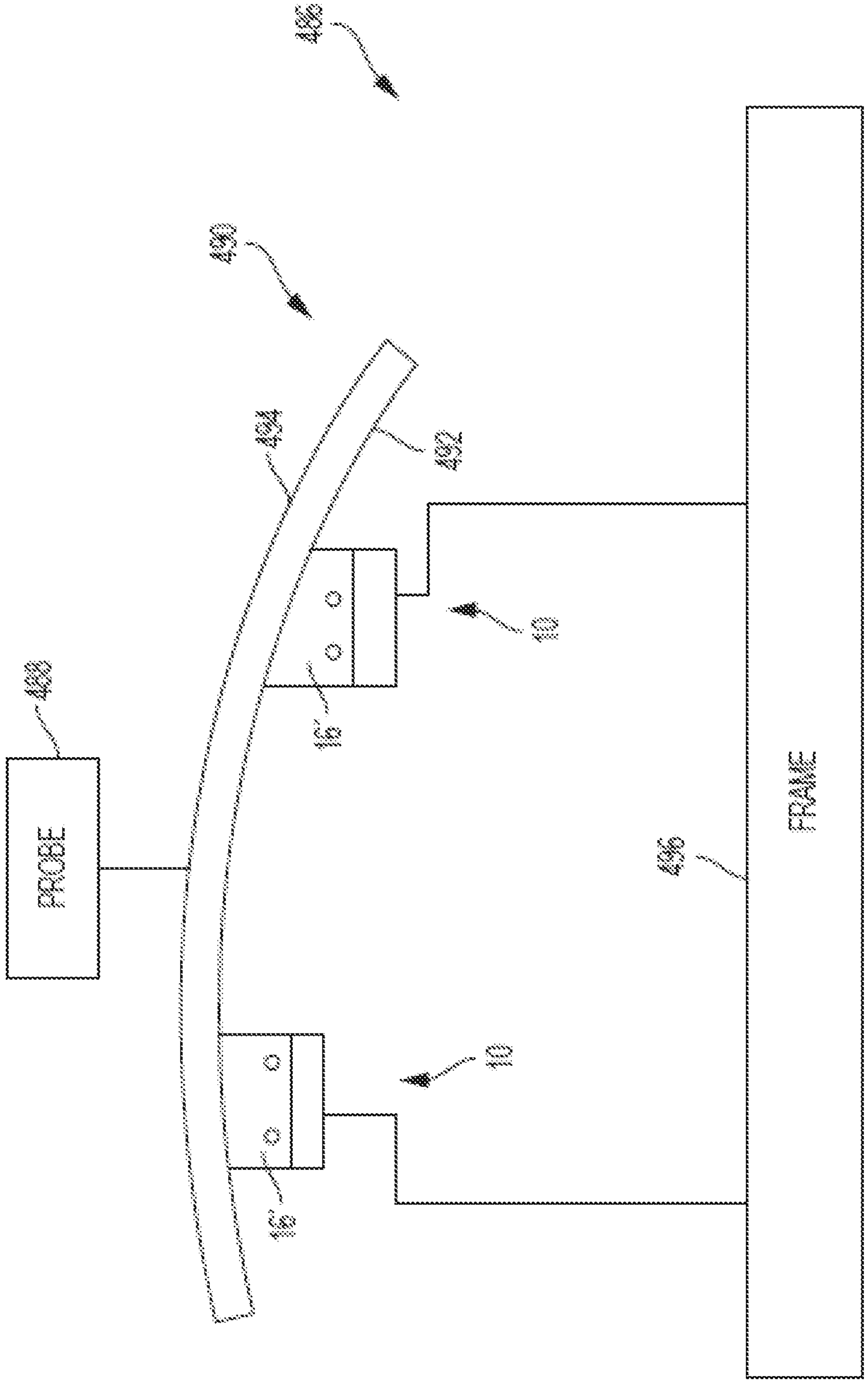
FIG. 31 illustrates an exemplary fixture.

Referring to FIG. 31, a fixture 486 for holding a ferromagnetic workpiece 490 is illustrated. Fixture 486 may be an inspection fixture which holds ferromagnetic workpiece 490 for inspection. Fixture 486 includes a frame 496 and a plurality of magnetic coupling devices 10 positioned to support a lower side 492 of ferromagnetic workpiece 490. Each of magnetic coupling devices 10 includes a plurality of pole shoes 16 having a workpiece contact interface adapted to contact the ferromagnetic workpiece 490. The pole shoes may be attached to the housing of the magnetic coupling device 10 or be integral portions of the housing of the magnetic coupling device 10.

Ferromagnetic workpiece 490 may be inspected with one or more probes 488 that contact an upper side 494 of ferromagnetic workpiece 490. In embodiments, the electronic controller 34 of each magnetic coupling device 10 orients the magnets of the magnet coupling devices 10 to provide a level of magnetic flux available at the workpiece contact interfaces 17 of the pole shoes 16 to hold the ferromagnetic workpiece 490 relative to fixture 486, but low enough to not alter the operation of the probe inspecting the upper side 494 of ferromagnetic workpiece 490.

In embodiments, each of the plurality of magnetic coupling devices 10 has associated pole shoes 16 with workpiece contact interfaces 17 shaped to match a corresponding profile of the lower side 492 of ferromagnetic workpiece 490. In embodiments, the plurality of magnetic coupling devices 10 are spaced apart.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A magnetic coupling device for magnetically coupling to a ferromagnetic workpiece positioned on a support, comprising:
- a housing;
- a plurality of workpiece contact interfaces supported by the housing and adapted to contact the ferromagnetic workpiece;
- a magnetic flux source including
  - a plurality of permanent magnets supported by the housing and including a first permanent magnet and a second permanent magnet, and
  - a coil of wire wrapped around the second permanent magnet of the plurality of permanent magnets; and
- an electronic controller operatively coupled to the coil of wire of the magnetic flux source to control a current through the coil of wire, the electronic controller including logic which results in a plurality of states of the magnetic flux source each having a respective level of magnetic flux available to the ferromagnetic workpiece at the workpiece contact interfaces, the plurality of states of the magnetic flux source including:
- (a) a first state wherein the magnetic flux source has a first configuration including a first level of magnetic flux available to the ferromagnetic workpiece at the workpiece contact interfaces, the first level of magnetic flux available to the ferromagnetic workpiece at the workpiece contact interfaces being insufficient to lift the ferromagnetic workpiece relative to the support;
- (b) a second state wherein the magnetic flux source has a second configuration including a second level of magnetic flux available to the ferromagnetic workpiece at the workpiece contact interfaces, the second level of magnetic flux available to the ferromagnetic workpiece at the workpiece contact interfaces being sufficient to lift the ferromagnetic workpiece relative to the support, the second level of magnetic flux being greater than the first level of magnetic flux; and
- (c) a third state wherein the magnetic flux source has a third configuration including a third level of magnetic flux available to the ferromagnetic workpiece at the workpiece contact interfaces, the third level of magnetic flux being greater than each of the first level of magnetic flux and the second level of magnetic flux, wherein in the first state a north pole of the second permanent magnet is magnetically adjacent a south pole of the first permanent magnet and a south pole of the second permanent magnet is magnetically adjacent a north pole of the first permanent magnet and in both the second state and the third state the north pole of the second permanent magnet is magnetically adjacent the north pole of the first permanent magnet and the south pole of the second permanent magnet is magnetically adjacent the south pole of the first permanent magnet.

2. The magnetic coupling device of claim 1, wherein the second permanent magnet is movable relative to the first permanent magnet.

3. The magnetic coupling device of claim 1, wherein the second permanent magnet is rotatable relative to the first permanent magnet.

4. The magnetic coupling device of claim 1, wherein the electronic controller controls the current through the coil of wire to alter a level of magnetic flux contributed by the second permanent magnet to the ferromagnetic workpiece at the workpiece contact interfaces.

5. The magnetic coupling device of claim 1, wherein each of the first permanent magnet and the second permanent magnet are positioned between a first workpiece contact interface of the plurality of workpiece contact interfaces and a second workpiece contact interface of the plurality of workpiece contact interfaces.

6. The magnetic coupling device of claim 5, wherein the second permanent magnet is positioned vertically above the first permanent magnet.

7. The magnetic coupling device of claim 5, wherein each of the first permanent magnet and the second permanent magnet are positioned vertically above the first workpiece contact interface of the plurality of workpiece contact interfaces and the second workpiece contact interface of the plurality of workpiece contact interfaces.

8. The magnetic coupling device of claim 1, wherein the coil of wire is wrapped around both the first permanent magnet and the second permanent magnet.

9. The magnetic coupling device of claim 1, further comprises a sensing system supported by the housing, the sensing system including at least one sensor which monitors a level of magnetic flux available to the ferromagnetic workpiece at the plurality of workpiece contact interfaces.

10. The magnetic coupling device of claim 1, further comprises a sensing system supported by the housing, the electronic controller based on the sensing system determines a proximity of the magnetic coupling device to the ferromagnetic workpiece.

11. The magnetic coupling device of claim 1, wherein in the first state of the plurality of states up to 4% percent of the magnetic flux produced by the first permanent magnet and the second permanent magnet is available at the plurality of workplace contact interfaces.

12. The magnetic coupling device of claim 1, wherein in the first state of the plurality of states up to 1% percent of the magnetic flux produced by the first permanent magnet and the second permanent magnet is available at the plurality of workplace contact interfaces.

13. The magnetic coupling device of claim 5, further comprising a first pole shoe coupled to the housing and a second pole shoe coupled to the housing, the first pole shoe including the first workpiece contact interface and the second pole shoe including the second workpiece contact interface.

14. The magnetic coupling device of claim 1, wherein the first permanent magnet is a high coercivity magnet and the second permanent magnet is a low coercivity magnet.

15. The magnetic coupling device of claim 14, further comprises a sensing system supported by the housing, the sensing system including at least one sensor which monitors a level of magnetic flux available to the ferromagnetic workpiece at the plurality of workpiece contact interfaces.

16. The magnetic coupling device of claim 14, further comprises a sensing system supported by the housing, the electronic controller based on the sensing system determines a proximity of the magnetic coupling device to the ferromagnetic workpiece.

* * * * *